United States Patent
Radia et al.

(10) Patent No.: US 8,438,211 B2
(45) Date of Patent: *May 7, 2013

(54) EVALUATION OF CURRENT CAPACITY LEVELS OF RESOURCES IN A DISTRIBUTED COMPUTING SYSTEM

(75) Inventors: Sanjay Radia, Fremont, CA (US); Robert A. Gingell, Jr., Sunnyvale, CA (US); Jerry R. Jackson, Colorado Springs, CO (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,220

(22) Filed: Dec. 9, 2011

(65) Prior Publication Data
US 2012/0124213 A1    May 17, 2012

Related U.S. Application Data

(63) Continuation of application No. 11/970,233, filed on Jan. 7, 2008, now Pat. No. 8,078,664.

(51) Int. Cl.
*G06F 15/16* (2006.01)

(52) U.S. Cl.
USPC ............................ 709/201; 709/223; 718/105

(58) Field of Classification Search .................. 709/201, 709/223; 708/105
See application file for complete search history.

(56) References Cited

U.S. PATENT DOCUMENTS

| | | | |
|---|---|---|---|
| 6,516,348 B1 | 2/2003 | MacFarlane et al. |
| 7,284,054 B2 | 10/2007 | Radhakrishnan |
| 2006/0161884 A1 | 7/2006 | Lubrecht et al. |
| 2007/0271276 A1 | 11/2007 | Allen et al. |
| 2008/0216088 A1 | 9/2008 | Tantawi et al. |

OTHER PUBLICATIONS

U.S. Appl. No. 11/970,266, filed Jan. 7, 2008, entitled, "Interdependent Capacity Levels of Resources in a Distributed Computing System", Radia et al.
Sanjay Radia, et al., U.S. Appl. No. 11/970,266, filed Jan. 7, 2008, Office Action from the U.S. Patent Office dated Jan. 4, 2010.
Sanjay Radia, et al., U.S. Appl. No. 11/970,266, filed Jan. 7, 2008, Office Action from the U.S. Patent Office dated Jul. 22, 2010.

*Primary Examiner* — John Follansbee
*Assistant Examiner* — Glenford Madamba
(74) *Attorney, Agent, or Firm* — Baker Botts, L.L.P.

(57) ABSTRACT

In general, this disclosure describes techniques of managing resources in a service-oriented distributed computing system. As described in this disclosure, a control node automatically manages the system such that the system has sufficient capacity to satisfy an agreement to provide a given level of a service. In order to automatically manage the system, the control node evaluates the current capacity levels of resources in the system. The current capacity levels are indicative the capacity of resources to perform certain acts. The capacity of the resources to perform these acts may be indicative of whether the system is able to provide the given level of the service. Because capacities provided by the resources change as the resources start, the control node uses a predicted pending capacity function to evaluate whether resources that are currently starting will be sufficient to satisfy the level of the service when completely started.

21 Claims, 21 Drawing Sheets

EVALUATION OF CURRENT CAPACITY LEVELS OF RESOURCES IN A DISTRIBUTED COMPUTING SYSTEM

CROSS REFERENCE TO RELATED APPLICATIONS

This application is a continuation of U.S. application Ser. No. 11/970,233, filed Jan. 7, 2008, by Sanjay Radia et al. and titled "Evaluation of Current Capacity Levels of Resources in a Distributed Computing System," now U.S. Pat. No. 8,078,664.

TECHNICAL FIELD

The invention relates to computing environments and, more specifically, to distributed computing systems.

BACKGROUND

Distributed computing systems are increasingly being utilized to support business as well as technical applications. Typically, distributed computing systems are constructed from a collection of computing nodes that combine to provide a set of processing services to implement the distributed computing applications. Each of the computing nodes in the distributed computing system is typically a separate, independent computing device interconnected with each of the other computing nodes via a communications medium, e.g., a network.

One challenge with distributed computing systems is the organization, deployment and administration of such a system within an enterprise environment. For example, it is often difficult to manage the allocation and deployment of enterprise computing functions within the distributed computing system. An enterprise, for example, often includes several business groups, and each group may have competing and variable computing requirements.

SUMMARY

In general, this disclosure describes techniques of managing resources in a service-oriented distributed computing system. As described in this disclosure, a control node automatically manages the system such that the system has sufficient capacity to satisfy an agreement to provide a given level of a service. In order to automatically manage the system, the control node evaluates the current capacity, levels of resources in the system. The current capacity levels are indicative the capacity of resources to perform certain acts. The capacity of the resources to perform these acts may be indicative of whether the system is able to provide the given level of the service. Because capacities provided by the resources change as the resources start, the control node uses a predicted pending capacity function to evaluate whether resources that are currently starting will be sufficient to satisfy the level of the service when completely started.

In one embodiment, a distributed computing system comprises a first resource chain that includes resources that collaborate to provide a first service, wherein the resources in the first resource chain include a first resource that is capable of performing a first act. The distributed computing system also comprises a control node that autonomically controls the distributed computing system. In addition, the distributed computing system comprises a network the facilitates communication between the first resource chain and the control node. In this distributed computing system, the control node comprises a first asset object that calculates a current capacity level of the first resource to perform the first act. The first asset object is associated with a predicted pending capacity function that specifies a relationship between a predicted pending capacity level of the first resource and a length of time. The first asset object calculates the current capacity level of the first resource such that the current capacity level of the first resource is substantially equal a predicted pending capacity level indicated by the predicted pending capacity function at a given time plus an actual capacity level of the first resource at the given time. The control node also comprises a governance infrastructure that makes a determination, based on the current capacity level of the first resource to perform the first act, whether to assemble a second resource chain that includes resources that collaborate to provide the first service. In addition, the control node comprises a chain assembly module that assembles the second resource chain when the governance infrastructure makes the determination to assemble the second resource chain.

In another embodiment, a method comprises operating a first resource chain that includes resources that collaborate to provide a first service. The resources in the first resource chain include a first resource that is capable of performing a first act. The method also comprises operating a control node that automatically controls the distributed computing system. A network facilitates communication between the first resource chain and the control node. In this method, operating the control node comprises calculating a current capacity level of the first resource to perform the first act. The first asset object is associated with a predicted pending capacity function that specifies a relationship between a predicted pending capacity level of the first resource and a length of time. The first asset object calculates the current capacity level of the first resource such that the current capacity level of the first resource is substantially equal a predicted pending capacity level indicated by the predicted pending capacity function at a given time plus an actual capacity level of the first resource at the given time. Operating the control node also comprises making a determination, based on the current capacity level of the first resource to perform the first act, whether to assemble a second resource chain that includes resources that collaborate to provide the first service. In addition, operating the control node comprises assembling the second resource chain when the determination is made to assemble the second resource chain.

In another embodiment, a computer-readable medium comprises instructions that, when executed by one or more processors of a control node of a distributed computing system, cause the one or more processors to initiate operation of a first resource chain that includes resources that collaborate to provide a first service. The resources in the first resource chain include a first resource that is capable of performing a first act. The instructions also cause the one or more processors to operate the control node such that the control node autonomically controls the distributed computing system. A network facilitates communication between the first resource chain and the control node. The instructions cause the one or more processors to operate the control node at least in part by causing the one or more processors to calculate a current capacity level of the first resource to perform the first act. The first asset object calculates the current capacity level of the first resource such that the current capacity level of the first resource is substantially equal a predicted pending capacity level indicated by a predicted pending capacity function at a given time plus an actual capacity level of the first resource at the given time. The predicted pending capacity function specifies a relationship between a predicted pending capacity level of the first resource and a length of time. The instructions that cause the one or more processors to operate the control node further cause the one or more processors to make a determination, based on the current capacity level of the first resource to perform the first act, whether to assemble a second resource chain that includes resources that collaborate to provide the first service. In addition, the instructions that cause the one or more processors to operate the control node further cause the one or more processors to assemble the second resource chain when the determination is made to assemble the second resource chain.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
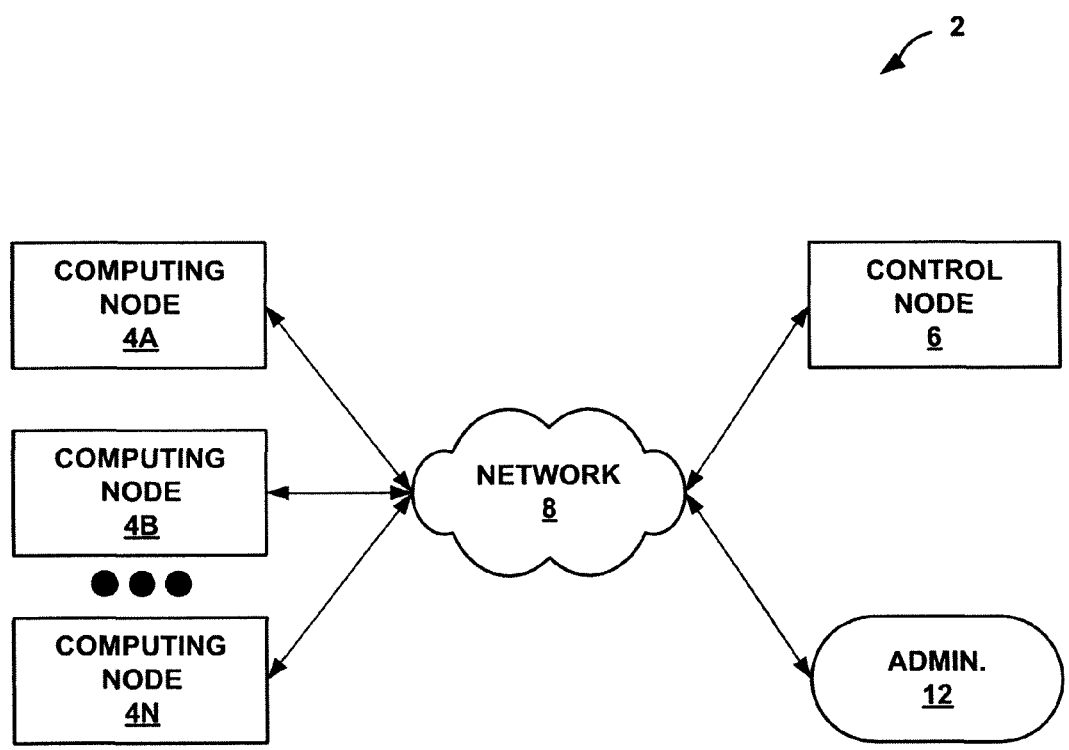
FIG. 1 is a block diagram illustrating an exemplary distributed computing system.

FIG. 1 is a block diagram illustrating an exemplary distributed computing system 2. As illustrated in the example of FIG. 1, distributed computing system 2 includes a communications network 8 that facilitates communication among a control node 6 and set of computing nodes 4A through 4N (collectively, "computing nodes 4"). Network 8 may comprise, for example, direct connections between one or more of computing nodes 4, one or more customer networks maintained by an enterprise, one or more local-area networks (LANs), one or more wide-area networks (WANs), or a combination thereof. For example, network 8 may comprise a local-area Ethernet network or a wide-area network such as the Internet. Although not illustrated in the example of FIG. 1, network 8 may include a number of switches, routers, firewalls, load balancers, and the like.

Computing nodes 4 may operate in cooperation with each other to provide distributed processing services. The number of computing nodes 4 within distributed computing system 2 may be dependent on the processing requirements of distributed computing system 2. For example, distributed computing system 2 may include 8 to 512 computing nodes or more. Each of computing nodes 4 may be a physical computing device that includes one or more programmable processors that are capable of executing software instructions stored on one or more computer-readable media. For example, computing nodes 4 may be personal computers, mainframe computers, supercomputers, servers, server blades, or other types of physical computing devices.

Control node 6 controls computing nodes 4 in distributed computing system 2. For example, control node 6 may control which software resources operate on each of computing nodes 4. Although not shown in the example of FIG. 1, distributed computing system 2 may include one or more optional control nodes in addition to control node 6. These additional control nodes may assist control node 6 with the management functions. Moreover, such additional control nodes provide primary and backup administration functions, thereby allowing for graceful failover in the event that control node 6 fails.

Control node 6 may automatically discover computing nodes 4. For example, control node 6 may monitor Dynamic Host Configuration Protocol (DHCP) leases to discover the connection of a computing node to network 8. Once detected, control node 6 may automatically inventory the attributes for the discovered computing node. The node attributes identified during the inventory process may include a CPU count, a CPU speed, an amount of memory (e.g., random access memory), local disk characteristics, or other computing resources. Control node 6 may also receive input identifying node attributes not detectable via the automatic inventory, such as whether the node includes I/O, such as Host Bus Adapter (HBA). Further details with respect to the automated discovery and inventory processes are described in U.S. patent application Ser. No. 11/070,851, having entitled "AUTOMATED DISCOVERY AND INVENTORY OF NODES WITHIN AN AUTONOMIC DISTRIBUTED COMPUTING SYSTEM," filed Mar. 2, 2005, the entire content of which is hereby incorporated by reference.

An administrator 12 may access administration software executing on control node 6 to configure distributed computing system 2 to provide one or more services. As used in this disclosure, the term "service" refers to a set of functionality provided by a "resource." As used herein, a "resource" is something that provides a set of functionality. A "resource" may be a hardware unit, a software unit, a collection of one or more hardware units, a collection of one or more software units, or a collection of one or more hardware units and one or more software units. For example, an individual one of computing nodes 4 may be a "resource" that provides the ability to execute instructions in an x86 instruction set. In this example, a service S may be defined as the ability to execute instructions in an x86 instruction set. Therefore, the individual computing node provides service S. In another example, distributed computing system 2 as a whole may be a "resource" that provides e-commerce applications. In this example, a service T may be defined as these e-commerce applications. Hence, distributed computing system 2 may provide service T.

In order to configure distributed computing system 2 to provide a service, administrator 12 may access the administration software on control node 6 to input a service definition that defines the service. A service definition may specify a set of "export facilities" and may specify a set of "import facilities." As used in this disclosure, an "export facility" of a service is a type of functionality provided by resources associated with the service. Furthermore, an "import facility" of a service is a type of functionality provided by another service that resources associated with the service require in order to operate. As used herein, a resource "is associated with" a service when the resource conforms to the service definition of the service. For example, a service definition of service S may specify an export facility of executing x86 assembly language instructions and may specify no import facilities. In this example, a computing node that implements an x86 architecture provides (i.e., exports) the functionality to execute instructions in the x86 instruction set and does not require any import facilities may be associated with service S. Continuing this example, an x86 emulator software application may provide the same set of export facilities as a computing node that implements the x86 architecture. However, the x86 emulator software application may utilize (i.e., import) a facility that provides a PowerPC architecture.

After administrator 12 installs one or more services for use in distributed computing system 2 and configures one or more resources associated with these services, administrator 12 may configure control node 6 to use the resources to bring distributed computing system 2 into compliance with one or more service-level agreements. A service-level agreement describes an expected level of service for a service provided by distributed computing system 2. For example, a service-level agreement may specify a level of performance of a top-level service that distributed computing system 2 is expected to provide. A top-level service may be a service that provides functionality to a user of distributed computing system 2. In this disclosure, a top-level service may also be referred to as a "flux service." In contrast, a service that provides functionality to another service within distributed computing system 2 may be referred to as an "interpretation service." For example, an information technology ("IT") department of a large corporation may operate distributed computing system 2 on behalf of the corporation. An e-commerce division of the corporation may make a service-level agreement with the IT department that distributed computing system 2 will provide the functionality of an e-commerce web site to the public. Furthermore, the service-level agreement may specify that the web site should respond to a request for a credit card transaction in no more than five seconds. In this example, the functionality of the e-commerce website may be a top-level service. Services, such as database access services, operating system services, and other types of services, that enable the e-commerce website service to operate may be interpretation services.

A service-level agreement may describe an expected level of service for a service in terms of "overall current capacity levels" of "assets" associated with top-level services provided by distributed computing system 2. An "asset" associated with a service represents an capacity of a resource associated with the service to perform a particular act. In other words, a resource associated with a service may provide an asset that represents the capacity of the resource to perform a particular act. A "capacity level" of an asset provided by a resource is a value represents that resource's ability to provide the particular functionality. As explained in detail below, the current capacity level of an asset provided by a resource is, in general terms, a value that represents a current estimate of the resource's ability to perform the particular act when the resource is fully operational. An "overall current capacity level" of an asset associated with a service may represent the sum of the current capacity levels of the asset provided by active resources associated with the service. Continuing the credit card transaction service example, an overall current capacity level of a "transaction processing time" asset associated with a top-level credit card processing service may indicate an amount of time it takes for active resources associated with the credit card processing service to process a credit card transaction. In this example, the service-level agreement may specify that the overall current capacity level of the "transaction processing time" asset must be less than five seconds.

Distributed computing system 2 may utilize one or more resource chains in order to provide a top-level service. A "resource chain" is a set of one or more resources that are ordered according to the relation "a first resource provides a service to a second resource." The resources in a resource chain may work together (i.e., collaborate) to provide a service. For example, a service definition of a top-level service may specify that the first service exports web server functionality and may specify that the top-level service imports Windows™ operating system functionality. A service definition of a second service may specify that the second service exports Windows™ operating system functionality and may specify that the second service imports x86 assembly language execution functionality. A service definition of a third service may specify that the third service exports x86 assembly language execution functionality and does not specify any imports. In this example, distributed computing system 2 may utilize a resource chain in order to provide web server functionality. This resource chain may include a first resource that is associated with the top-level service (web serving), a second resource that is associated with the second service (operating system), and a third resource that is associated with the third service (instruction execution). The first resource, the second resource, and the third resource may work together to provide the web serving functionality of the top-level service.

Control node 6 may dynamically allocate or deallocate resources of distributed computing system 2 in order to increase or decrease the capacities provided by resources of distributed computing system 2. For instance, control node 6 may dynamically assemble or disassemble resource chains in order to bring the overall current capacity levels of assets associated with top-level services of distributed computing system 2 into compliance with one or more service-level agreements. To assemble a resource chain that provides a top-level service, control node 6 may identify one or more "service chains." A "service chain" is a set of one or more services that are ordered by the relation "resources associated with a first service provide a service to resources associated with a second service." As described in detail below, control node 6 may then, for each service in the identified service chain, identify a resource associated with the service. Control node 6 may then assemble the identified resources into a resource chain. When control node 6 assembles the identified resources to a resource chain, control node 6 may cause each of the identified resources to start operating with the other resources in the resource chain. When each of the resources in the resource chain is operating, the resource chain is able to perform the export facilities associated with the top-level service. In this way, adding the additional resource chain augments the overall current capacity levels of the assets associated with the top-level service.

Control node 6 may use status data from resources in distributed computing system 2 to identify the current capacity levels of assets provided by individual active resources of distributed computing system 2. For example, control node 6 may receive status data from a resource associated with a first service (i.e., x86 computing node), a resource associated with a second service (i.e., Windows operating system), and a resource of a third service (i.e., web server application). The status data from the x86 computing node may indicate that the temperature of the processor of the x86 is 35 degrees Celsius. The status data from the operating system may indicate that the operating system is making extensive use of virtual memory. The status data from the web server application may indicate that the web server application has received ten thousand requests in the last ten minutes. Furthermore, the third service may be associated with a "request response time" asset. The overall current capacity level of the "request response time" asset indicates how long it takes distributed computing system 2 to respond to a request for a web page. Based on the status data from these three resources, control node 6 may identify the overall current capacity level of the "request response time" asset as 0.2 seconds. If the service-level agreement specifies that the overall current capacity level of the "request response time" asset must be less than 0.1 seconds, the overall current capacity level of the "request response time" asset is not sufficient to satisfy the service-level agreement. In other words, control node 6 may determine that the overall current capacity level of the "request response time" asset is "too low." For purposes of explanation, this disclosure characterizes an overall current capacity level associated with a service as "too low" whenever additional active resources associated with the service are needed in order to ensure that the required capacity level is satisfied. This disclosure describes situations where additional active resources associated with the service are needed in order to ensure that the required capacity level is satisfied as "too low", even when a service-level agreement specifies that an overall current capacity level of an asset must be below a given capacity level and adding additional active resources would decrease the overall current capacity level of the asset.

When control node 6 determines that the overall current capacity level of an asset associated with a top-level service is "too low", control node 6 may dynamically assemble one or more resource chains in order to enhance the overall current capacity level of the asset associated with the service. Continuing the previous example, when control node 6 determines that the overall current capacity level of the "request response time" asset is "too low", control node 6 may dynamically assemble one or more resource chains in order to enhance the overall current capacity level of the asset associated with the third service. As a result of assembling the one or more resource chains, the overall current capacity level of the "request response time" asset associated with the third service may return to compliance with the service-level agreement.

In addition, control node 6 may determine that an overall current capacity level of an asset associated with a top-level service provided by distributed computing system 2 indicates that distributed computing system 2 could provide an overall current capacity level of the asset that satisfies the service-level agreement with fewer resources. In other words, control node 6 may determine that the overall current capacity level of the asset is "too high". Continuing the example of the previous paragraph, control node 6 may determine that the overall current capacity level of the "request response time" asset significantly exceeds a capacity level of the "request response time" asset required by the service level agreement. In other words, control node 6 may determine that the overall current capacity level of the "request response time" asset is too high. In this example, control node 6 may determine that the overall current capacity level of the "request response time" asset is 0.005 seconds. Because the service level only requires the overall current capacity level of the "request response time" asset to be 0.1 seconds, the overall current capacity level of the "request response time" asset significantly exceeds the capacity level of the "request response time" asset required by the service level agreement. For purposes of explanation, this disclosure characterizes an overall current capacity level as "too high" whenever the required capacity level could be satisfied using fewer resources. This disclosure describes the current capacity level as "too high" whenever the required capacity level could be satisfied using fewer resources even in situations where a service-level agreement specifies that an overall current capacity level of an asset must be below a given capacity level and reducing the number of active resources would increase the overall current capacity level.

When control node 6 determines that an overall current capacity level of an asset associated with a service is "too high", control node 6 may deallocate resources that provide the service, thereby reducing the overall current capacity level of the asset. In the example of the previous paragraph, control node 6 may automatically identify one or more of the resource chains that provide the web page request service and disassemble one or more of the identified resource chains. In this way, the resources in the disassembled resource chains may be available for subsequent use in other resource chains.

Potential advantages of this approach may include the flexibility in being able to install and configure software services dynamically rather than rely on fixed sets of software services. In addition, the advantages may include being able to choose a different computer on which to execute a software resource based on various factors at the time the software resource is to be executed. Further, this approach may reduce the number of preconfigured combinations of software services that control node 6 manages.

Figure 2:
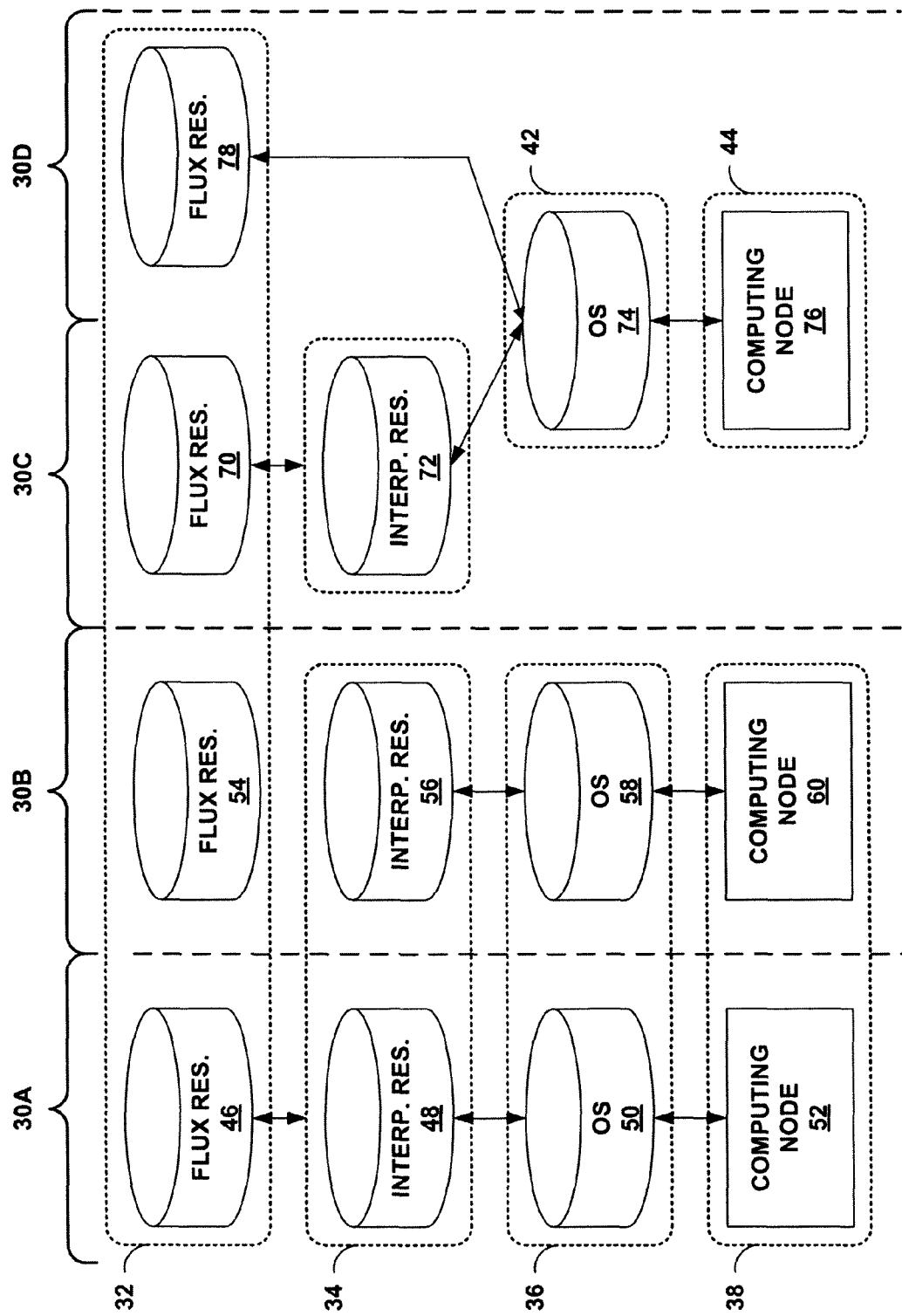
FIG. 2 is a block diagram illustrating a set of example resource chains.

FIG. 2 is a block diagram illustrating a set of example resource chains 30A through 30D. This disclosure refers collectively to resource chains 30A through 30N as "resource chains 30."

When control node 6 determines that an overall current capacity level of an asset associated with a top-level service provided by distributed computing system 2 does not comply with a service-level agreement because the capacity level is "too low", control node 6 may need to enhance the capacity of distributed computing system 2 to provide top-level service 32. In order to enhance the capacity of distributed computing system 2 to provide top-level service 32, control node 6 may dynamically assemble resource chains 30.

In order to assemble resource chains 30, control node 6 may first identify one or more service chains whose associated resources may work together to provide top-level service 32. As illustrated in the example of FIG. 2, services are illustrated as dotted rectangles. In this example, control node 6 may identify three different service chains. A first one of these service chains includes top-level service 32, a first interpretation service 34, an operating system service 36, and a first type of computing node service 38. A second one of these service chains includes top-level service 32, a second interpretation service 40, a second type of operating system service 42, and a second type of computing node service 44. A third one of these service chains includes top-level service 32, operating system service 42, and computing node service 44. In this example, top-level service 32 may be a Java-based payroll application, interpretation service 34 may be an Java application server service, operating system service 36 may be a Linux operating system, computing node service 38 may be a type of computing node based on an x86 architecture, interpretation service 40 may be an application server service, operating system service 42 may be a Macintosh operating system, and computing node service 44 may be a type of computing node based on a PowerPC architecture.

After identifying the service chains, control node 6 may identify one or more resource chains for each of the identified service chains. No resource chain may include more than one resource of one service. As illustrated in the example of FIG. 2, control node 6 may identify resource chains 30A through 30D for the identified resource chains. For example, resource chain 30A includes a resource 46 that is associated with top-level service 32, a resource 48 that is associated with interpretation service 34, a resource 50 that is associated with operating system service 36, and a computing node resource 52 that is associated with computing node service 38.

Resources in resource chains 30 may provide services required by higher-level resources in the resource chains. In other words, each resource in a resource chain, other than a hardware resource, operates within an operating environment provided by a lower-level resource in the resource chain. For example, resource 46 of top-level service 32 may operate within an operating environment provided by resource 48 of interpretation service 34. Furthermore, resource 48 of interpretation service 34 may operate within an operating environment provided by resource 50 of operating system service 36. Resource 50 of operating system service 36 may operate within an operating environment provided by resource 52 of computing node service 38.

Multiple resources may operate within a single operating environment provided by a resource. In other words, a single resource may provide a service to multiple resources. For example, in resource chain 30C, a resource 70 associated with top-level service 32 may operate within an operating environment provided by a resource 72 associated with interpretation service 40. Resource 72 of interpretation service 40 may operate within an operating environment provided by a resource 74 associated with operating system service 42. Furthermore, in resource chain 30D, a resource 78 associated with top-level service 32 may operate within the operating environment provided by resource 74 associated with operating system service 42. In other words, resource 72 and resource 78 may use the same service provided by resource 74.

Figure 3:
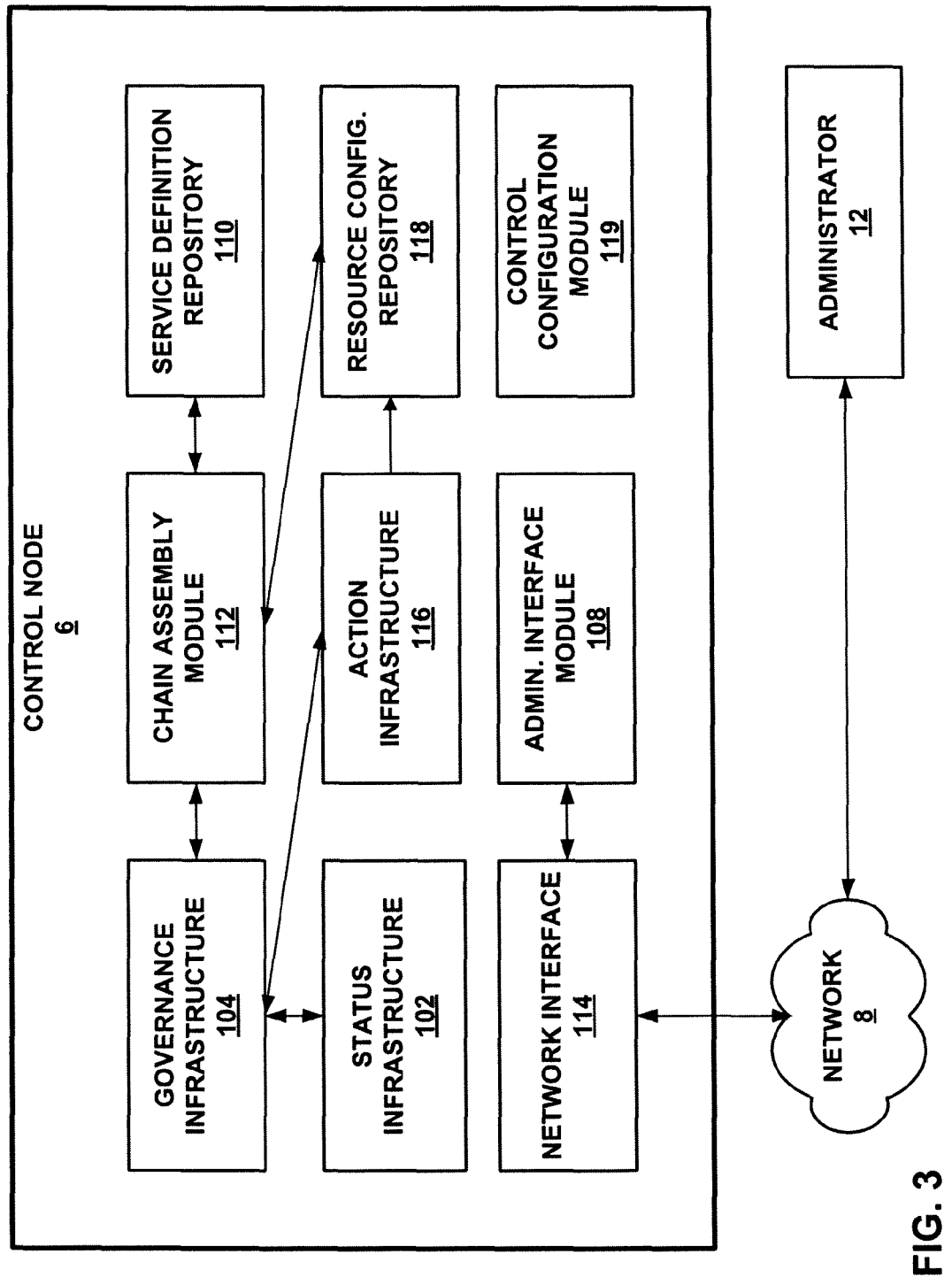
FIG. 3 is a block diagram illustrating example details of the control node.

FIG. 3 is a block diagram illustrating example details of control node 6. As illustrated in the example of FIG. 3, control node 6 may include a network interface 114 that facilitates communication between control node 6, resources in distributed computing system 2, and other devices on network 8, such as a computer used by administrator 12. Although not illustrated in the example of FIG. 3, each of the modules of control node 6 may communicate with network interface 114.

As illustrated in the example of FIG. 3, control node 6 may include a status infrastructure 102 that provides data about the current status of distributed computing system 2. For example, status infrastructure 102 may dynamically collect status data from resources operating within distributed computing system 2. Status infrastructure 102 may use the status data to generate monitoring data based on the status data. The monitoring data generated by status infrastructure 102 may represent the actual state of the resources in distributed computing system 2. In another example, status infrastructure 102 may output capacity levels of assets provided by resources operating in distributed computing system 2.

A governance infrastructure 104 in control node 6 governs distributed computing system 2. For instance, governance infrastructure 104 may use data provided by status infrastructure 102 to determine whether the overall current capacity levels of assets associated with services provided by distributed computing system 2 are in compliance with one or more service-level agreements installed in distributed computing system 2. For instance, governance infrastructure 104 may determine whether an overall capacity level of a type of asset provided by resources associated with a top-level service is "too low" or "too high." When governance infrastructure 104 determines that an overall current capacity level of an asset associated with a top-level service is "too low," governance infrastructure 104 may instruct a chain assembly module 112 in control node 6 to dynamically assemble resource chains in order to enhance the overall current capacity level of the type of asset associated with the top-level service.

Chain assembly module 112 performs steps necessary to assemble resource chains when governance infrastructure 104 determines that the overall current capacity level of an asset associated with a top-level service is "too low." For example, governance infrastructure 104 may determine that an overall current capacity level of an asset associated with a top-level service is "too low" and consequently output an action request to chain assembly module 112 to assemble an additional resource chain that provides the top-level service. In response to this action request, chain assembly module 112 may attempt to identify and assemble a resource chain that most efficiently provides the top-level service. When the additional resource chain is operating (i.e., providing the top-level service), the overall current capacity level of the asset associated with the top-level service may be "higher" as a result of assembling this resource chain.

Furthermore, chain assembly module 112 may automatically configure control node 6 to govern assembled resource chains. In configuring control node 6 to govern a resource chain, chain assembly module 112 may automatically configure status infrastructure 102 to receive various types of status data from resources in the resource chain, and to output monitoring data regarding the resource chain in response to the received status data. In addition, chain assembly module 112 may automatically configure governance infrastructure 104 to receive monitoring data regarding the resources in the resource chain and to output appropriate action requests regarding these resources. Furthermore, chain assembly module 112 may automatically configure status infrastructure 102 to provide capacity levels of assets provided by individual active resources of distributed computing system 2.

Control node 6 may include an action infrastructure 116. Action infrastructure 116 provides an operating environment in which service action modules and resource action modules may operate. Each of the resource action modules may be a pluggable software module that implements a common set of methods that perform actions regarding a resource. Similarly, each of the service action modules may be a pluggable software module that implements a set of methods that perform actions regarding a service. For example, a particular software resource only communicates using Simple Network Management Protocol ("SNMP"). In this example, action infrastructure 116 may include a resource action module for the particular software resource. This resource action module causes action infrastructure 116 to communicate with the particular software resource using SNMP. In some instances, service action modules and resource action modules may operate in action infrastructures on nodes of distributed computing system 2 other than control node 6. For example, an action infrastructure operating on computing node 4A may provide an operating environment in which a resource action module operates. In this example, the resource action module may or may not be associated with computing node 4A or a software resource that executes on computing node 4A.

Control node 6 may also include an administrative interface module 108 that provides a user interface through which administrator 12 may interact with control node 6. For example, administrative interface module 108 may provide a web interface that presents web pages that administrator 12 may use to configure control node 6. In another example, administrative interface module 108 may provide a Telnet or Secure Shell command line interface, a special-purpose user interface, or another type of user interface. Although not illustrated in the example of FIG. 3, administrative interface module 108 may interact with each other component of control node 6.

Administrator 12 may use administrative interface module 108 to configure how distributed computing system 2 uses services. For example, administrative interface module 108 may receive service definition objects from administrator 12. When administrative interface module 108 receives a service definition object, administrative interface module 108 may store the service definition object repository 110 within control node 6. Service definition repository 110 may be present in a persistent or volatile computer-readable medium. For example, service definition repository 110 may be present in a random access memory unit, on a hard disk drive, or in another type of computer-readable medium. As described in detail below with regard to FIG. 5, a service definition object is an electronic object that indicates how distributed computing system 2 is to use a service. For example, a service definition object of a service may indicate export facilities and import facilities of a service, assets provided by resources of the service, and other information about the service. Furthermore, administrator 12 may, for example, use administrative interface module 108 to instruct governance infrastructure 104 to start or stop using a service.

Administrator 12 may also use administrative interface module 108 to configure resources used by distributed computing system 2. When administrator 12 uses administrative interface module 108 to configure a resource, administrative interface module 108 may store resource configuration information for the resource in a resource configuration repository 118 that stores resource configuration information. Resource configuration repository 118 may be present in a persistent or volatile computer-readable medium. For example, resource configuration repository 118 may be present in a random access memory unit, on a hard disk drive, or in another type of computer-readable medium. The resource configuration information of a resource may specify whether the resource is allocated to a resource chain, an Internet Protocol address associated with the resource, a path to a software image of the resource, number of processors in a computing node resource, amount of random access memory ("RAM") in a computing node resource, processor speed of a computing node resource, and other resource-specific information.

In addition, administrator 12 may use administrative interface module 108 to configure resources associated with installed services. For example, administrator 12 may use administrative interface module 108 to instruct governance infrastructure 104 to govern ten resources of a particular service that administrator 12 has previously installed in distributed computing system 2. In another example, administrator 12 may use administrative interface module 108 to instruct governance infrastructure 104 to customize resources of a particular service.

As illustrated in the example of FIG. 3, control node 6 comprises a control configuration module 119. As described in detail below, control configuration module 119 may use the service definition objects stored in service definition repository 110 to configure status infrastructure 102, governance infrastructure 104, and action infrastructure 116

Figure 4:
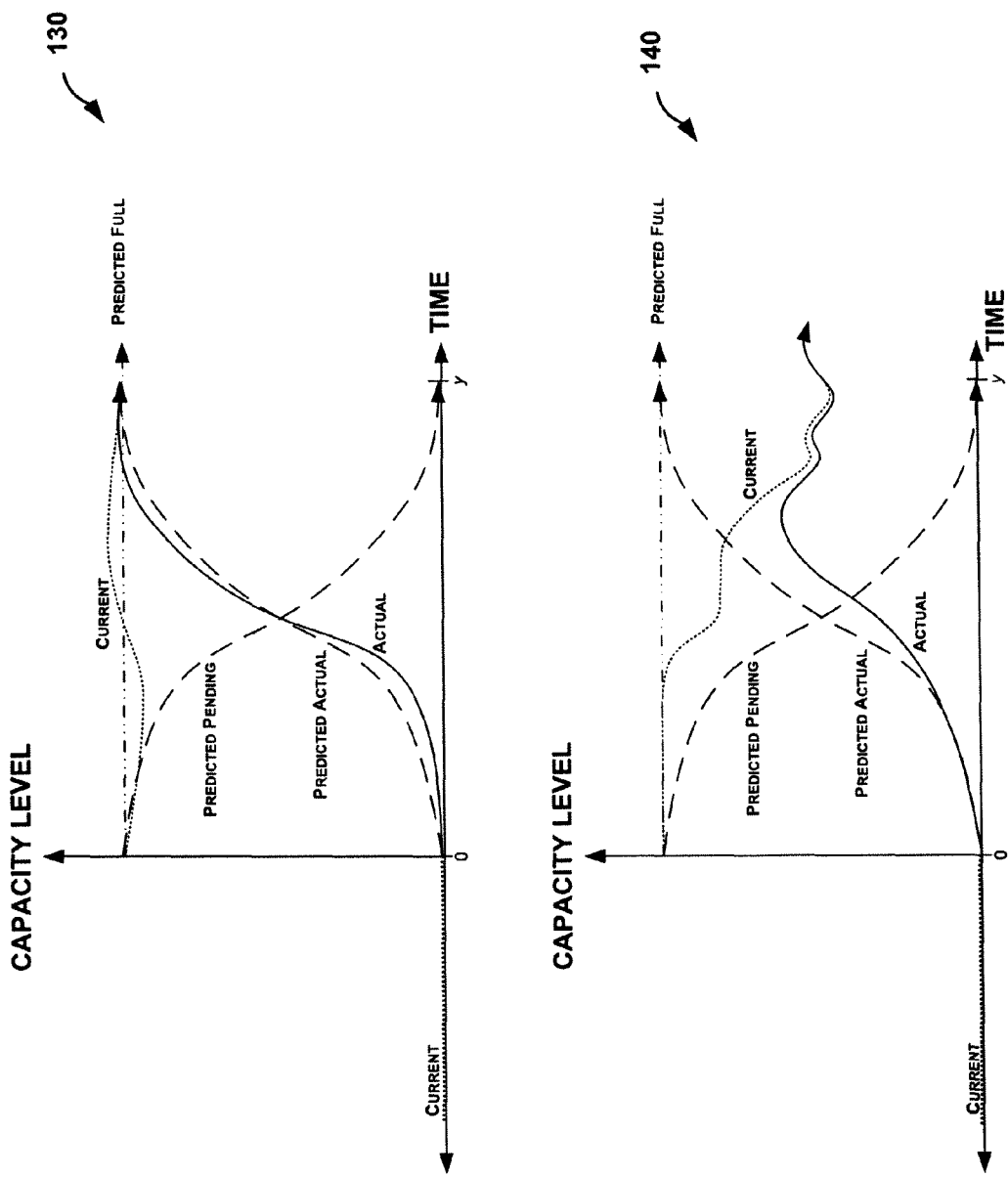
FIG. 4 includes graphs that show exemplary relationships between types of capacity levels.

FIG. 4 includes a first exemplary graph 130 that shows an exemplary relationship between capacity levels of an asset. In the exemplary graph 130 of FIG. 4, the horizontal axis represents time since control node 6 instructed a resource associated with a service to start. The vertical axis represents the capacity level of the asset.

The capacity level of an asset when a resource that provides the asset is fully operational is the "full capacity level" of the asset. The "full capacity level" of an asset provided by a resource may vary depending on certain conditions, but imperial research may be used to predict the full capacity level of the asset. This disclosure uses the term "predicted full capacity level" of an asset provided by a resource to refer to such a prediction of the full capacity level of the asset. In exemplary graph 130, the predicted full capacity level of an asset is shown as the upper dash-dotted horizontal line.

This disclosure uses the term "actual capacity level" of an asset provided by a resource to refer to a capacity level of the asset that the resource is actually providing. Under some circumstances, an "actual capacity level" of an asset is not equal to the full capacity of the asset. Rather, the actual capacity level of an asset may vary considerably throughout the duration of time that a resource providing the asset is operational. In exemplary graph 130, the actual capacity level of the asset is shown as a solid black line.

Some resources may not be able to provide predicted capacity levels of assets immediately upon starting. Rather, the actual capacity level of an asset provided by a resource may rise from an initial capacity level of zero to a full capacity level over a period of time after the chain assembly module 112 instructs the resource to start. For example, a resource of a resource chain may be associated with a top-level service. Furthermore, in this example, the resource may provide an asset that represents the resource's response times to credit card transaction requests. In this example, the resource may not be able to respond to any credit card transaction requests because lower resources in the resource chain must start before higher resources in the resource chain. Hence, the actual capacity level of the "response time to credit card transaction" asset may be zero for a period of time after chain assembly module 112 assembles and starts the resource chain. Moreover, after all of the resources in the resource chain start, the resource may still not be able to provide a full capacity level of the "response time to credit card transaction" asset. For instance, the resource may not be able to provide a full capacity level of the "response time to credit card transaction" asset because data and programs relevant to processing credit card transactions may not yet be loaded into high-speed caches of a hardware resource of the resource chain.

Empirical research or experience may be used to discover how the actual capacity level of an asset behaves after a resource that provides the asset is started. In a first example, it may be discovered that, under typical circumstances, the actual capacity level of an asset tends to rise in a linear manner from an initial capacity level to the full capacity level over the course of fifty seconds. In a second example, it may be discovered that, under typical circumstances, the actual capacity level of an asset tends to rise in an exponential manner from an initial capacity level to the full capacity level. In a third example, it may be discovered that, under typical circumstances, the actual capacity of an asset tends to rise in a step-wise manner from an initial capacity level to the full capacity level over the course of thirty seconds. Other types of functions may include sinusoidal, logarithmic, cubic, and so on. Moreover, the functions may or may not be monotonic and may be based on one or more of these types of functions.

Because it may be discovered how the actual capacity level of an asset behaves during a time period after a resource that provides the asset is started, a function may be identified that models how the actual capacity level of the asset tends to behave during the time period after the resource is started. As used in this disclosure, a "predicted actual capacity function" refers to a function that models the manner in which the actual capacity level of an asset behaves in a time period after a resource that provides the asset is started. Furthermore, as used in this disclosure, a "predicted actual capacity level" of an asset is a capacity level of the asset predicted by a predicted actual capacity function of the asset for a particular time after the resource starts. In other words, a predicted actual capacity function of an asset provided by a resource is a relationship between predicted actual capacity levels of the asset and a length of time after the resource starts. In exemplary graph 130, the predicted actual capacity function is shown as the rising dashed line.

Because the actual capacity levels of different assets may behave in different ways after the assets are started, individual assets may be associated with different predicted actual capacity functions. For example, a first asset may be associated with a predicted actual capacity function that describes a relationship between the predicted actual capacity level of the asset and a length of time after the resource starts in which the predicted actual capacity level of the asset increases linearly as the length of time after the resource starts increases. Furthermore, in this example, a second asset may be associated with a predicted actual capacity function that describes a relationship between the predicted actual capacity level of the asset and a length of time after the resource starts in which the predicted actual capacity level of the asset increases in exponentially as the length of time after the resource starts increases.

Furthermore, a "predicted pending capacity function" of an asset may be identified. As used in this disclosure, a "predicted pending capacity function" of an asset represents the difference between the predicted actual capacity function of the asset and the predicted full capacity of the asset. In other words, the predicted pending capacity function of represents how far the predicted actual capacity function has to rise before attaining the predicted full capacity level. In exemplary graph 130, the predicted actual capacity function is shown as the declining dashed line. As illustrated in graph 130, the predicted pending capacity level of the asset may start at the predicted full capacity level of the asset and decrease as time passes.

Because the actual capacity levels of different assets may be predicted using different predicted actual capacity functions, the predicted pending capacity levels of different assets may be predicted using different predicted pending capacity functions. For example, the actual capacity levels of a first asset may be predicted using an upward-sloping linear function and the actual capacity levels of a second asset may be predicted using an exponential growth function. In this example, the predicted pending capacity level of the first asset may be predicted using a downward-sloping linear function and the predicted pending capacity level of the second asset may be predicted using an exponential decay function. Because the predicted pending capacity level function is generally downward-sloping over time, the predicted pending capacity level function may also be referred to herein as a "decay function."

In addition, graph 130 includes a line representing a "current" capacity level of the asset provided by the resource. As used in this disclosure, a "current capacity level" of an asset provided by a resource is defined as the sum of the actual capacity level of an asset provided by the resource at a given time and the predicted pending capacity level of the asset provided by the resource that the same given time. In exemplary graph 130, the current capacity level of the asset is shown as the dotted line.

The current capacity level of an asset is equal to the predicted full capacity of the asset so long as the rise of the actual capacity level of the asset keeps pace with the decline of the predicted pending capacity level of the asset. However, the rise of the actual capacity level of the asset may fail to keep pace with the decline of the predicted pending capacity of the asset. The rise of the actual capacity level of the asset may fail to keep pace with the decline of the predicted pending capacity level of the asset for a variety of reasons. For example, let the asset model the time to process a credit card transaction. In this example, a resource may take longer to process a credit card transaction when a rate at which the resource receives credit card transaction requests increases. In the context of graph 130, the rise of the actual capacity level of the asset generally keeps pace with the fall of the predicted pending capacity level of the asset. Consequently, the current capacity level of the asset remains approximately equal to the predicted full capacity level of the asset.

In another example, consider graph 140 in FIG. 4. As illustrated in graph 140, the predicted actual capacity level of an asset rises smoothly toward the predicted full capacity of the asset whereas the actual capacity level of the asset starts at zero and rises for a while before tapering off and eventually reaching plateau a capacity level that is less than the predicted full capacity level of the asset. In the example of graph 140, the rise of the actual capacity level of the asset is not proportionate to the decrease of the predicted pending capacity level of the asset. Because the rise of the actual capacity level of the asset is not proportionate to the decrease of the predicted pending capacity level of the asset, the current capacity level of the asset (i.e., actual capacity level+predicted pending capacity level), does not remain equal to the predicted pending capacity level of the asset. Rather, the current capacity level of the asset declines as the rise of the actual capacity level fails to keep pace with the decline of the predicted pending capacity level. Thus, at time y when the predicted pending capacity level is zero, the current capacity level is equal to the actual capacity level at a capacity level that is less than the predicted capacity level.

Figure 5:
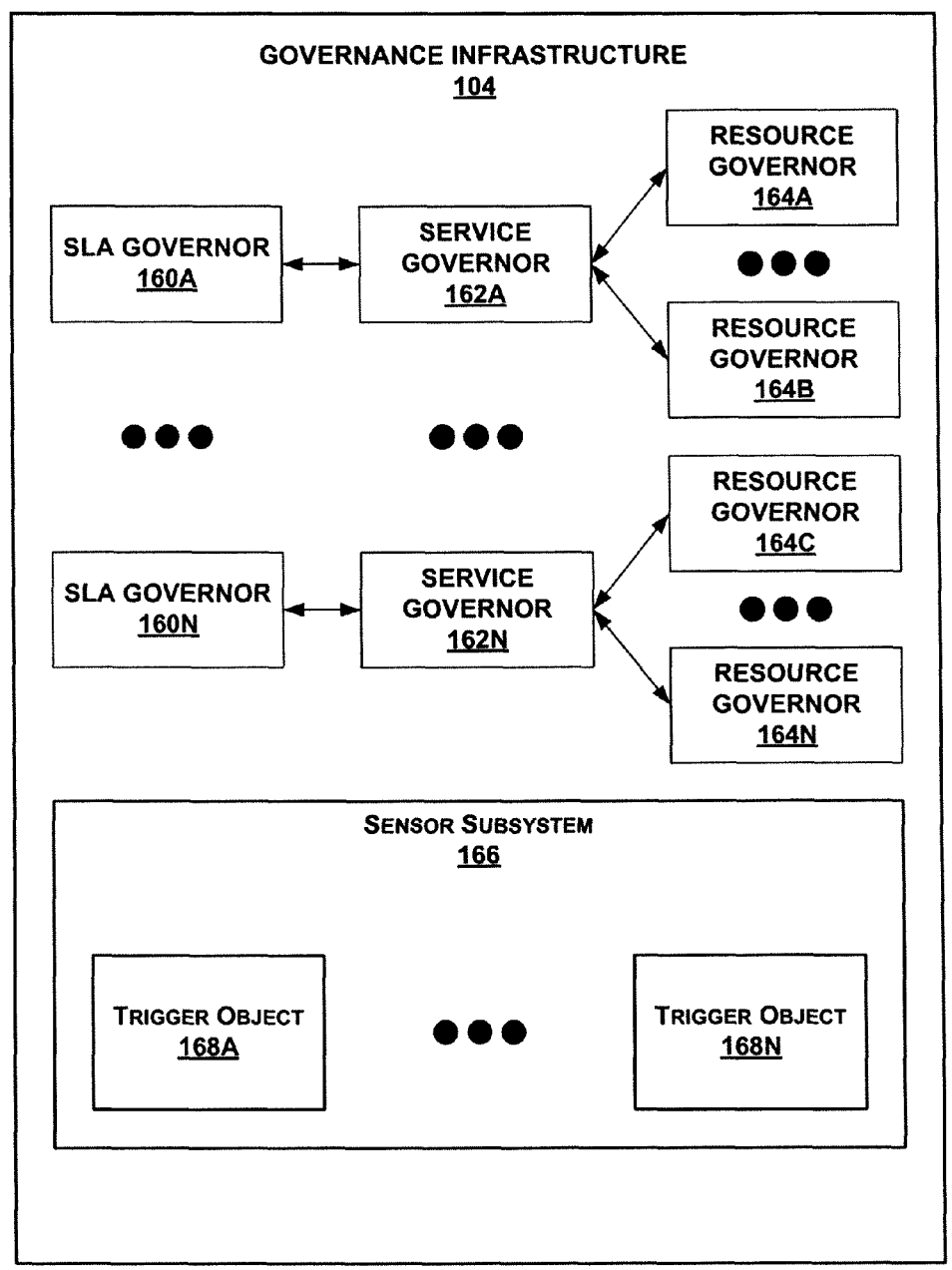
FIG. 5 is a block diagram illustrating example details of a governance infrastructure.

FIG. 5 is a block diagram illustrating example details of governance infrastructure 104. As illustrated in the example of FIG. 5, governance infrastructure 104 may comprise SLA governors 160A through 160N (collectively, "SLA governors 160"). Furthermore, governance infrastructure 104 may comprise service governors 162A through 162N (collectively, "service governors 162"). In addition, governance infrastructure 104 may comprise resource governors 164A through 164N (collectively, "resource governors 164").

The behavior and interrelationships between SLA governors 160, service governors 162, and resource governors 164 may be defined by service definition objects. A service definition object may be a software object that includes parameters that define a service. These parameters may specify export and import parameters, asset declarations, asset consumption parameters, constraint parameters, blocked attribute parameters, monitored value parameters, priority parameters, sharing parameters, maximum resource parameters, external reference parameters, service configuration parameters, and service-level agreement parameters.

The export and import parameters of a service definition object of a service specify facilities that resources associated with the service export or import. A service definition object may classify export facilities and import facilities as either "static" or "dynamic." Static export facilities and static import facilities do not include references to resources associated with the service. In contrast, dynamic export facilities and import facilities include references to resources associated with the service.

Static export facilities and static import facilities may be "attributes" or "signatures." An "attribute" may be a string of characters that identifies a set of functionality. For example, a service definition object of a first service may specify the following as a static export attribute: "attribute(ia32);". In this example, when chain assembly module 112 is identifying service chains, chain assembly module 112 may pair this service with a second service when the service definition object of the second service specifies "attribute (ia32)" as a static import facility.

An attribute may also specify a version. For example, a service definition object of a first service may specify the following as a static export attribute: "attribute (appServer, version (8, 1, 2));". This attribute may indicate that the first service provides version 8.1.2 of an application server. When chain assembly module 112 is identifying service chains, an import attribute may be matched with an export attribute that specifies a version when the import attribute does not specify any version. In addition, chain assembly module 112 may not match an import attribute with an export attribute that specifies a version when the import attribute specifies a version that includes more digits than the version specified by the export attribute. However, an import attribute may be matched with an export attribute when the import attribute includes fewer digits than the export attribute and all of the digits in the import attribute are equal to corresponding digits in the import attribute. For example, a first service definition object may specify "attribute (appServer, version (8, 1, 2))" as an export attribute and a second service definition may specify "attribute (appServer, version (8, 1, 2, 5));" as an import attribute. In this example, chain assembly module 112 may not pair a service defined by the first service definition object and a service defined by the second service definition object because the version of import attribute "attribute (appServer, version (8, 1, 2, 5))" includes more digits than the version of export attribute "attribute (appServer, version (8, 1, 2))." However, a service defined by a service definition object that specifies an import attribute "attribute (appServer, version (8, 1))" may be matched with the export attribute "attribute (appServer, version (8, 1, 2))" because this import attribute version includes fewer digits than the export attribute version and the digits in the import attribute version are equal to the corresponding digits in the export attribute version.

A service definition object may specify one or more export attributes as required export attributes. A required export attribute of a first service is an attribute that a second service must import in order for the first service to be matched to second service. In general, a service definition object of a first service may specify a plurality of export attributes. When chain assembly module 112 is identifying service chains, chain assembly module 112 may match the first service with a second service when the second service imports fewer than all of the attributes exported by the first service. For example, the service definition object of the first service may specify the export attributes "attribute (appServer, version(8, 1, 2, 5))" and "attribute(ia32)." In this example, the service definition of the second service may specify the import attribute "attribute(ia32)." Because the first service exports all of the attributes required by the second service, chain assembly module 112 may match the first service and the second service. However, if "attribute(appServer, version(8, 1, 2, 5))" is a required export attribute, chain assembly module 112 would not match the first service and the second service because the second service does not import "attribute (appServer, version (8, 1, 2, 5))." Required attributes may be denoted with the "+" symbol. For instance, "+attribute (appServer, version(8, 1, 2, 5))" denotes that "attribute(appServer, version(8, 1, 2, 5))" is a required attribute.

A service definition object may specify one or more implied export attributes. An implied export attribute is an attribute that a first service exports only when the first service imports attributes from a second service and the second service exports a particular attribute. For example, a second service may export "attribute(X)" and "attribute(Y)." A first service may import "attribute(X)" and export "attribute(Z)". Furthermore, the first service may export "attribute(A)" when the first service is matched with a service that exports "attribute(Y)". In addition, a third service may import "attribute(A)". In this example, chain assembly module 112 may match the third service and the first service only when the first service has already been matched to the second service. This is because the first service only exports "attribute(A)" when the first service has been matched to a service that exports "attribute(Y)" and the second service exports "attribute(Y)".

A service definition object may specify one or more import attributes as negated import attributes. If a service definition object for a first service specifies a negated import attribute, the first service cannot be matched with a service that exports that attribute. For example, a service definition object for a first service may specify the negated import attribute "~attribute(A)" (note the ~ indicating that the import attribute is negated). In this example, a second service may export "attribute(A)". Because the service definition of the first service cannot be matched with a service that exports "attribute (A)", chain assembly module 112 does not match the first service and the second service, even if the second service exports all of the attributes that the first service imports.

A service definition object may specify one or more import attributes in disjunctive form. In other words, chain assembly module 112 may only need to find one of the import attributes. For example, a service definition object of a first service may specify "attribute(A) or attribute(B);". In this example, chain assembly module 112 may match the first service to a second service that only exports "attribute(A)". Furthermore, in this example, it may not be necessary for chain assembly module 112 to find a third service that exports "attribute(B)".

A service definition object may also use "signatures" to specify static import facilities and static export facilities. As used herein, an export "signature" of a service is a reference to a function implemented by resources associated with the service. An import "signature" of a service is a reference to a function implemented by resources associated by other services that resources associated with this service require in order to operate. For example, a service definition object for a first service may specify the following as an export signature: "signature(int foobar(java.lang.String, int[ ] [ ], Boolean));". This means that resources associated with the first service implement the function "int foobar(java.lang.String, int[ ] [ ], Boolean)". Thus, a resource associated with a services that imports "signature(int foobar (java.lang.String, int[ ] [ ], Boolean))" may invoke the "int foobar(java.lang.String, int[ ] [ ], Boolean)" function implemented by a resource associated with the first service.

On occasion a service may import signatures having the same function name. For instance, a service may import two signatures that specify the function name "foobar". To differentiate between these two import signatures, the service definition object may provide an alias for one or more of these import signatures. For example, a service definition object may specify:
signature(int foobar(java.lang.String, int[ ] [ ], Boolean));
signature(int foobar(java.lang.String, Boolean) as foobar2);
In this example, foobar2 serves as an alias for the second foobar function.

"Dynamic" export facilities and import facilities include references to resources associated with the service. Dynamic export facilities may be divided into two categories: "properties" and "assets."

A service definition object for a service may specify one or more optional monitored value declarations. Monitored value declarations specify monitoring values that are monitored by a service governor of the service or that are monitored by resource governors of resources associated with the service. Monitored value declarations that specify monitored values that are monitored by the service governor of the service are referred to herein as "service monitored values." Monitored value declarations that specify monitored values that are monitored by the resources governors are referred to herein as "resource monitored values."

A monitored value declaration may specify one or more monitoring values in a variety of ways. For example, a monitored value declaration may specify a namespace that contains a name of a specified monitoring value, one or more collector objects in status infrastructure 102 that provide the specified monitoring value or that provides a value from which a monitored value may be derived. In addition, a monitored value declaration may specify an expression that defines the specified monitoring value as a value derived from values provided by the collector object. For example, a service definition object may include following resource monitored value declaration:

```
resourceMonitoredValues(
    namespace(system/os),
    collector(snmp, values(*), "com.collectors.snmp"),
    expression(halfLoad, snmp:load / 2)
);
```

This example resource monitored value declaration specifies the "system/os" namespace. Thus, names associated with the monitored values declared by this monitored value declaration exist within the context of the "system/os" namespace. This resource monitored value declaration also specifies that a collector object named "com.collectors.snmp" obtains status information from resources using the SNMP protocol and exposes all values collected. The expression term declares an additional monitoring value "halfLoad" that is derived by dividing the "load" value provided by the SNMP collector by two.

Monitored value declarations may also specify that only some of the values provided by a collector object are available. For example, a service definition object may include the following resource monitored value declaration:

```
serviceMonitoredValues(
    namespace(sample/module/s1),
    collector(jmx, values(xxx, yyy), "com.collectors.jmxJsr160"));
```

In this example, the "com.collectors.jmxJsr160" collector may typically provide values "xxx", "yyy", and "zzz". However, the term "values(xxx, yyy)", restricts the values provided by "com.collectors.jmxJsr160" to the values "xxx" and "yyy". If this service definition object were to specify the term "values(*)" instead of "values(xxx, yyy)", all values provided by "com.collectors.jmxJsr160" would be available (i.e., "xxx", "yyy", and "zzz").

Monitored value declarations may also specify an independent file that includes one or more monitored value declarations. For example, the following service monitored value declaration specifies an independent file that includes one or more monitored value declarations:
serviceMonitoredValues(definition(foo/bar:someSvcTypeMVDef));
In this example, "someSvcTypeMVDef" is a file name within the namespace "foo/bar". When chain assembly module 112 assembles a resource chain that includes the service, chain assembly module 112 automatically incorporates any monitored values specified in this independent file into the service definition of the service. Multiple service definition objects may include monitored value declarations that specify this independent file. In this way, each of these service definition objects may be made more concise.

Monitored value declarations may refer to a plurality of collector objects. Such monitored value declarations may use values provided by these collector objects in an expression that provides a new monitored value. For example, a service definition object may include the following monitored value declaration:

```
resourceMonitoredValues(
    namespace(system/resource),
    collector(
        snmp,
        "com.collectors.snmp",
        parameters(interval(10), heartbeat(30), timeout(20))),
    collector(
        ping,
        "com.collectors.ping",
        parameters(interval(5), heartbeat(30), timeout(20))),
    expression(online, snmp:isConnected && ping:isConnected));
```

In this example, the collectors "com.collectors.snmp" and "com.collectors.ping" do not provide any monitored values. However, the expression statement provides a monitored value "online" that is true when the "is Connected" value of the "snmp" collector is true and when the "is Connected" value of the "ping" collector is also true.

A service definition object may include zero or more asset declarations. An asset declaration defines an asset. When a service definition object of a service includes an asset declaration of an asset, the asset is "associated with" the service. As discussed above, an asset associated with a service represents an ability of a resource associated with the service to provide particular functionality. An asset declaration may specify various properties of the asset. For instance, an asset declaration may specify a name, a unit type, an expression that indicates a source of the predicted capacity level of the asset, an expression that indicates a source of the actual capacity level of the asset, an expression that indicates a source of the used capacity level of the asset, a predicted pending capacity function, a time frame over which the predicted pending capacity function is dynamic, a minimum allocation value, and a maximum allocation value.

The name of an asset may be a string that is unique within distributed computing system 2. The unit type of an asset specifies the units of the capacity level of the asset. For example, the unit type of an asset may specify that the capacity level of the asset is measured in transactions/second, kilograms, seconds, bytes, gigabytes, or another unit of measurement. As described below, the expressions that indicate sources of capacity levels specify how the capacity levels of the asset are derived. As used in this disclosure, the "used capacity level" of an asset provided by an active resource is the capacity level of the asset that is currently being used by other resources. Furthermore, as described below, chain assembly module 112 may use the minimum allocation value and the maximum allocation value in determining whether a resource can be used in a new resource chain. For example, a service definition object may specify the following asset declaration:

```
asset{
    /* Specify "asset_Foo" as the name of this asset. */
    name("asset_Foo"),
    /* Specify "gigabytes" as the units associated with the capacity levels of
    this asset */
    units("gigabytes"),
    /* Specify 50 gigabytes as the predicted full capacity level of this asset.
    */
    predictedFullCapacity(50),
    /* Specify "this.predictedFullCapacity" as source of actual capacity
    information. */
    actual(this.predictedFullCapacity),
    /* Specify the reserved capacity level of this asset as the source of the
    used capacity level of the asset. */
    used(this.reserved),
    /* Function relating predicted pending capacity and time. */
    predictedPendingFunction(f_exponential),
    /* Specify 25 gigabytes as the minimum allocation for this asset and 50
    gigabytes as the maximum allocation for this asset. */
    minAllocation(25),
    maxAllocation(50)
}
```

The actual capacity levels of assets provided by resources may rise from an initial capacity level to a full capacity level at different rates. For example, a hardware resource may provide a "number of processors" asset that model the number of processors in the hardware resource. In this example, the capacity level of the "number of processors" asset is at full capacity from the time that chain assembly module 112 instructs the hardware resource to start. Note that the capacity level of the "number of processors" asset changes in a very different manner than the exemplary "response time to credit card transaction" asset described in the previous paragraph. Because the capacity levels of assets provided by resources may rise from an initial capacity level at different rates, each asset object may be associated with a different predicted pending capacity function that specifies a relationship between a predicted pending capacity level of an asset and a length of time after a resource that provides the asset was instructed to start.

As discussed briefly above, an asset declaration for an asset may specify an expression that defines a source of a capacity level of the asset. An expression that defines a source of a capacity level of an asset may be a combination of numbers, references to other capacity levels of the asset, references to capacity levels of other assets, monitored values, and possibly other information that evaluates to a numerical value.

An asset declaration for an asset may specify that a capacity level of the asset is based on a monitored value. A monitored value is a type of status data produced by status infrastructure 102 that includes a current value of a particular feature. For example, an asset declaration for an asset may specify an expression "CPUspeed*NormalizingConstant" as a source of the predicted full capacity level of the asset. In this example, "CPUspeed" may be the name of a monitored value representing the clock speed of a processor resource, "NormalizingConstant" may be a numerical value to normalize the clock speed of the processor for comparison, and the "*" represents multiplication. In this example, a service definition object may include the following asset declaration for a "CPUcycles" asset:

```
asset(
    name(system/CPUcycles),
    units(Mgz),
    predictedFullCapacity(CPUspeed*NormalizingConstant),
    actual(this.predictedFullCapacity),
    used(this.reserved),
    minAllocation(this.predictedFullCapacity)
}
```

In this example asset declaration, the predicted full capacity level of the asset is the source of the actual capacity level of the asset, the reserved capacity level of the asset is the source of the used capacity level of the asset, and the predicted full capacity level of the asset is the source of the minimum allocation of the asset.

An asset declaration for an asset may specify an expression that defines a source of a capacity level of the asset in terms of a capacity level of another asset. In other words, the source of a capacity level of a first asset may be based on (i.e., built from) a capacity level of a second asset. For example, let a service definition object of a first service include an asset declaration for an asset named "asset1". Furthermore, in this example, a service definition object of a second service may include an asset declaration for an asset named "asset2" that specifies the predicted full capacity level as "asset1.predictedFullCapacity". By specifying the predicted full capacity level of "asset2" as the predicted full capacity of "asset1", the asset declaration for "asset2" indicates that the predicted full capacity of "asset2" is equal to the predicted full capacity of "asset1". In this example, the service definition object of the second service may include an asset declaration "asset2" that specifies "predictedFullCapacity(asset1.predictedFullCapacity)", thereby specifying that the predicted full capacity level is "asset1.predictedFullCapacity".

In another example, a service definition object for a BEA WebLogic™ service may include the following asset declaration in which a predicted full capacity level of a "com.bea.w1/WLThreads" asset is based on a predicted full capacity level of a "system/numCPUs.predictedFullCapacity" asset:

```
asset {
    name(com.bea.w1/WLThreads),
    units(processingThreads),
```

-continued

```
    // 20 threads per CPU
    predictedFullCapacity(system/numCPUs.predictedFullCapacity * 20),
    actual(this.pending),
    used(this.actual − com.beaw1/idleThreads)
    ...
}
```

In another example, a service definition object for an Apache™ web server service may include the following asset declaration in which a predicted full capacity level of a "httpTransactions" asset is based on a function "myFunction" that takes as parameters the predicted full capacity levels of a "system/CPUcycles" asset, a "system/PhysicalMemory" asset, and a "system/NumCPUs" asset:

```
asset {
    name(httpTransactions),
    units(httpTransactionsPerSec),
    predictedFullCapacity(
        myFunction(system/CPUcycles.predictedFullCapacity,
            system/PhysicalMemory.predictedFullCapacity,
            system/NumCPUs.predictedFullCapacity)
    ),
    ...
}
```

Because the source of a capacity level of a first asset may be based on a capacity level of a second asset, the first asset may "reintroduce" the capacity level of the second asset. In one exemplary implementation, a first asset "reintroduces" the capacity level of a second asset when the first asset has the same name as the second asset and the asset declaration of the first asset specifies as a source of a capacity level, the same capacity level of the second asset. For example, a service definition object for a virtual machine service may include an asset declaration for a "memory" asset. The asset declaration may "reintroduce" the "memory" asset provided by lower-level resources in resource chains that include resources that provide the virtual machine service. The asset declaration may "reintroduce" the "memory" asset by defining the source of the predicted full capacity level of the "memory" asset as the predicted full capacity level of a "memory" asset as provided by lower-level resources in resource chains that include resources that provide the virtual machine service. For instance, in order to do this, the service definition object for the virtual machine service may include an asset declaration for the "memory" asset that specifies "predictedFullCapacity (predictedFullCapacity)". In this instance, the predicted full capacity level of the "memory" asset provided by a first resource associated with the virtual machine service is the same as the predicted full capacity level of the "memory" asset provided by a second resource associated with a second service, when the first resource and the second resource are part of the same resource chain. A complete asset declaration for the "memory" asset of the virtual machine service may appear as:

```
asset{
    system/physicalMemory,
    MB,
    predictedFullCapacity(predictedFullCapacity),
    actual(snmp/totalPMem),
    used(this.actual − snmp/pmemoryFree),
    predictedPendingCapacity(ppcFunction, delayInterval),
    minAllocation(64)
    maxAllocation( )
}
```

When an asset declaration for a first asset associated with a first service specifies that a capacity level of the asset is based on a capacity level of a second asset associated with a second service, the capacity level of the first asset as provided by a first active resource in a resource chain is based on the capacity level of the second asset as provided by a second active resource in the same resource chain. The first resource is associated with the first service and the second resource is associated with the second service. For example, a service definition object of a "credit card transaction service" may include an asset declaration of a "processing time" asset. Furthermore, in this example, a service definition of object of a "database" service may include an asset declaration of a "record retrieval time" asset. In this example, the asset declaration of the "processing time" asset may specify that a source of the predicted full capacity level of the "processing time" asset is two times the predicted full capacity level of the "record retrieval time" asset. In this example, a resource chain may include a first resource associated with the credit card transaction service and a second resource associated with the database service. The predicted full capacity level of the "processing time" asset as provided by the first resource is equal to two times the predicted full capacity level of the "record retrieval time" asset as provided by the second resource.

When administrative interface module 108 receives a service definition object that includes an asset declaration for an asset, control configuration module 119 may use the asset declaration to generate one or more asset objects. An asset object may be a software object that calculates capacity levels of the asset (i.e., the capacity of a resource to perform a particular act). Control configuration module 119 may generate an asset object based on an asset declaration in a service definition object of a service for each anticipated resource associated with the service when administrative interface module 108 receives the service definition object. Furthermore, as described below, chain assembly module 112 may, based on an asset declaration in a service definition object of a service, generate an asset object for a resource associated with the service when chain assembly module 112 dynamically creates the resource during a chain assembly process.

In order to generate an asset object based on an asset declaration of an asset, control configuration module 119 may parse the asset declaration. When control configuration module 119 parses the asset declaration, control configuration module 119 may identify a string that specifies a name, a string that specifies a type of unit, a string that specifies an expression that describes a source of the predicted full capacity level of the asset, a string that specifies an expression that describes a source of the actual capacity level of the asset, a string that specifies a used capacity level of the asset, a string that identifies a predicted pending capacity function, an integer that specifies a length of time over which the predicted pending capacity function rises to the predicted full capacity level, a numerical value indicating a minimum capacity allocation, and a numerical value indicating a maximum capacity allocation. After identifying these items, control configuration module 119 may provide these items as parameters to a "createAsset" method of a software object that implements an "Asset Factory" interface. When control configuration module 119 provides these items as parameters to the "createAsset" method, the "createAsset" method may return to control configuration module 119 a reference to a new asset object. Control configuration module 119 may then configure one or more of SLA governors 160 and/or chain assembly module 119 to use the reference to the new asset object. In one exemplary implementation, the "AssetFactory" interface may appear as follows:

```
Interface AssetFactory {
/* Constructor method */
Asset createAsset(
final String name,
    final String units,
    final String predicted_full_capacity_expression,
    final String actual_capacity_expression,
    final String used_capacity_expression,
final String predictedPendingCapacityFunction,
    final int decayTime,        // for decayFunction in secs
    final Numerical minimum_allocation,
    final Numerical maximum_allocation);
}
```

An asset object for an asset may implement an interface that enables governance infrastructure 104 and chain assembly module 112 to access the capacity levels of the asset. For example, each asset objects may implement the following interface:

```
Interface Asset {
/* Operations that return capacity levels */
double getActualCapacity( );
double getPredictedFullCapacity( );
double getPredictedPendingCapacity(double time);
double getCurrentCapacity( );
double getUsedCapacity( );
double getReserved( );
/* Operations that return allocation limits */
double getMinAllocation( );
double getMaxAllocation( );
/* Operation to reserve capacity of the asset */
void reserveCapacity(final Numerical neededUnits);
String getName( );
String getUnits( );
set<String> getImportedAssetsandMVs( );
}
```

In this exemplary interface, the "getActualCapacity( )" method of an asset object for an asset returns a double value that represents the actual capacity level of the Asset object. When invoked, the "getActualCapacity( )" method may evaluate the expression that was specified as the source of the actual capacity level of the asset, thereby computing the actual capacity level of the asset (i.e., the actual capacity level of a resource to perform an act). As discussed above, the expression may be based on other capacity levels of the asset, capacity levels of other assets, monitored values, or other types of information. For example, status infrastructure 102 may provide a monitored value that indicates a number of requests in a queue of credit card transaction request and may provide a monitored value that indicates a current processor load. In this example, the asset object may be associated with a "response time to credit card transaction" asset. When invoked, the "getActualCapacity( )" method of asset object 414A may use the monitored values to compute the actual capacity level of the "response time to credit card transaction" asset.

Furthermore, when invoked, the "getActualCapacity( )" method may use capacity levels of other ones of asset objects 414 to compute the actual capacity level of the asset. In other words, the actual capacity level of an asset may be based on the actual capacity levels of other assets. For example, the actual capacity level of the "response time to credit card transaction" asset may be dependent on the actual capacity level of a "free random access memory" asset and an "unused network bandwidth" asset. In this example, the "getActualCapacity( )" method of the "response time to credit card transaction" asset may invoke the "getActualCapacity( )" method of the "free random access memory" asset and may invoke the "getActualCapacity( )" method of the "unused network bandwidth" asset to obtain information needed to compute the actual capacity level of the "response time to credit card transaction" asset.

In addition to the "getActualCapacity( )" method, the "Asset" interface includes a "getPredictedFullCapacity( )" method, when invoked, evaluates the expression that the asset declaration specified as a source of the predicted full capacity level of the asset, thereby computing the predicted full capacity level of the asset. As discussed above, the expression may be based on other capacity levels of the asset, capacity levels of other assets, monitored values, or other types of information. Furthermore, this exemplary "Asset" interface includes a "getPredictedPendingCapacity( )" method, when invoked, evaluates the expression that the asset declaration specified as a source of the predicted pending capacity level of the asset at the current time.

The exemplary "Asset" interface also includes a "getCurrentCapacity( )" method. The "getCurrentCapacity( )" method returns the current capacity level of the asset. In order to return the current capacity level of the asset, the "getCurrentCapacity( )" method may obtain the predicted pending capacity level of the asset by invoking the "getPredictedPendingCapacity( )" method and may obtain the actual capacity level of the asset by invoking the "getCurrentCapacity( )" method of the asset. After obtaining the predicted pending capacity level of the asset and the actual capacity level of the asset, the "getCurrentCapacity( )" method may compute the current capacity level of the asset by adding the predicted pending capacity level of the asset and the actual capacity level of the asset.

The exemplary "Asset" class also includes a "getUsedCapacity( )" method. The "getUsedCapacity( )" method returns the used capacity level of the asset. When invoked, the "getUsedCapacity( )" method may evaluate the expression specified as the source of the used capacity level of the asset, thereby calculating the used capacity level of the asset. As used in this disclosure, the "used capacity level" of a running asset is the capacity level of the asset that is currently in use. For example, the actual capacity level of a "hard disk space" asset is 100 gigabytes. In this example, if 50 gigabytes of hard disk space is in use, the used capacity level of the "hard disk space" asset is 50 gigabytes.

In addition, the exemplary "Asset" interface includes a "getReserved( )" method. The "getReserved( )" method returns a capacity level that indicates how much of the asset's predicted full capacity level chain assembly module 112 has reserved when assembling resource chains that include a resource that provides the asset.

The exemplary Asset interface described above also includes methods that return basic information about an Asset object. For instance, the exemplary Asset class includes a "getName( )" method that returns the "name" value associated with the Asset object. Furthermore, the exemplary Asset class includes a "getUnits" method that returns the "units" value associated with the Asset object.

The exemplary Asset interface also includes a "getMinAllocation( )" method and a "getMaxAllocation( )" method. The "getMinAllocation( )" method of the asset returns a minimum capacity level of the asset that can be allocated to a resource that uses the asset. The "getMaxAllocation( )" method of the asset returns a maximum capacity level of the asset that can be allocated to a resource that uses the asset. If no maximum allocation has been defined for the asset, the "getMinAllocation( )" method may return the value zero.

A service definition object may specify one or more optional "capacity consumption" parameters. A "capacity consumption" parameter in a service definition object of a service specifies that resources associated with the service consume a specific capacity level of an asset provided by a resource associated with a different service. For example, a service definition object of a first service may specify the following capacity consumption parameter:
capacityConsumption: uses(collage/base:physicalMemory, 6.0);
This example capacity consumption parameter indicates that resources associated with the first service may be anticipated to consume (i.e., use) 6.0 gigabytes of physical memory. In this example, when chain assembly module 112 is determining whether the first service can be matched with a second service, chain assembly module 112 may invoke method getAsset("resourceX/collage/base:physicalMemory").getReserved( ) an asset object for an asset named "collage/base:physicalMemory" provided by a resource "resourceX" in order to determine a capacity level of the asset "collage/base:physicalMemory". In this example, the asset "collage/base:physicalMemory" may model physical memory provided by a resource (i.e., the capacity of the resource to perform an act of providing physical memory). When chain assembly module 112 invokes this method of the asset object, the asset object may return a reserved capacity level of 50.0, indicating that 50.0 megabytes of physical memory provided by resource "resourceX" have been reserved for use by other resources. Thus, if chain assembly module 112 deploys a resource associated with the first service to a chain such that the resource is dependent on resource R, the reserved capacity level of the asset by increase to 56.0 megabytes.

In addition, chain assembly module 112 may determine whether the used capacity level of an asset provided by a resource exceeds the reserved capacity level of the resource. In this situation, chain assembly module 112 may only assemble a resource chain that include the resource when chain assembly module 112 determines that the resource provides sufficient capacity to perform the first act in addition to the used capacity level of the asset (i.e., the capacity of the asset to perform the first act).

By default, chain assembly module 112 may not deploy a resource associated with a service to a resource chain when the unreserved capacity level of an asset provided by the resource is not sufficient to satisfy the capacity consumption parameters specified by the service definition object of the service. The "unreserved" capacity level of an asset may be equal to the difference between the current capacity level of the asset and the reserved capacity level of the asset. Continuing the previous example, if the unreserved capacity level of the "collage/base:physicalMemory" asset as provided by the "resourceX" resource is 3.0, (i.e., a value less than the capacity consumed by resources associated with the first service) "resourceX" would not provide a sufficient amount of physical memory to satisfy the capacity consumption parameters specified by the service definition object of the first service. For this reason, chain assembly module 112 may not assemble a resource chain that includes resources associated with the first service and the resource "resourceX".

Service definition objects may also specify one or more optional constraint parameters. Chain assembly module 112 may use constraint parameters specified by a service definition object of a service to determine whether an underlying resource can support the deployment of a resources associated with the service. Constraints may comprise expressions over capacity levels of assets and dynamic properties. For example, a service definition object of a service may specify the following constraint parameter:
constraints: collage/base:physicalMemory>=6.0;
This example constraint parameter may indicate to chain assembly module 112 that resources associated with the service may only be deployed to a resource chain when resources of the resource chain provide to a resource of the service an unreserved capacity level of the "collage/base:physicalMemory" asset that is greater than or equal to 6.0 gigabytes.

A service definition object may also specify one or more dynamic export or import properties. A dynamic export or import property represents a non-consumable resource feature that chain assembly module 112 may use when checking whether resource chains comply with constraint requirements. Chain assembly module 112 may retrieve an object associated with an export or import property by invoking a method of a resource action module associated with the export or import property that returns the object associated with the export or import property. The object associated with the export or import property may be an object of any type. For example, chain assembly module 112 may invoke a method "(onlinePortStructure)Object getProperty(String propertyName)". This method returns an object of a generic type "Object" that is associated with a property named by the parameter "propertyName." The object of type "Object" is then immediately cast into an object of type "onlinePortStructure".

Chain assembly module 112 may provide special operations that support properties that return map objects. For example, a service definition object may use the following map operators:
P in S (P a key of map S)
P not in S (P not a key of map S)
S==S2 (S, S2 contain the same entries)
S !=S2 (S, S2 do not contain the same entries)
S<S2 (S subset of S2)
S # S2 (S disjoint with S2)
S{<key>} (value associated with key in S; null if no associated value) any <var> in S, <expression involving var>;
Service definition objects may use these map operations when declaring export properties. For instance, a service definition object may specify "property(foo, "a"=5, "b"="xyz"));" as an export property. "property(foo, {"a"=5, "b"="xyz"});" may indicate that property "foo" maps the value "a" to "5" and maps the value "b" to the "xyz".

A service definition object may specify one or more constraint parameters that refer to import properties. For example, a service definition object of a service may specify the following import parameter and the following constraint parameter:

```
imports: {
    property(collage/base:onlinePorts);
}
constraints: {
```

-continued

```
    collage/base:port in collage/base:onlinePorts;
}
```

The import parameter and the constraint parameter of this example indicate that chain assembly module 112 may not deploy resources associated with the service unless "port" is one of the onlinePorts provided by a resource associated with a lower-level service.

A service definition object may optionally specify one or more imported attributes as "blocked" attributes. For instance, by default, attributes imported by a service are available for use by resources associated with services that are dependent on resources associated with the service. However, when a service definition object specifies a particular attribute as a blocked attribute, that attribute is not available to resources associated with services that are dependent on resources associated with the service. For example, a software application may operate in an operating environment provided by an operating system and the operating system may operate in an operating environment provided by a computing node that exports an attribute of executing IA32 instructions attribute(ia32) and exports an attribute of direct control of hard disks attribute(disk_control). In this example, attribute(ia32) is imported by the operating system, but is still available to the software application. Thus, if the software application imports attribute(ia32), chain assembly module 112 may assemble a chain in which the software application is dependent on the operating system, even though the operating system does not explicitly export the attribute(ia32). However, the operating system may block the attribute of direct control of hard disks by including the following

```
blocked: {
    attribute(disk_control);
}
```

In this way, the service definition object of the operating system service indicates to chain assembly module 112 that services that are dependent the operating system service cannot use attribute(disk_control).

A service definition object of a service may specify an optional priority for the service. Automation infrastructure 102 may use this priority when determining whether to harvest resources associated with this service. For example, a service definition object of a first top-level service may specify a priority of 16 and a service definition object of a second top-level service may specify a priority of 32. In this example, automation infrastructure 102 may determine that it is necessary to harvest resources in order to provide a particular top-level service. When this occurs, automation infrastructure 102 may harvest resources from resource chains that provide the first top-level resource rather than from resource chains that provide the second top-level resource because the service definition object of the second top-level resource specifies a higher priority than the service definition object of the first top-level resource. If a service definition object of a service does not specify a priority, the service may be presumed to have a priority of zero (i.e., the lowest priority).

A service definition object of a service may specify an optional sharing parameter. Sharing parameters determine whether or not resources associated with other services may import facilities that are exported by resources in resource chains that include resources associated with this service. In one example implementation, a service definition object may specify one of an "allow" sharing parameter, a "below" sharing parameter, or a "deny" sharing parameter. In this example implementation, if a service definition object does not specify a sharing parameter, chain assembly module 12 may use resources associated with the service as though the service definition object had specified an "allow" sharing parameter.

An "allow" sharing parameter indicates that one or more resources associated with other services may share any resource in a resource chain that includes resources associated with the service. For instance, distributed computing system 2 may include a first resource, a second resource, a third resource, and a fourth resource. If a service definition object of a service with which the fourth resource is associated specifies an "allow" sharing parameter, the second resource and the third resource may both operate within an operating environment provided by the first resource and the fourth resource may operate within an operating environment provided by the third resource. Alternatively, the fourth resource may be used in a resource chain in which the fourth resource operates in an operating environment provided by the first resource and the second resource and the third resource operate within an operating environment provided by the fourth resource.

A "below" sharing parameter indicates that one or more resources may share any resource in a resource chain below a resource associated with the service. For instance, distributed computing system 2 may include may include a first resource, a second resource, a third resource, and a fourth resource. If a service definition object of a service with which the fourth resource is associated specifies a "below" sharing parameter, the second resource and the third resource may operate within an operating environment provided by the first resource and the fourth resource may operate within an operating environment provided by the third resource. However, because the service definition object specifies a "below" sharing parameter, the fourth resource may not be used in a resource chain in which the fourth resource operates in an operating environment provided by the first resource and the second resource and the third resource operate within an operating environment provided by the fourth resource.

A "deny" sharing parameter indicates that no resource may share any resource in a resource chain that includes a resource associated with the service. For instance, distributed computing system 2 may include may include a first resource, a second resource, a third resource, and a fourth resource. If a service definition object of a service with which the fourth resource is associated specifies a "deny" sharing parameter, the fourth resource may not be used in a resource chain in which the second resource and the third resource operate within an operating environment provided by the first resource and the fourth resource operates within an operating environment provided by the third resource. In addition, because the service definition object specifies a "deny" sharing parameter, the fourth resource may not be used in a resource chain in which the fourth resource operates in an operating environment provided by the first resource and the second resource and the third resource operate within an operating environment provided by the fourth resource.

A service definition object may also specify an optional "max resources" parameter. If resources associated with a service must be customized in order to operate, a service definition object of the service may be required to specify a "max resources" parameter. A "max resources" parameter of a service definition object for a service may indicate a number of resources associated with the service that may be customized. Because these resources must be customized in order to operate, this number may indicate the maximum number of resources associated with the service that may be used within distributed computing system 2.

A service definition object for a service may specify a service governor that operates in governance infrastructure 104. For example, a service definition object may include the following to specify a service governor:
serviceClass: com.sample.ExampleServiceClass;
In this example, "com.sample.ExampleServiceClass" is a name of a service governor that governs a service defined by the service definition object.

In addition, a service definition object may specify a resource governor that operates in governance infrastructure 104. For example, a service definition object may include the following to specify a resource governor:
resourceClass: com.sample.ExampleResourceClass;
In this example, "com.sample.ExampleResourceClass" is a name of a resource governor that governs resources associated with the service defined by the service definition object.

If the service defined by the service definition object is a top-level service, the service definition object may also specify an SLA governor that operates in governance infrastructure 104. For example, a service definition object may include the following to specify a SLA governor:
slaClass: com.sample.ExampleSLAClass;
In this example, "com.sample.ExampleSLAClass" is a name of a SLA governor that determines whether distributed computing system 2 provides capacity levels of one or more capacities associated with the service defined in the service definition object satisfy a service-level agreement.

A service definition object for a top-level service may specify one or more parameters that determine how many resources of the top-level service should be running in distributed computing system 2. For example, a service definition object of a top-level service may specify the following top-level service parameters:

```
sla {
    min(1);
    max(4);
    lowThreshold("collage/base:resourceCount", 2);
    highThreshold("collage/base:resourceCount", 4);
}
```

In this example, the "min(1)" parameter of the service definition object specifies that distributed computing system 2 should run at least one resource associated with the top-level service and the "max(4)" parameter specifies that distributed computing system 2 should run no more than four resources associated with the top-level service. Furthermore, the "lowThreshold("collage/base: resourceCount", 2)" parameter indicates that control configuration module 119 should configure a one of SLA governors 160 associated with the top-level service to instruct chain assembly module 112 to assemble an additional resource chain that provides the top-level service when the current capacity level of the "collage/base:resourceCount" asset falls below "2". The "highThreshold("collage/base:resourceCount", 4)" parameter indicates that control configuration module 119 should configure the one of SLA governors 160 associated with the top-level service to instruct chain assembly module 112 to disassemble a resource chain that provides the top-level service when the current capacity level of the "collage/base:resourceCount" asset exceeds "4".

As illustrated in the example of FIG. 5, governance infrastructure 104 includes a sensor subsystem 166. Sensor subsystem 166 receives monitoring data from monitoring infrastructure 102 and outputs events based on the monitoring data. SLA governor 160, service governors 162, and resource governors 164 may receive events from sensor subsystem 166 and output action requests based on the events.

In order to output events based on monitoring data, sensor subsystem 166 may receive an ongoing, dynamic stream of monitoring data from status infrastructure 102. As discussed above, this monitoring data may represent an actual state of distributed computing system 2. Sensor subsystem 166 may use the monitoring data to maintain ongoing, calculated values. Sensor subsystem 166 may then use these calculated values to generate events. For example, sensor subsystem 166 may use monitoring data that indicates the instantaneous processing load of computing nodes in resource chains that provide functionality of a top-level service in order to calculate a weighted moving average of the processing load of these computing nodes. If the weighted moving average of the processing load for these computing nodes exceeds a given threshold (e.g., 95%), sensor subsystem 166 may output an event that indicates that distributed computing system 2 may not currently have sufficient capacity to provide the top-level service.

Administrator 12 may customize sensor subsystem 166 by adding pluggable trigger objects 168A through 168N (collectively, "trigger objects 168") to sensor subsystem 166. Trigger objects 168 may perform arbitrary data aggregations. Each of trigger objects 168 may be registered under a compound name based on the entity being monitored and the type of data being gathered. For example, trigger object 168A may be defined to aggregate and compute an average computing load for a set of resource chains that provide a top-level service every five minutes. SLA governor 160, service governors 162, or resource governors 164 may request the aggregated data based on the registered names.

Sensor subsystem 166 may communicate the events to SLA governors 160, service governors 162, or resource governors 164 on a periodic or event-driven basis. For example, SLA governors 160 may register interests in a particular event with sensor subsystem 166 and request updates at a specified frequency. In response, sensor subsystem 166 may interact with status infrastructure 102 to generate the aggregated data required by SLA governors 160.

SLA governors 160 may be software objects that operate in the operating environment provided by governance infrastructure 104. Each of SLA governors 160 invoke methods of asset objects to receive capacity levels of an asset associated with a top-level service as provided by individual operational resources associated with the top-level service. When SLA governors 160 receive current capacity levels of an asset associated with a top-level service as provided by the individual resources, the SLA governors may sum the current capacity levels of the asset in order to calculate an overall current capacity level of the asset associated with the top-level service. SLA governors 160 may determine then whether the overall current capacity levels of the asset associated with the top-level service satisfies a service-level agreement. If one of SLA governors 160 determines that an overall current capacity level of an asset associated with a top-level service is not in compliance with a service-level agreement (i.e., the capacity level is "too low"), the SLA governor may output events that cause distributed computing system 2 to enhance the overall current capacity level of the asset associated with the top-level service. In addition, if one of SLA governors 160 determines that an overall current capacity level of an asset associated with a top-level service exceeds a capacity level required by a service-level agreement (i.e., the capacity level is "too high"), the SLA governor may output events that cause distributed computing system 2 to provide a lower overall capacity level of the asset associated with the top-level service. Causing distributed computing system 2 to provide a lower overall current capacity level may make resources available to provide other services.

When administrator 12 installs a service definition object, control configuration module 119 may automatically create one or more of service governors 162 in governance infrastructure 104 as specified in the service definition object. Each of service governors 162 may be a software object that operates in the operating environment provided by governance infrastructure 104. Each of service governors 162 "governs" an individual service. That is, each service governor controls how resources that provide a different service are used within the distributed computing system. Service governors 162 may govern a service by controlling statuses of resources that provide the service.

Each resource may have a status of "started", "stopped", "failed", "failed to start", "failed to stop", "available", and "allocated." A status of "started" may indicate that the resource is currently operating in a resource chain. A status of "stopped" may indicate that the resource is currently in a resource chain, but is not currently operating. A status of "failed" may indicate that an error has occurred and the resource is not operable. A status of "failed to start" may indicate that a resource is in a resource chain, but due to an error, the resource has failed to start operating despite a request to do so. A status of "failed to stop" may indicate that a resource is in a resource chain, but due to an error, the resource has failed to stop operating despite a request to do so. A status of "available" may indicate that a resource is not in a resource chain and is available to be allocated to a resource chain. A status of "allocated" may indicate that a resource has been allocated to a resource chain, but a request to start the resource has not yet been issued. Chain assembly module 112 might not identify a resource for use in a resource chain if the resource has a status of "failed", "failed to start", or "failed to stop."

Service governors 162 may update the statuses of resources governed by service governors 162 in response to events from SLA governors 160 and resource governors 164. For example, service governor 162A may receive an event that indicates that a resource associated with a service governed by service governors 162A has failed. In this example, service governor 162A may invoke a method of a service action module in action infrastructure 116 to update the status of this resource to indicate that the resource has failed. Because the resource configuration data for this resource indicates that this resource has failed, chain assembly module 112 does not identify candidate resource chains that include this resource.

As described in detail below, chain assembly module 112 uses the statuses of resources when identifying candidate resource chains. For example, if a resource has the status "started", chain assembly module 112 may take steps to harvest the resource in order to assemble a resource chain that includes the resource.

When administrator 12 configures distributed computing system 2 to use a resource, administrator 12 may install one of resource governors 164 in governance infrastructure 104. Each of resource governors 164 governs a process by which an individual one of the resources starts providing or stops providing a service. As described in detail below, each of resource governors 164 may output action requests to resource action modules in action infrastructure 116. These action requests may request the resource action module to communicate with the resources to instruct the resources to perform various activities relating to the start-up or shut-down of individual resources.

SLA governors 160, service governors 162, and resource governors 164 may provide events to one another. For example, ones of SLA governors 160 may provide events to ones of service governors 162. Furthermore, each of service governors 162 may provide events to ones of resource governors 164 that govern resources of the service governed by the service governor. For example, resource governor 164A and resource governor 164B may govern resources of a particular service. Service governor 162A may govern that service. In this example, resource governors 164A and 164B may provide events to service governor 162A and service governor 162A may provide events to resource governors 164A and 164B.

Resource governors 164 may also provide events to other resource governors 164. Individual ones of resource governors 164 may be assembled into chains of resource governors. A chain of resource governors governs the behavior of a resource chain. For example, a web server application may operate within an operating environment provided by a Linux operating system, and the Linux operating system may operate within an operating environment provided by an x86 computing node. In this example, the x86 computing node, an instance of the Linux operating system, and an instance of the web server application each represent individual resources. A chain of resource governors may include a resource governor to govern the x86 computing node, a resource governor to govern the Linux operating system, and a resource governor to govern the web server application.

A chain of resource governors may include a plurality of branches. Continuing the previous example, a File Transfer Protocol (FTP) server application may operate within the operating environment provided by the Linux operating system. In this example, the chain of resource governors may include a resource governor that governs the FTP server application, a resource governor that governs the web server application, a resource governor that governs the Linux operating system, and a resource governor that governs the x86 application node. The chain of resource governors in this example includes two branches because both the web server application and the FTP server application depend on the operating environment provided by the Linux operating system but do not depend on the functionality of each other to operate successfully.

A resource governor in a chain of resource governors may "propagate" events to an immediately lower resource governor in the chain of resource governors. Propagation of an event implies providing an event to one other resource governor. Continuing the previous example, the resource governor that governs the web server application may propagate an event to the resource governor that governs the Linux operating system and the resource governor that governs the FTP server application may also propagate an event to the resource governor that governs the Linux operating system. In addition, the resource governor that governs the Linux operating system may propagate an event to the resource governor that governs the x86 application node. Because, in this example, the resource governor that governs the x86 application node is the lowest resource governor in the chain, the resource governor that governs the x86 application node does not propagate events to any other resource governor. When a resource governor in a chain of resource governors receives an event propagated to the resource governor, the resource governor may output some action to a resource action module associated with the resource governed by the resource governor.

A resource governor in a chain of resource governors may also "publish" resource events to be received by immediately higher resource governors in the chain of resource governors. Publication of an event implies providing an event to one or more other resource governors. When a resource governor is initially constructed and configured into a chain of resource governors, the resource governor may be configured to "subscribe" to events published by an immediately lower resource governor in the chain. Continuing the ongoing example, the resource governor that governs the x86 application node may publish events that are received by the resource governor that governs the Linux operating system. The resource governor that governs the Linux operating system may publish events that are received by the resource governor that governs the web server application and by the resource governor that governs the FTP application.

When chain assembly module 112 receives a request for a new instance of a resource from one of service governors 162, chain assembly module 112 may configure one or more of resource governors 164 to act as a chain of resource governors. To configure one or more of resource governors 164 to act as a chain of resource governors, chain assembly module 112 may configure resource governors 164 to propagate events to and subscribe to events from a resource governor that governs a lower-level resource. For example, a resource governed by resource governor 164A may provide an operating environment in which a resource governed by resource governor 164C operates. In this example, chain assembly module 112 may configure resource governor 164C to subscribe to events published by resource governor 164A and to propagate events to resource governor 164A.

SLA governors 160, service governors 162 and resource governors 164 may be implemented in a variety of ways. In one example implementation, SLA governors 160, service governors 162, and resource governors 164 may comprise one or more rules engine. In this example, a rules engine in one of the governors matches patterns in events presented by sensor subsystem 166, another one of the governors, or action infrastructure 116. Governance infrastructure 104 may allow rule sets to be loaded in source form and compiled at load time into discrimination networks. Each rule set specifies trigger-delivered attributes. Upon loading the rule sets, a governor may establish trigger listeners to receive sensor notifications and update respective working memories of the rule engines in the governor.

Each of the rule engines may be software objects that perform logical reasoning using knowledge encoded in high-level condition-action rules. Each of the rule engines may apply automated reasoning that works forward from preconditions toward goals defined in a service-level agreement. For example, the rule engines may apply modus ponens inference rules. In this example, the rule engines may process the events, identify actions, and request that action infrastructure 116 perform the identified actions. In addition, the rule engines may provide a call-back interface so that action infrastructure 116 may inform a rule engine when an action has completed. The rule engines may prevent a particular rule from re-firing as long as any action invoked by the rule has not finished.

In another example implementation, some or all of SLA governors 160, service governors 162, and resource governors 164 may comprise finite state machines. In general terms, a finite state machine is a data structure defined by a set of states, a set of transitions, and a current state. When one of SLA governors 160, service governors 162, or resource governors 164 receives an event, the finite state machine may transition between states and performs various actions during such transitions. This disclosure refers to a finite state machines implemented by SLA governors 160 as the SLA FSMs, to finite state machines implemented by service governors 162 as service FSMs, and to finite state machines implemented by resource governors 164 as resource FSMs.

SLA FSMs may include a set of states and a set of transitions that are different than the sets of states and sets of transitions included in service FSMs and resource FSMs. Similarly, each service FSM may include a common set of states and a common set of transitions that are different than the sets of states and sets of transitions included in service FSMs and resource FSMs. Each resource FSM may include a common set of states and a common set of transitions that are different than the sets of states and sets of transitions included in the SLA FSM and service FSMs. However, each of the SLA FSMs, each of the service FSMs, and each of the resource FSMs may have different current states.

Some states in SLA FSMs, service FSMs, and resource FSMs may be "persistent states." When a service FSM or a resource FSM transitions into a persistent state, the service FSM or resource FSM may store the state variables of the service FSM or the resource FSM to state variable repository 336. If control node 6 failed while operating, control node 6 may retrieve the state variables stored in the persistent storage medium when control node 6 resumes operations. In this way, control node 6 may resume operations in the same or about the same state as before control node 6 failed.

Administrator 12 may use spreadsheets to configure finite state machines in SLA governors 160, service governors 162, and resource governors 164. For example, administrator 12 may generate a spreadsheet that defines a finite state machine by defining each state, each transition, and each action performed during each of the transitions. Administrator 12 may then provide the spreadsheet to administrative interface module 108. Administrative interface module 108 may then use the spreadsheet to configure a finite state machine in one of SLA governors 160, service governors 162, or resource governors 164. In another example, administrator 12 may provide custom Java objects that define SLA governors 160, service governors 162, and resource governors 164.

Implementations of SLA governors 160, service governors 162, and resource governors 164 that comprise finite state machines may present several advantages. For example, finite state machines may be represented in a terse format, such as a spreadsheet, that a human can easily understand. In this example, a finite state machine represented by a spreadsheet may be automatically compiled into Java code. Administrator 12 may then use administrative interface module 108 install the Java code into control node 6. In another potential advantage, finite state machines may provide better performance than rule based implementations. This may be due to the fact that, unlike rules-based implementations, finite state machines do not need to identify particular rules prior to enabling particular actions. Moreover, development of finite state machines may be simpler because finite state machines do not require sophisticated discrimination network algorithms.

Figure 6:
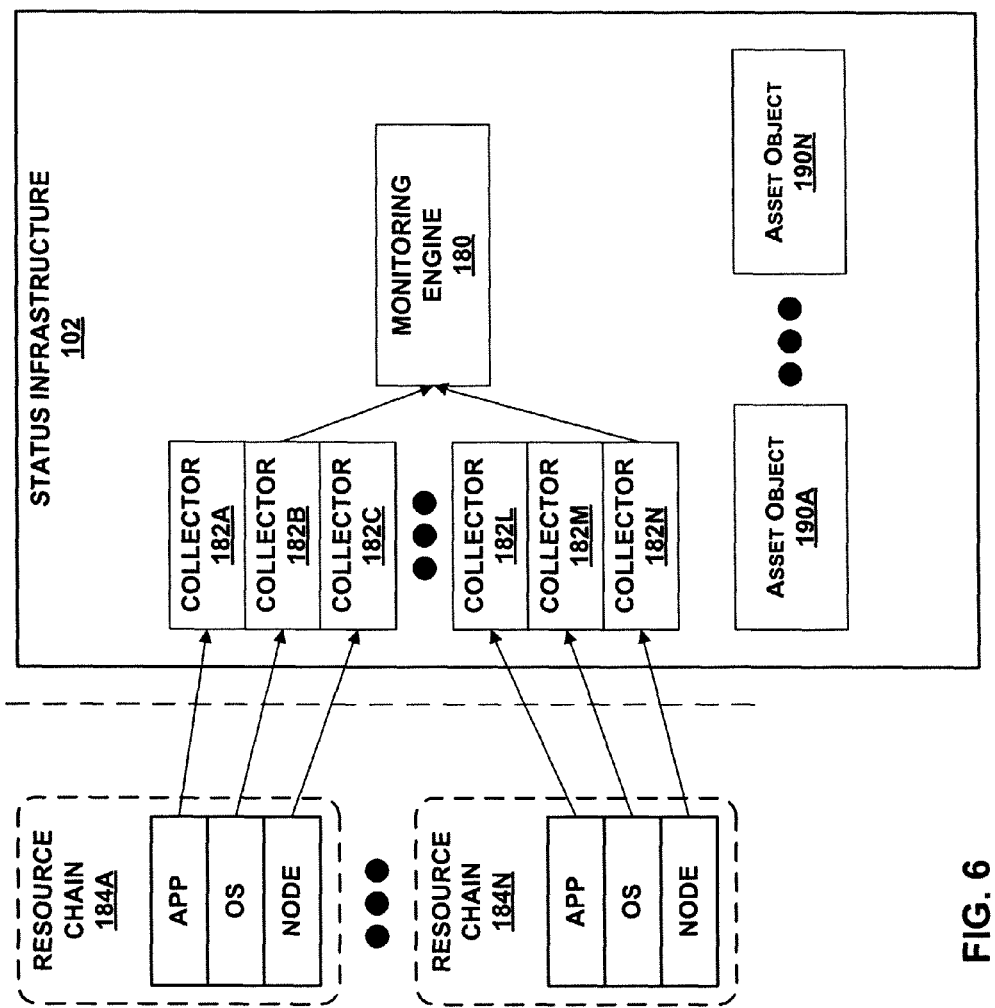
FIG. 6 is a block diagram illustrating example details of a status infrastructure.

FIG. 6 is a block diagram illustrating example details of status infrastructure 102. In general, status infrastructure 102 receives status data from resources in distributed computing system 2 and outputs monitoring data based on the status data. This monitoring data may represent a current state of distributed computing system 2. For example, status infrastructure 102 may identify, in a timely and efficient manner, any computing nodes that have failed, i.e., any node that does not respond to a request to a known resource. More generally, status infrastructure 102 provides a concise, consistent and constantly updating view of the status of distributed computing system 2.

As illustrated in the example of FIG. 4, status infrastructure 102 may include a set of collector modules 182A through 182N (collectively, "collector modules 182"). Collector modules 182 may be pluggable software objects that implement a common set of methods. For example, collector modules 182 may be Java code compiled into a jar file and loaded with a class loader at run time. When invoked, the methods may cause collector modules 182 to collect monitoring data from various resources allocated to various resource chains in distributed computing system 2. In this example, status infrastructure 102 includes collector modules 182A through 182N for collecting status data from computing node resources, operating system resources, and application resources allocated to resource chains 184A and 184N, respectively.

Status infrastructure 102 may start and stop the operation of collector modules 182 in response to action requests from governance infrastructure 104. For example, a monitoring engine 410 in status infrastructure 102 may receive collection requests from governance infrastructure 104, sort and prioritize the collection requests, and invoke an appropriate one of collector modules 182 based on the collection requests. The invoked collector module is responsible for collecting the required status data and returning the status data to monitoring engine 410. If the invoked collector module is unable to collect the requested status data, the collector module may return an error code.

Each of collector modules 182 may be associated with a configuration file written in a data description language, such as the extensible markup language ("XML"). Administrator 12 may interact with administrative interface module 108 to dynamically configure collector modules 182. For example, administrator 12 may specify the protocol or protocols to be used for monitoring resources of a service when the user installs the service. In addition, the user may specify the protocols to be used for monitoring the computing nodes and each resource. Example protocols supported by collector modules 182 may include Secure Shell ("SSH"), Simple Network Management Protocol ("SNMP"), Internet Control Message Protocol ("ICMP") ping, Java Management Extensions ("JMX"), and the Hypertext Transfer Protocol ("HTTP").

Some protocols require special privileges to perform the required data collection. For example, some protocols may require root privileges to perform the required data collection. In this case, the ones of collector modules 182 that utilize such protocols may communicate with a separate process that executes with root privilege. Moreover, some protocols may require deployment and/or configuration of data providers within the fabric. Software agents may, for example, be installed and configured on nodes and configured on other hardware.

Furthermore, as illustrated in the example of FIG. 6, status infrastructure 102 may include a set of asset objects 190A through 190N (collectively, "asset objects 190"). As described above, asset objects 190 may be software objects that represent assets. Each of asset objects 190 may present the "Asset" interface described above.

Figure 7:
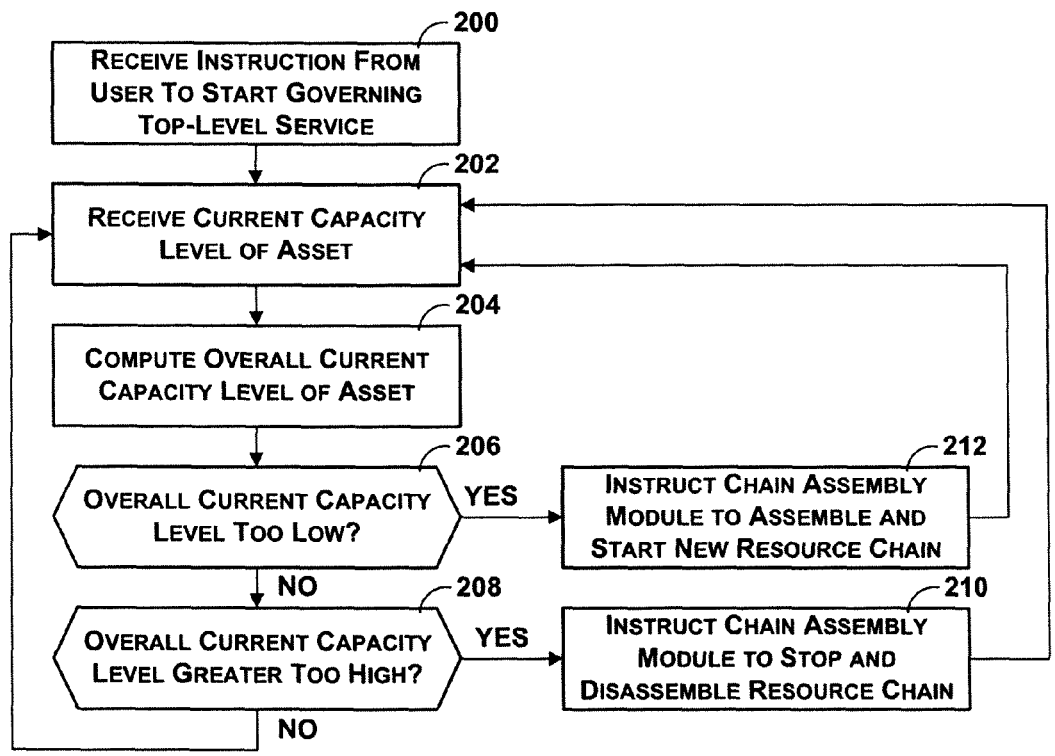
FIG. 7 is a flowchart illustrating an exemplary operation of a service-level agreement governor.

FIG. 7 is a flowchart illustrating an exemplary operation of SLA governor 160A. Although the exemplary operation illustrated in FIG. 7 is described with regard to SLA governor 160A, it should be appreciated that any of SLA governors 160B through 160N may also perform the exemplary operation illustrated in FIG. 7.

Initially, SLA governor 160A may receive an instruction initiated by administrator 12 to begin automatically governing a top-level service (200). For instance, administrator 12 may use administrative interface module 108 to instruct SLA governor 160A to begin automatically governing the top-level service.

Subsequently, SLA governor 160A may receive a current capacity level of an asset provided by an individual resource associated with the top-level service (202). After receiving the current capacity level of the asset provided by the individual resource associated with the top-level service, SLA governor 160A may compute an overall current capacity level of the asset (204). For example, each resource associated with the top-level service may provide an asset that models a given capacity. In this example, SLA governor 160A may compute the overall current capacity level of the type of asset by summing the current capacity levels of the assets provided by each of the resources associated with the top-level service.

After computing the overall current capacity level of the type of asset, SLA governor 160A may determine whether the overall current capacity level of the type of asset is less than the minimum required current capacity level of the type of asset (i.e., is "too low") (206).

If the SLA governor 160A determines that the overall current capacity level of the asset is not "too low" ("NO" of 206), SLA governor 160A may determine whether the overall current capacity level of the type of asset is greater than an excess capacity level of the type of asset (i.e., is "too high") (208). If SLA governor 160A determines that the overall current capacity level of the type of asset is "too high" ("NO" of 208), SLA governor 160A may loop back and wait until SLA governor 160A receives a current capacity level of a same or different asset provided by a resource associated with the top-level service (202), and so on. If SLA governor 160A determines that the overall current capacity level of the type of asset is "too high" ("YES" of 208), SLA governor 160A may instruct chain assembly module 112 to stop and disassemble a resource chain that provides the top-level service (210). After SLA governor 160A instructs chain assembly module 112 to stop and disassemble a resource chain that provides the top-level service, SLA governor 160A may immediately loop back and again receive a current capacity level of an asset provided by one of the resources associated with the top-level service (202), thereby beginning a new cycle of evaluating the overall current capacity level of the type of asset.

On the other hand, if SLA governor 160A determines that the overall current capacity level of the type of asset is "too low" ("YES" of 206), SLA governor 160A may instruct chain assembly module 112 to assemble and start a new resource chain that provides the top-level service (212). After SLA governor 160A instructs chain assembly module 112 to assemble and start a new resource chain that provides the top-level service, SLA governor 160A may loop back and again receive a current capacity level of an asset provided by one of the resources associated with the top-level service (202), thereby beginning a new cycle of evaluating the overall current capacity level of the type of asset.

Note that SLA governor 160A may loop back and immediately begin a new cycle of evaluating the overall current capacity level of the type of asset because the overall current capacity level of the type of asset is based on the actual capacity levels of assets in the type of asset and the predicted pending capacity levels of the assets in the type of assets. Because the overall current capacity level of the type of asset is based on the actual capacity levels of assets in the type of asset and the predicted pending capacity levels of the assets in the type of assets, the overall current capacity level of the type of asset is reflective of the likely overall current capacity level of the type of asset after the new resource chain is fully operational. Because the overall current capacity level of the type of asset is reflective of the likely overall current capacity level of the type of asset after the new resource chain is fully operational, SLA governor 160A may be immediately able to determine whether the likely overall current capacity level of the type of asset after the new resource chain is fully operational is greater than the minimum required overall current capacity level of the type of asset. In contrast, if the overall current capacity level of the type of asset were based solely on the actual capacity levels of assets in the type of assets, SLA governor 160A would have to wait a given period for the new resource chain to be fully operational before being able to accurately determine whether the likely overall current capacity level of the type of asset is greater than the minimum required overall current capacity level of the type of asset.

Figure 8:
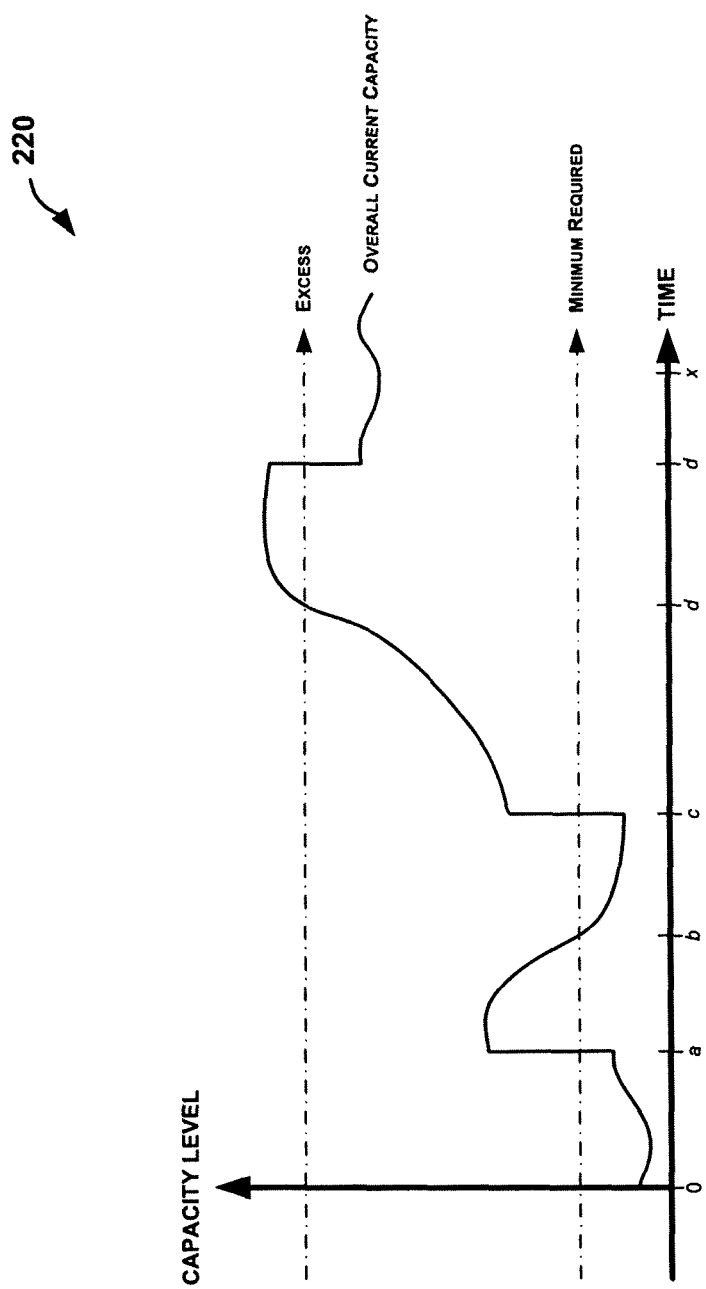
FIG. 8 is a graph that shows an exemplary overall current capacity of an asset.

FIG. 8 illustrates a graph 220 that illustrates an overall current capacity level of a type of asset provided by started resources associated with a service between a time 0 and a time x. In the example of graph 220, the solid black line indicates the overall current capacity level of a type of asset provided by resources associated with a top-level service.

The overall current capacity level of a type of asset provided by resources associated with a service may be defined in a variety of ways. For example, an overall current capacity level of a type of asset provided by resources associated with a service may be the sum of the current capacity levels of the type of assets provided by resources associated with the service. In another example, an overall capacity level of a type of asset provided by resources associated with a service may be the mean of the current capacity levels of the type of assets provided by resources associated with the service.

As discussed above, SLA governor 160A may instruct chain assembly module 112 to assemble and start a resource chain that provides a top-level service when an overall current capacity level of a type of asset provided by resources associated with the top-level service are less than capacity level required by a service-level agreement. SLA governor 160A may use one or more techniques to ensure that SLA governor 160A does not prematurely instruct chain assembly module 112 to assemble or disassemble a resource chain. In other words, the overall current capacity level of the type of asset may dip below the minimum required overall current capacity level for a short period of time before rising back above the minimum required overall current capacity level. In this circumstance, it may not be necessary for SLA governor 160A to instruct chain assembly module 112 to assemble and start another resource chain that provides the top-level service. Similarly, the current capacity level of the type of asset may rise above an excess overall current capacity level for a short period of time before sinking back below the excess capacity level. In this circumstance, it may be not be necessary for SLA governor 160A to instruct chain assembly module 112 to stop and disassemble one of the resource chains currently providing the top-level service.

If SLA governor 160A were to determine whether the overall current capacity level of the asset is less than the required overall current capacity level of the asset during this short period of time, SLA governor 160A may prematurely instruct chain assembly module 112 to assemble and start another resource chain that provides the top-level service. Accordingly, SLA governor 160A may, for example, instruct chain assembly module 112 to assemble and start another resource chain that provides the top-level service only when SLA governor 160A makes multiple determinations that the overall current capacity level of the type of asset is less than the minimum required overall current capacity level of the type of asset. In another example, SLA governor 160A may maintain a weighted moving average of the overall current capacity level of the type of asset. In this example, SLA governor 160A may instruct chain assembly module 112 to assemble and start another resource chain that provides the top-level service only when SLA governor 160A determines that the weighted moving average of the overall current capacity level of the type of asset is below the minimum required overall current capacity level. Similar exemplary techniques may be applied with regard to determining whether the overall current capacity level of the type of asset is greater than an excess overall current capacity level of the type of asset.

As illustrated in graph 220, SLA governor 160A may determine at time 0 that the overall current capacity level of a type of asset is less than the minimum required overall current capacity level of the type of asset. However, in order not to prematurely instruct chain assembly module 112 to assemble an addition resource chain that provides the top-level service, SLA governor 160A may wait until time a before making a final determination that the overall current capacity level of the type of asset is less than the minimum required overall current capacity level of the type of asset. When SLA governor 160A makes the final determination at time a that the overall current capacity level of the type of asset is less than the minimum required overall current capacity level of the type of asset, SLA governor 160A may instruct chain assembly module 112 to assemble and start a new resource chain that provides the top-level service.

When SLA governor 160A instructs chain assembly module 112 to assemble and start a new resource chain that provides the top-level service, the overall current capacity level of the type of asset may immediately rise by an amount equal to the predicted full capacity level of an asset of the type of asset provided by a resource in the resource chain associated with the top-level service. The overall current capacity level of the type of asset may immediately rise by an amount equal to the predicted full capacity level of the asset because the current capacity level of the asset is equal to the predicted pending capacity level of the asset plus the actual capacity level of the asset and the predicted pending capacity level of the asset is initially equal to the predicted full capacity level of the asset and the actual capacity level of the asset is initially equal to zero.

As illustrated in graph 220, the overall current capacity level of the type of asset may be greater than the required minimum overall current capacity level of the type of asset after SLA governor 160A instructs chain assembly module 112 to assemble and start a new resource chain that provides the top-level service. However, the rise in the actual current capacity level of the asset may not keep pace with the fall in the predicted pending capacity level of the asset, and, as a result, the current capacity level of the asset may decline. Because the current capacity level of the asset may decline, the overall current capacity level of the type of asset may also decline.

As illustrated in graph 220, the overall current capacity of the type of asset may decline to a point at time b where the overall current capacity of the type of asset is less than the minimum required current capacity level despite the addition of an addition resource chain that provides the top-level service. Consequently, SLA governor 160A may make a final determination at time c that the overall current capacity level of the top-level service is less than the minimum required current capacity level of the type of asset. Accordingly, SLA governor 160A may instruct chain assembly module 112 to assemble and start an additional resource chain that provides the top-level service. After SLA governor 160A instructs chain assembly module 112 to assemble and start the additional resource chain, the overall current capacity level of the type of asset may again be greater than the minimum required overall current capacity level.

Unlike the previous time that SLA governor 160A instructed chain assemble module 112 to assemble and start a resource chain that provides the top-level service, the overall current capacity level of the type of asset may rise over time to a point at time d where the overall current capacity level of the type of asset is greater than the excess current capacity level of type of asset. Subsequently, at time e, SLA governor 160A may make a final determination that the overall current capacity level of the type of asset is greater than the excess current capacity level of the type of asset. When SLA governor 160A makes the final determination that the overall current capacity level of the type of asset is greater than the excess current capacity level of the type of asset, SLA governor 160A may instruct chain assembly module 112 to stop and disassemble some or all of a resource chain that provides the top-level service. When SLA governor 160A instructs chain assembly module 112 to stop and disassemble the resource chain, the overall current capacity level of the type of asset may decrease by an amount equal to the actual capacity level of an asset provided by a resource of the disassembled resource chain.

Note that if SLA governor 160A were to instruct chain assembly module 112 to assemble and start a resource chain that provides a top-level service when the "actual capacity level" of the asset is less than the required capacity level, governance infrastructure 104 may construct unnecessary resource chains. For example, if SLA governor 160A were to evaluate whether the overall actual capacity of the type of asset is less than the required minimum current capacity level at time c in graph 220, governance infrastructure 104 would determine that the actual capacity level of the asset is less than the required capacity level. Consequently, governance infrastructure 104 would cause chain assembly module 112 to assemble and start another resource chain that provides the top-level service. However, assembling and starting another resource chain would be unnecessary because the overall actual capacity level of the type of asset will rise above the minimum required capacity level without the addition of another resource chain that provides the top-level service. In contrast, when governance infrastructure 104 evaluates the overall current capacity level of the type of asset at time c in graph 220, governance infrastructure 104 determines that the current capacity level of the asset is greater than the required capacity level. Consequently, SLA governor 160A would not cause chain assembly module 112 to assemble and start another resource chain that provides the top-level service.

Assume that that the resource chain that SLA governor 160A started at time a becomes fully operational at time d. In this situation, if SLA governor 160A were to wait until time d before re-evaluating whether the overall current capacity level of the type of asset is less than the minimum required current capacity level of the type of asset, SLA governor 160A has wasted all of the time between time b and time d. Hence, using the overall current capacity level of the type of asset to determine whether the overall capacity of the type of asset is less than the minimum required capacity level of the type of asset may result in better performance.

While graph 220 has been explained with reference to SLA governor 160A, it should be understood that other ones of SLA governors 160A may also behave in a similar manner.

Figure 9:
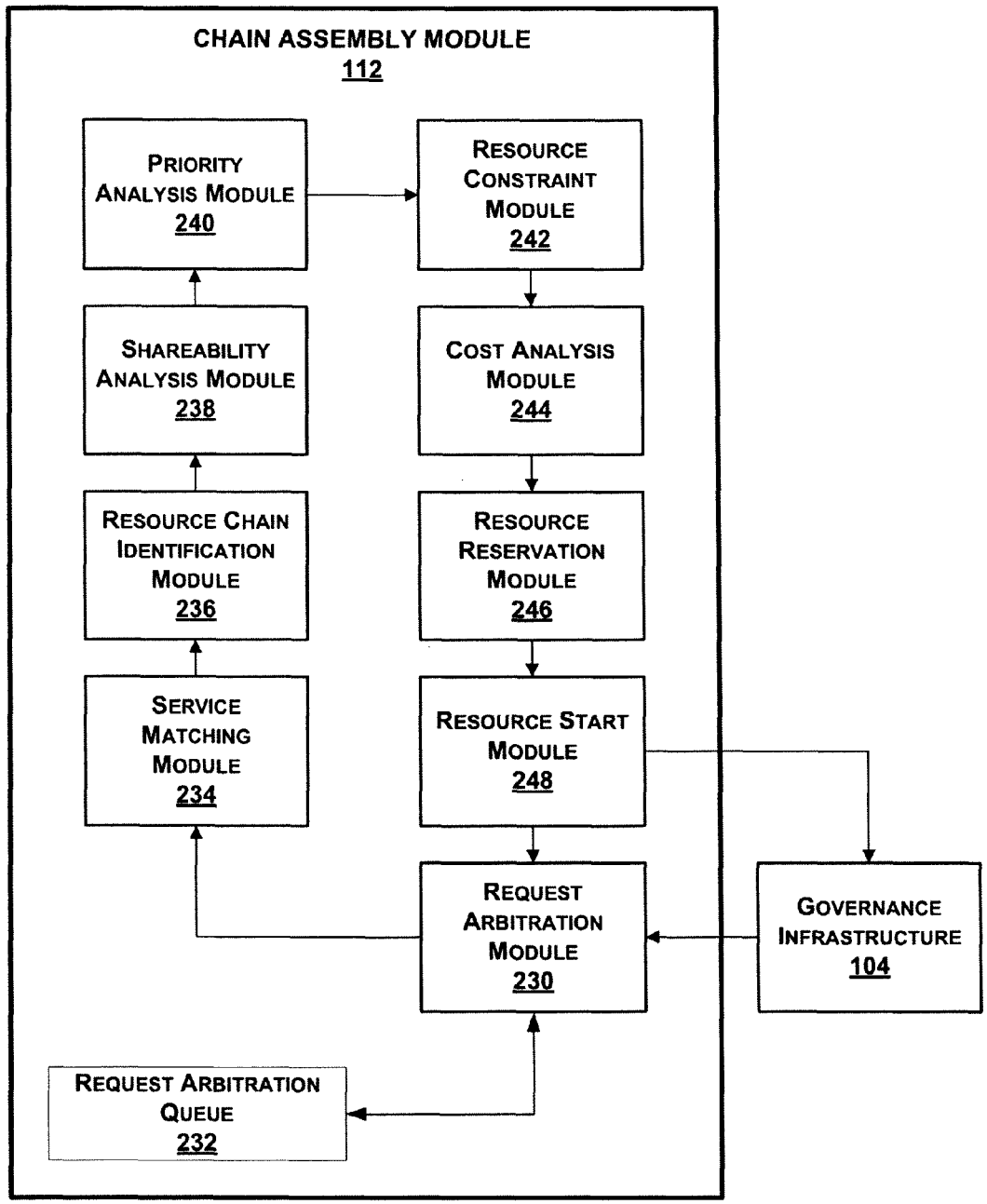
FIG. 9 is a block diagram illustrating exemplary details of a chain assembly module.

FIG. 9 is a block diagram illustrating exemplary details of chain assembly module 112. As illustrated in the example of FIG. 9, a request arbitration module 230 in chain assembly module 112 may receive a request from governance infrastructure 104 to assemble a resource chain to provide a particular top-level service. Request arbitration module 230 arbitrates requests in order to ensure that requests for higher-priority services are processed before requests for lower-priority services. For instance, when request arbitration module 230 receives the request for the service, request arbitration module 230 may access service definition repository 110 to retrieve a service definition object of the service. Request arbitration module 230 may then determine whether the service definition object specifies a priority parameter. If the service definition object specifies a priority parameter, the value of the priority parameter is the priority of the request. Otherwise, if the service definition object does not specify a priority parameter, request arbitration module 230 may treat the request as having the lowest possible priority.

After determining the priority of the request, request arbitration module 230 may determine whether the request has a higher priority level than a current priority level. If the request has a higher priority level than the current priority level, request arbitration module 230 may set the current priority level to the priority level of the request and may send the request to a service matching module 234 in order to begin processing the request. If the request has a priority level that is equal to the current priority level, request arbitration module 230 may send the request to service matching module 234 in order to begin processing the request. Otherwise, if the request has lower priority than the current priority level, request arbitration module 230 may add the request to a request arbitration module 232.

When a resource start module 248 indicates to request arbitration module 230 that the modules of chain assembly module 112 have finished processing a request, request arbitration module 230 may determine whether a priority level of request that is currently being processed is greater than a highest-priority request in request arbitration module 232. If there is a request that is currently being processed that has higher priority than the highest-priority request in request arbitration module 232, request arbitration module 230 may not perform any action. However, if the highest-priority request in request arbitration module 232 is has a higher priority than a request that is currently being processed or has equal priority as a request that is currently being processed, request arbitration module 230 may set the current priority level to the level of the highest-priority request in request arbitration module 232. In addition, request arbitration module 230 may send this highest-priority request in request arbitration module 232 to service matching module 234 to begin processing and may remove this highest-priority request from request arbitration module 232.

When service matching module 234 receives a request for a particular top-level service from request arbitration module 230, service matching module 234 may identify one or more service chains that include top-level service. As discussed above, a "chain" is a set of elements ordered by a dependency relation. A service chain is a "chain" containing services as elements, and is ordered by the relation "resources associated with a first service can interpret resources associated with a second service."

In order to identify service chains that include the top-level service, service matching module 234 may retrieve a service definition object of the top-level service from service definition repository 110. In order to implement this operation, service matching module 234 may employ an example recursive operation discussed in detail with regards to FIG. 8 below. After service matching module 234 identifies the set of service chains, service matching module 234 may provide these service chains to a resource chain identification module 236.

When resource chain identification module 236 receives a set of service chains, resource chain identification module 236 may identify one or more candidate resource chains for each of the service chains. As discussed above, a resource chain is a "chain" containing resources as elements, and is ordered by the relation "a first resource interprets a second resource." In order to identify candidate resource chains for the service chains, resource chain identification module 236 may use the example operations discussed in detail with regards to FIGS. 7 and 8 below. Some resources may be created as required. For instance, a copy of a software application may be created as required. The candidate resource chains identified by resource chain identification module 236 may include resources that have not yet been created. After resource chain identification module 236 identifies a set of candidate resource chains, resource chain identification module 236 may provide these candidate resource chains to a shareability analysis module 238.

Shareability analysis module 238 begins a process of sorting out unsuitable candidate resource chains in order to identify a single resource chain. In particular, shareability analysis module 238 may, identify and discard candidate resource chains that do not meet the sharing requirements for the services with which resources in the resource chains are associated. In order to identify and discard such candidate resource chains, shareability analysis module 238 may, for each resource in the candidate resource chains, identify a service with which the resource is associated. Shareability analysis module 238 may then retrieve from service definition repository 110 service definition objects of the identified services. Next, for each of the retrieved service definition objects, shareability analysis module 238 may determine whether the service definition object specifies a sharing parameter. If a service definition object of a service specifies a "deny" sharing parameter, shareability analysis module 238 may discard all candidate resource chains that include resources associated with the service in which a single resource interprets two or more resources. If a service definition of a service specifies a "below" sharing parameter, shareability analysis module 238 may discard all candidate resource chains that include a resource associated with the service in which two or more resources are interpreted by the resource associated with the service. If a service definition object of a service specifies an "allow" sharing parameter, shareability analysis module 238 does not discard any candidate resource chains due to this service definition object. If a service definition object does not specify a sharing parameter, shareability analysis module 238 does not discard any candidate resource chains due to this service definition object. After shareability analysis module 238 applies this shareability analysis with each of the identified service definition objects, shareability analysis module 238 may provide the remaining candidate resource chains to a priority analysis module 240

When priority analysis module 240 receives a set of candidate resource chains, priority analysis module 240 identifies and discards candidate resource chains that would, if actually assembled, harvest resources away from resource chains that provide higher-priority services. In order to identify and discard such candidate resource chains, priority analysis module 240 may retrieve from service definition repository 110 a service definition object of the requested top-level service of the candidate resource chains. In addition, priority analysis module 240 may retrieve from resource configuration repository 118 resource status information about whether each of the resources is currently in an existing resource chain. For each resource that is currently in an existing resource chain, priority analysis module 240 may retrieve from service definition repository 110 service definition objects of top-level services of the existing resource chains. Priority analysis module 240 may then determine whether any of the service definition objects of the top-level services of the existing resource chains specify a priority parameter that is greater than a priority parameter specified by the service definition object of the requested top-level service. If a service definition object of a top-level service of one of the existing resource chains specifies a priority parameter that is greater than the priority parameter specified by the service definition object of the requested top-level service, priority analysis module 240 may discard the candidate resource chains that include these resources, unless these resources can be shared. After priority analysis module 240 applies this priority analysis to each of the candidate resource chains, priority analysis module 240 may provide the remaining candidate resource chains to a resource constraint module 242.

When resource constraint module 242 receives a set of candidate resource chains, resource constraint module 242 may identify and discard candidate resource chains that do not satisfy deployment constraints. In order to identify and discard candidate resource chains that do not satisfy deployment constraints, resource constraint module 242 may use the exemplary operation described below in regards to FIG. 11. After discarding candidate resource chains that do not satisfy deployment constraints, resource constraint module 242 may provide the remaining candidate resource chains to a cost analysis module 244.

When cost analysis module 244 receives a set of candidate resource chains, cost analysis module 244 may select the one of the candidate resource chains has the lowest assembly cost. In order to determine which one of the candidate resource chains has the lowest assembly cost, cost analysis module 244 may sort the candidate resource chains according to harvest cost, asset cost, and excess feature costs. Harvest cost is a cost associated with harvesting a resource from an existing resource chain. Asset cost is a cost associated with unreserved capacity levels of assets provided by resources in a candidate resource chain. For example, a first resource in a candidate resource chain may interpret a second resource in the candidate resource chain. In this example, a second resource in a chain may consume 60% of a current capacity level of an asset provided by the first resource. Thus, the remaining 40% of the current capacity level of the asset provided by the first resource may be "wasted" because the second resource does not take full advantage of the asset provided by the first resource. Excess feature cost is associated with a percentage of attributes imported by a first resource in a candidate resource chain that are not imported by a second resource in the candidate resource chain. Cost analysis module 244 may utilize the exemplary operations in FIGS. 15 and 16 to perform this cost analysis. After identifying the one of the candidate resource chains that has the lowest assembly cost, cost analysis module 244 may provide the identified candidate resource chain to a resource reservation module 246 as the identified resource chain.

When resource reservation module 246 receives a resource chain, resource reservation module 246 may update the reserved capacity levels of assets provided by resources in the resource chain and then reserve the resources in the resource chain. In order to update the reserved capacity levels of assets provided by resources in the resource chain and then reserve the resources in the resource chain, resource reservation module 246 may use the operation described with regard to FIG. 17, below.

When resource reservation module 246 reserves a resource, resource reservation module 246 may output one or more events to the one of resource governors 164 that governs the resource. For instance, if the resource currently has a status of "allocated," resource reservation module 246 may output a "harvest" event to the resource governor because it may be necessary to harvest the resource in order to use the resource in the resource chain. If the resource currently has a status of "unallocated," resource reservation module 246 may output an "allocate" event to the resource governor. If the resource currently has a status of "stopped," "failed," "failed to stop," or "failed to start," resource reservation module 246 may output an "unallocate" event to the resource governor followed by an "allocate" event.

Furthermore, when resource reservation module 246 reserves resources in a resource chain, resource reservation module 246 may configure ones of resource governors 164 that govern the resources to act as a chain of resource governors. For example, a first resource governor may govern a first resource in the resource chain and a second resource governor may govern a second resource in the resource chain, the first resource may provide a service to the second resource. In this example, resource reservation module 246 may configure the first resource governor to receive events propagated by the second resource governor and may configure the second resource governor to subscribe to events published by the first resource governor.

After updating asset consumption values of resources in the resource chain and reserving the resources in the resource chain, resource reservation module 246 may cause resource start module 248 to start the top resource of the resource chain.

Figure 10:
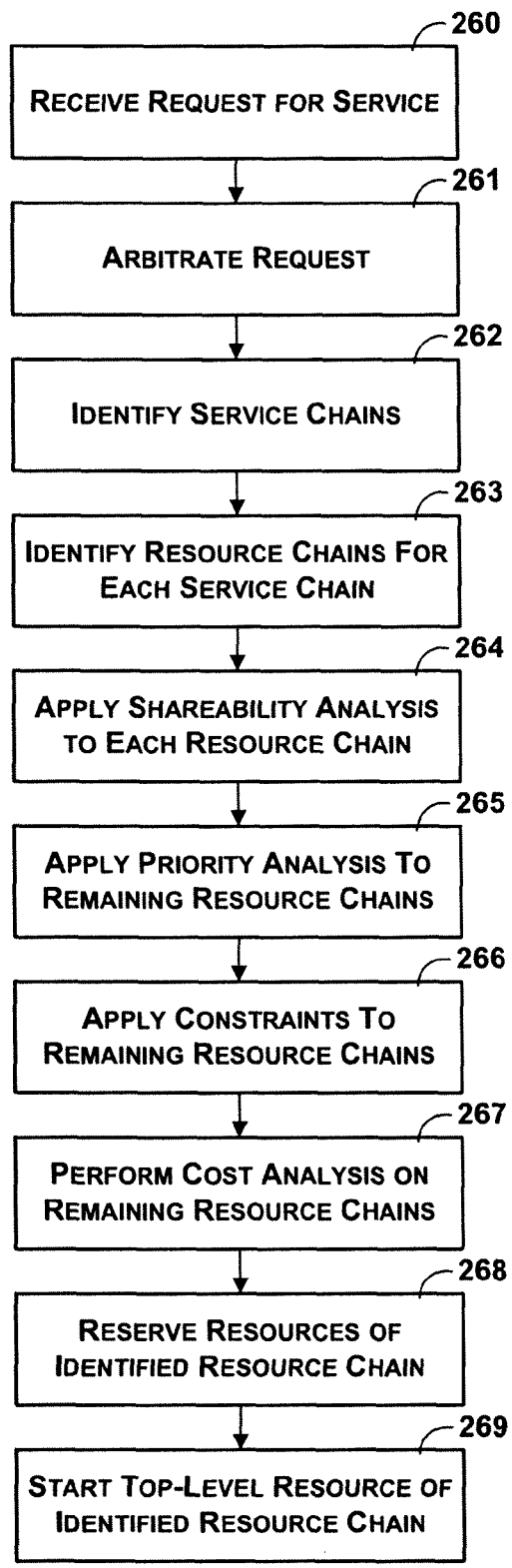
FIG. 10 is a flowchart illustrating an exemplary high-level operation of the chain assembly module.

FIG. 10 is a flowchart illustrating an exemplary high-level operation of chain assembly module 112. Initially, chain assembly module 112 receives a request to assemble a resource chain that provides a particular top-level service (260). When chain assembly module 112 receives this request, request arbitration module 230 may arbitrate the request in order to ensure that requests associated with higher-priority services are processed first (261).

After request arbitration module 230 determines that the request may be processed, service matching module 234 may identify a set of service chains that provide the requested service (262). Resource chain identification module 236 may then identify one or more resource chains for each of the service chains identified by service matching module 234 (263).

When resource chain identification module 236 identifies the resource chains, resource chain identification module 236 may provide the resource chains to shareability analysis module 238. Shareability analysis module 238 may then apply a shareability analysis to each of the resource chains (264). When shareability analysis module 238 applies a shareability analysis to the resource chains, shareability analysis module 238 may discard resource chains that do not satisfy the shareability requirements of the requested service.

Next, priority analysis module 240 may apply a priority analysis to the remaining resource chains (265). When priority analysis module 240 applies a priority analysis to the resource chains, priority analysis module 240 may discard chains that include resources in existing resource chains that cannot be harvested because the existing resource chains provide a top-level service with higher priority than the requested service.

Resource constraint module 242 may then apply constraints to the remaining resource chains (266). After resource constraint module 242 applies constraints to the remaining resource chains, cost analysis module 244 may identify a single one of the remaining resource chains that has a lowest assembly cost (267). When cost analysis module 244 identifies the resource chain that has the lowest assembly cost, resource reservation module 246 may reserve the resources of this resource chain (268). Resource start module 248 may then instruct the top-level resource of the resource chain to start operating and may inform request arbitration module 230 that the resource chain assembly operation is complete (269).

Figure 11:
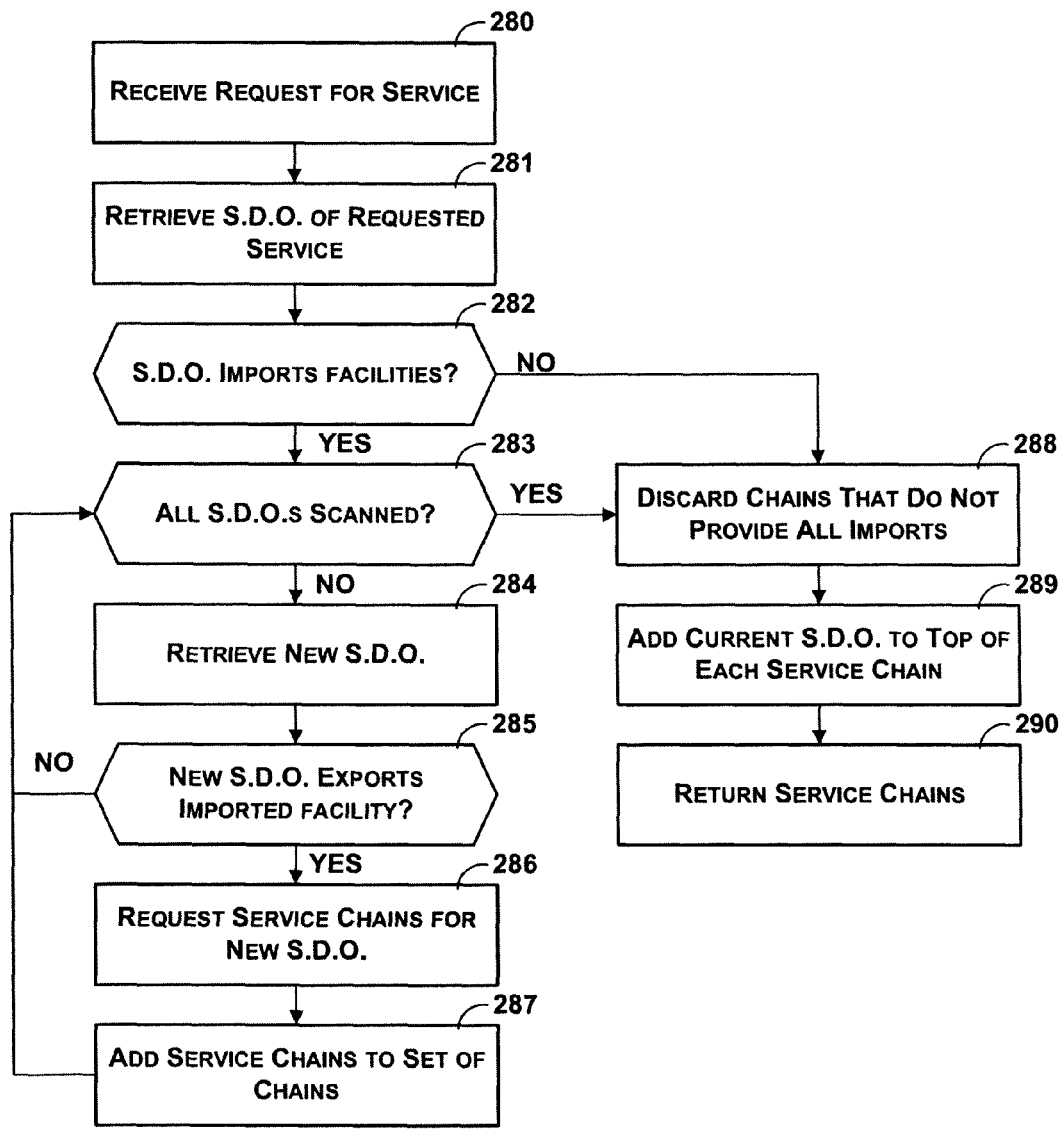
FIG. 11 is a flowchart illustrating an exemplary operation of a service matching module.

FIG. 11 is a flowchart illustrating an exemplary operation of service matching module 234. Initially, service matching module 234 may receive a request to identify service chains that provide a particular service (280). When service matching module 234 receives this request, service matching module 234 may retrieve from service definition repository 110 a service definition object (abbreviated "S.D.O." in FIG. 8) of the requested service (281). After retrieving the service definition object of the requested service, service matching module 234 may determine whether the service definition object specifies that resources associated with the requested service import any facilities (282).

If service matching module 234 determines that the service definition object specifies that resources associated with the requested service import one or more facilities ("YES" of 282), service matching module 234 may determine whether service matching module 234 has already scanned all other service definition objects in service definition repository 110 (283). If service matching module 234 has not already scanned all of the other service definition objects in service definition repository 110 ("NO" of 283), service matching module 234 may retrieve a new unscanned service definition object from service definition repository 110 (284). Next, service matching module 234 may determine whether the new service definition object exports a facility that the requested service imports (285). If the new service definition object does not export any facility that is imported by the requested service ("NO" of 285), service matching module 234 may loop back and again determine whether service matching module 234 has scanned all other service definition objects in service definition repository 110 (283).

On the other hand, if the new service definition object exports one or more facilities that are imported by the requested service ("YES" of 285), service matching module 234 may request service chains for the service defined by the new service definition object (286). This may be a recursive method invocation. Thus, a new operation may begin at step (280) with the service defined by the new service definition object as the requested service. After requesting the service chains for the service defined by the new service definition object, service matching module 234 may add the service chains to a set of service chains (287). Service matching module 234 may then loop back and again determine whether service matching module 234 has scanned every service definition object in service definition repository 110 (283).

If the requested service does not import any facilities ("NO" of 282) or if service matching module 234 has scanned every service definition object in service definition repository 110 ("YES" of 283), service matching module 234 may discard service chains that do not provide all of the facilities that the requested service provides (288). For example, the requested service may import "attribute(A)" and "attribute(B)". In this example, if resources associated with a first service at the top of a first service chain export "attribute(A)" and "attribute(B)", service matching module 234 does not discard the first service chain. Furthermore, if resources associated with a second service at the top of a second service chain export "attribute(A)" and resource associated with a third service in the second service chain export "attribute(B)", service matching module 234 does not discard the service chain because facilities exported by lower-level services in a service chain are generally available to all resources associated with all services above the lower-level service. In other words, a service generally exports all facilities exported by resources associated with lower-level services. However, if the service definition object of the second service specifies that "attribute(B)" is blocked, then the second service does not export "attribute(B)". For this reason, service matching module 234 may discard this service chain.

After discarding service chains that do not export all facilities imported by the requested service, service matching module 234 may add the current service to the top of each of the remaining service chains (289). Service matching module 234 may then return the service chains (290).

Figure 12:
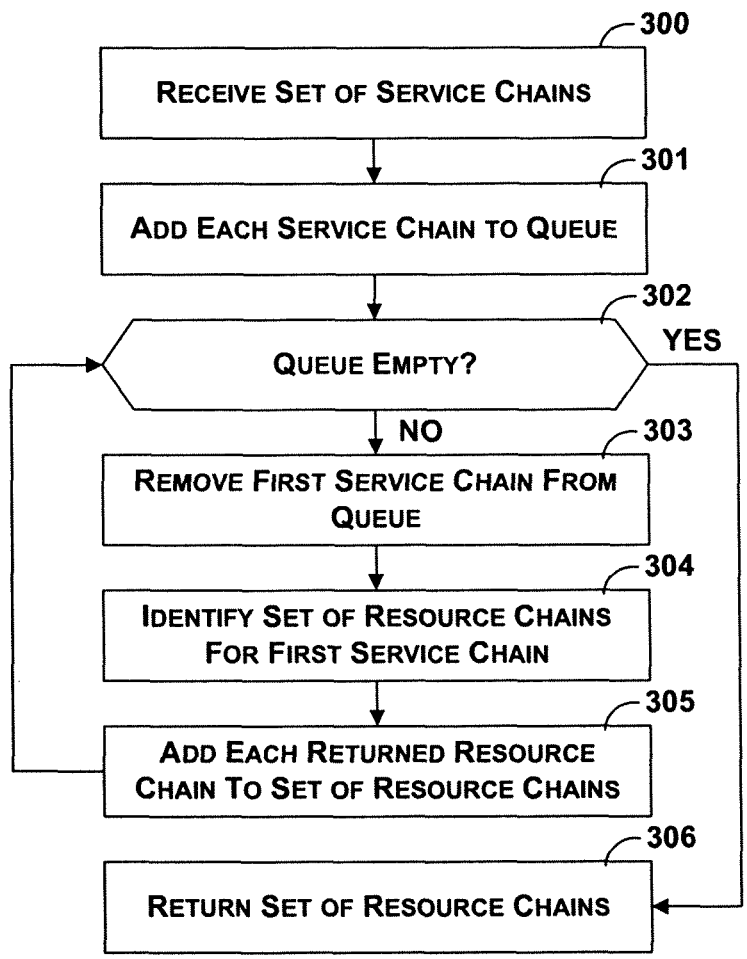
FIG. 12 is a flowchart illustrating an exemplary operation of a resource chain identification module.

FIG. 12 is a flowchart illustrating an exemplary operation of resource chain identification module 236. Initially, resource chain identification module 236 may receive a set of service chains from service matching module 234 (300). After receiving the set of service chains, resource chain identification module 236 may add each of the service chains to a queue (301). Resource chain identification module 236 may then determine whether the queue is empty (302).

If the queue is not empty ("NO" of 302), resource chain identification module 236 may remove a first service chain from the queue (303). Next, resource chain identification module 236 may identify a set of resource chains for the first service chain (304). An example operation by which resource chain identification module 236 identifies a set of resource chains for a service chain is describe with regard to FIG. 10, below. After identifying a set of resource chains for the first service chain, resource chain identification module 236 may add each of these resource chains to a set of resource chains (305). Resource chain identification module 236 may then loop back and again determine whether the queue is empty (302).

If the queue is empty ("YES" of 302), resource chain identification module 236 may return the set of resource chains (306). For example, resource chain identification module 236 may provide the set of resource chains to shareability analysis module 126.

Figure 13:
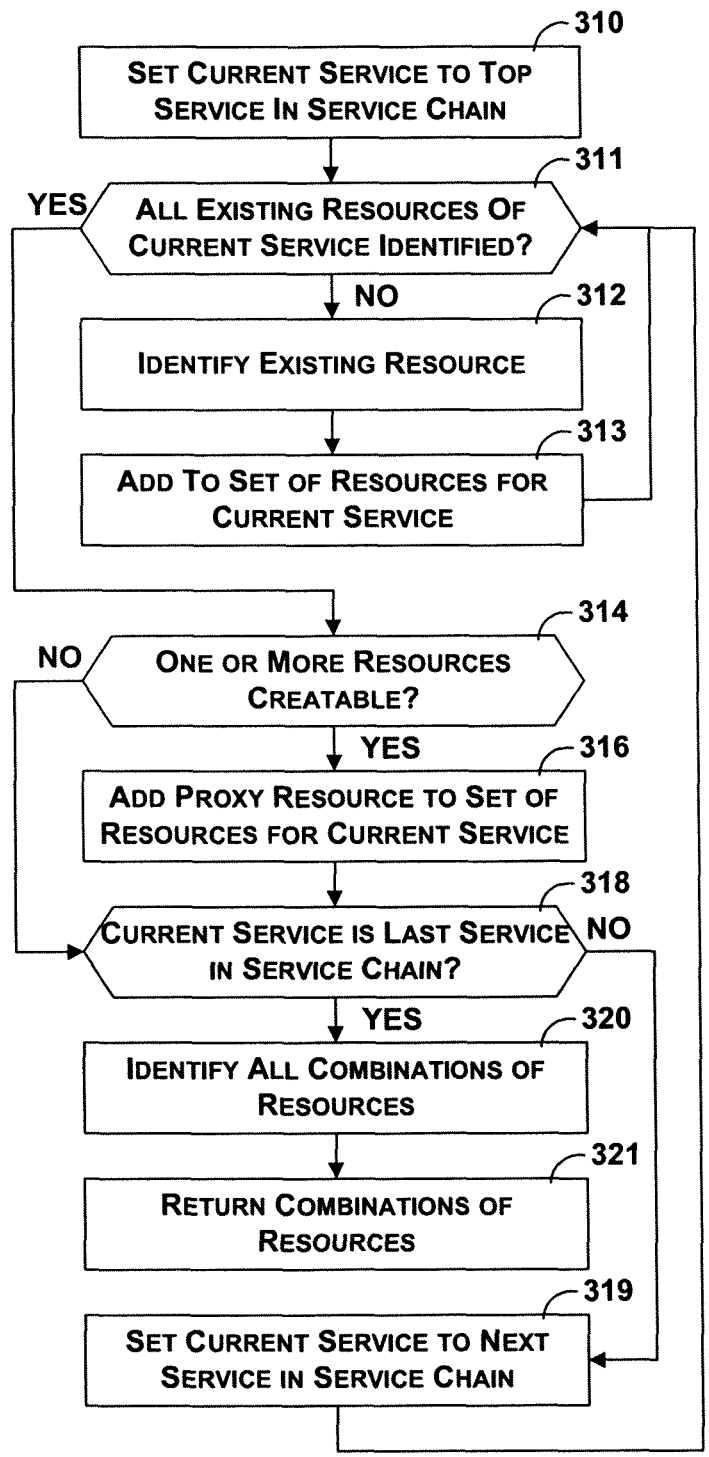
FIG. 13 is a flowchart that illustrates an example operation by which the resource chain identification module may identify a set of candidate resource chains for a service chain.

FIG. 13 is a flowchart that illustrates an example operation by which resource chain identification module 236 may identify a set of resource chains for a service chain. Initially, resource chain identification module 236 may set a current service indicator to indicate the top service in the service chain (310). Next, resource chain identification module 236 may determine whether resource chain identification module 236 has identified all currently existing resources of the current service (i.e., the service indicated by the current service indicator) (311).

If resource chain identification module 236 has not identified all currently existing resources of the current service ("NO" of 311), resource chain identification module 236 may identify an existing resource of the current service (312). In order to identify an existing resource, resource chain identification module 236 may access resource status data stored in resource configuration repository 118. As described below, cost analysis module 244 may take other statuses of resources into account when calculating costs associated with various resource chains. For instance, because it may be time consuming to stop a resource that is currently operating, a resource chain that includes a resource that has a status of "started" may be more costly than a resource chain that includes a resource that has a status of "available."

After identifying an existing resource, resource chain identification module 236 may then add the identified resource to a set of resources for the current service (313). Resource chain identification module 236 may then loop back and again determine whether resource chain identification module 236 has identified all existing resources of the current service (311). In this way, resource chain identification module 236 adds currently existing resources to a set of resources associated with the current service.

If resource chain identification module 236 has identified all currently existing resources of the current service ("YES" of 311), resource chain identification module 236 may determine whether one or more new resources can be created for the current service (314). For instance, a service action module associated with the current service may provide a method "newResourceCreatable( )" that, when invoked, returns a Boolean value that indicates whether new resources can be created for the current service. If one or more new resources can be created for the current service ("YES" of 314), resource chain identification module 236 may add a "proxy" resource to the set of resources for the current service (316). Resource chain identification module 236 does not, at this point, actually create this "proxy" resource. Rather, this resource is a "proxy" resource because it stands in place of a resource that has yet to be created.

After resource chain identification module 236 adds the "proxy" resource to the set of resources for the current service or after resource chain identification module 236 determines that the current service has no capacity to create a new resource ("NO" of 314), resource chain identification module 236 may determine whether the current service is the last service in the service chain (318).

If the current service is not the last service in the service chain ("NO" of 318), resource chain identification module 236 may set the current service indicator to the service in the service chain that interprets the service indicated by the current service indicator (i.e., next lower service in the service chain) (319). Resource chain identification module 236 may then loop back and again determine whether resource chain identification module 236 has identified all existing resources of the new current service (311). In this way, resource chain identification module 236 constructs a set of resources for each service in the service chain.

If the current service is the last service in the service chain ("YES" of 318), resource chain identification module 236 may identify all combinations of resources in which one resource is selected from each of the sets of resources (320). For example, the service chain may include a first service, a second service, and a third service. In this example, resource chain identification module 236 may have identified resources A and B for the first service, resources C and D for the second service, and resources E and F for the third service. Using these resources, resource chain identification module 236 may identify the following combinations of resources: A-C-E, A-C-F, A-D-E, A-D-F, B-C-E, B-C-F, B-D-E, and B-D-F. After identifying the combinations of resources, resource chain identification module 236 may return these combinations of resources as resource chains (321).

Figure 14:
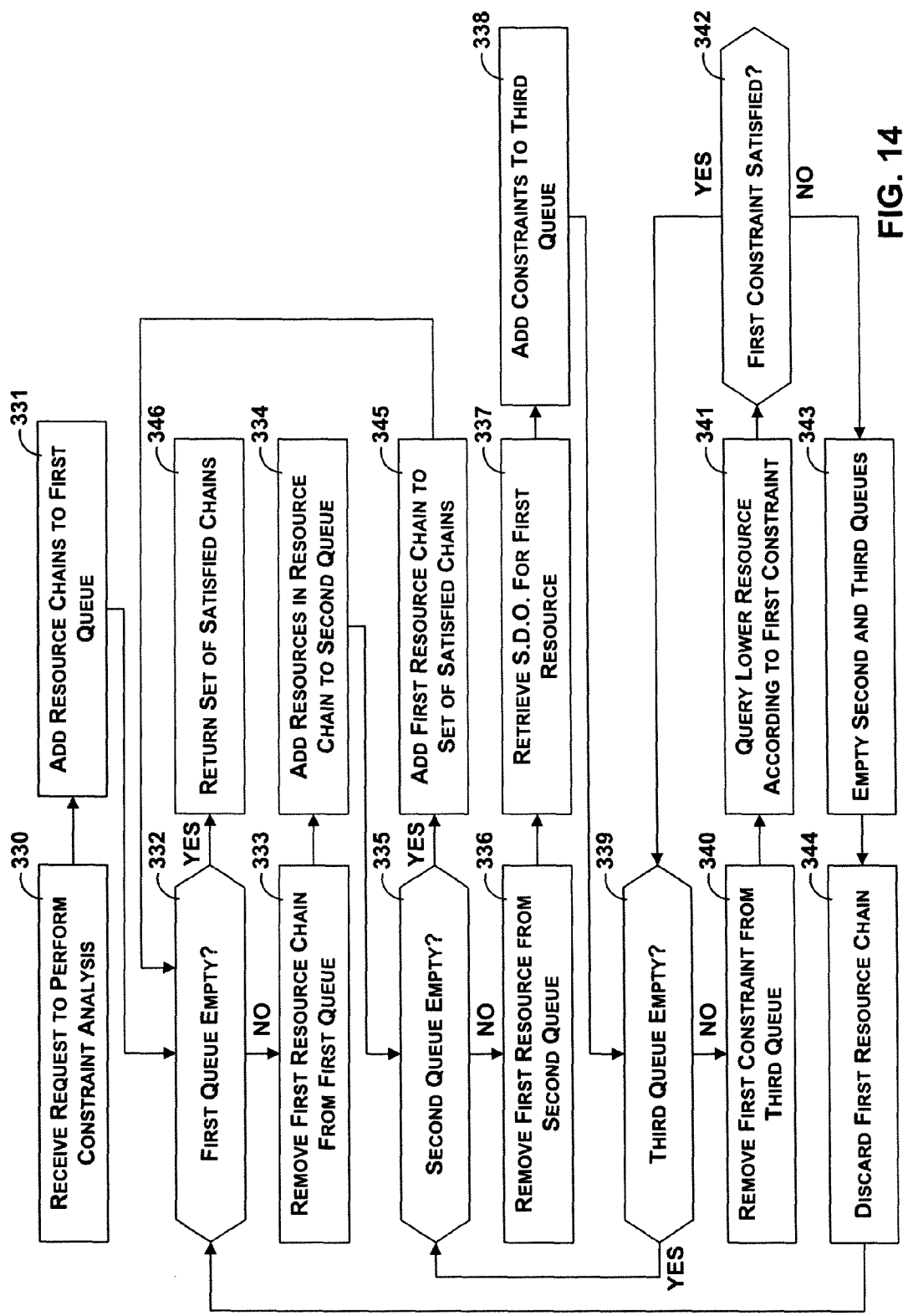
FIG. 14 is a flowchart illustrating an exemplary operation of a resource constraint module.

FIG. 14 is a flowchart illustrating an exemplary operation of resource constraint module 242. Initially, resource constraint module 242 may receive a request to perform a constraint analysis on a set of resource chains (330). When resource constraint module 242 receives this request, resource constraint module 242 may add each of the resource chains to a first queue (331). Resource constraint module 242 may then determine whether the first queue is empty (332).

If resource constraint module 242 determines that the first queue is not empty ("NO" of 332), resource constraint module 242 may remove a first resource chain from the first queue (333). Next, resource constraint module 242 may add each resource in the first resource chain to a second queue (334). Resource constraint module 242 may then determine whether the second queue is empty (335).

If resource constraint module 242 determines that the second queue is not empty ("NO" of 335), resource constraint module 242 may remove a first resource from the second queue (336). Next, resource constraint module 242 may retrieve from service definition repository 110 a service definition object of a service with which the first resource is associated (337). Resource constraint module 242 may parse the retrieved service definition object and add each of the constraints specified by the retrieved service definition object to a third queue (338). In addition, resource constraint module 242 may add to the third queue capacityConsumption parameters specified in the retrieved service definition object. Resource constraint module 242 may add the capacityConsumption parameters because capacityConsumption parameters may act as implicit constraints. Resource constraint module 242 may then determine whether the third queue is empty (339).

If the third queue is not empty ("NO" of 339), resource constraint module 242 may remove a first constraint from the third queue (340). Resource constraint module 242 may then query the resources below the first resource according to the first constraint (341). For example, the first constraint may specify "collage/base:physicalMemory>=6.0". In this example, resource constraint module 242 may identify a resource in the first resource chain that provides the asset "collage/base:physicalMemory". Next, resource constraint module 132 may identify a name of an asset object that models the "collage/base:physicalMemory" asset of the identified resource. For instance, if the name of the identified resource is "resourceX", then the name of the asset object that models the "collage/base:physicalMemory" asset of "resourceX" may be "resourceX/collage/base:physicalMemory". After identifying the name of the asset object that models the asset provided by identified resource, resource constraint module 242 may retrieve the current capacity level of the asset by invoke a method of an asset object. For instance, resource constraint module 242 may retrieve the reserved capacity level of the asset by invoking the following methods:
getAsset("collage/base:physicalMemory").getCurrentCapacity( ) After resource constraint module 242 queries the resources below the first resource to identify the current capacity level of the asset specified in the constraint, resource constraint module 242 may use the current capacity level returned in response to the query to determine whether the first constraint is satisfied (342).

If the first constraint is not satisfied ("NO" of 342), resource constraint module 242 may empty the second queue and the queue (343). Resource constraint module 242 may then discard the first resource chain because a constraint of the first resource chain is not satisfied 344). Next, resource constraint module 242 may loop back and determine whether the first queue is empty (332). If the first constraint is satisfied ("YES" of 342), resource constraint module 242 may loop back and again determine whether the third queue is empty (339). In this way, resource constraint module 242 determines whether all of the constraints of the first resource are satisfied.

If resource constraint module 242 determines that the third queue is empty ("YES" of 339), resource constraint module 242 may loop back and again determine whether the second queue is empty (335). If resource constraint module 242 determines that the second queue is empty ("YES" of 335), resource constraint module 242 may add the first resource chain to a set of constraint-satisfied resource chains (345). After adding the first resource chain to the set of constraint-satisfied resource chains, resource constraint module 242 may loop back and again determine whether the first queue is empty (332). If the first queue is empty ("YES" of 332), resource constraint module 242 may return the set of constraint-satisfied resource chains (346).

Figure 15:
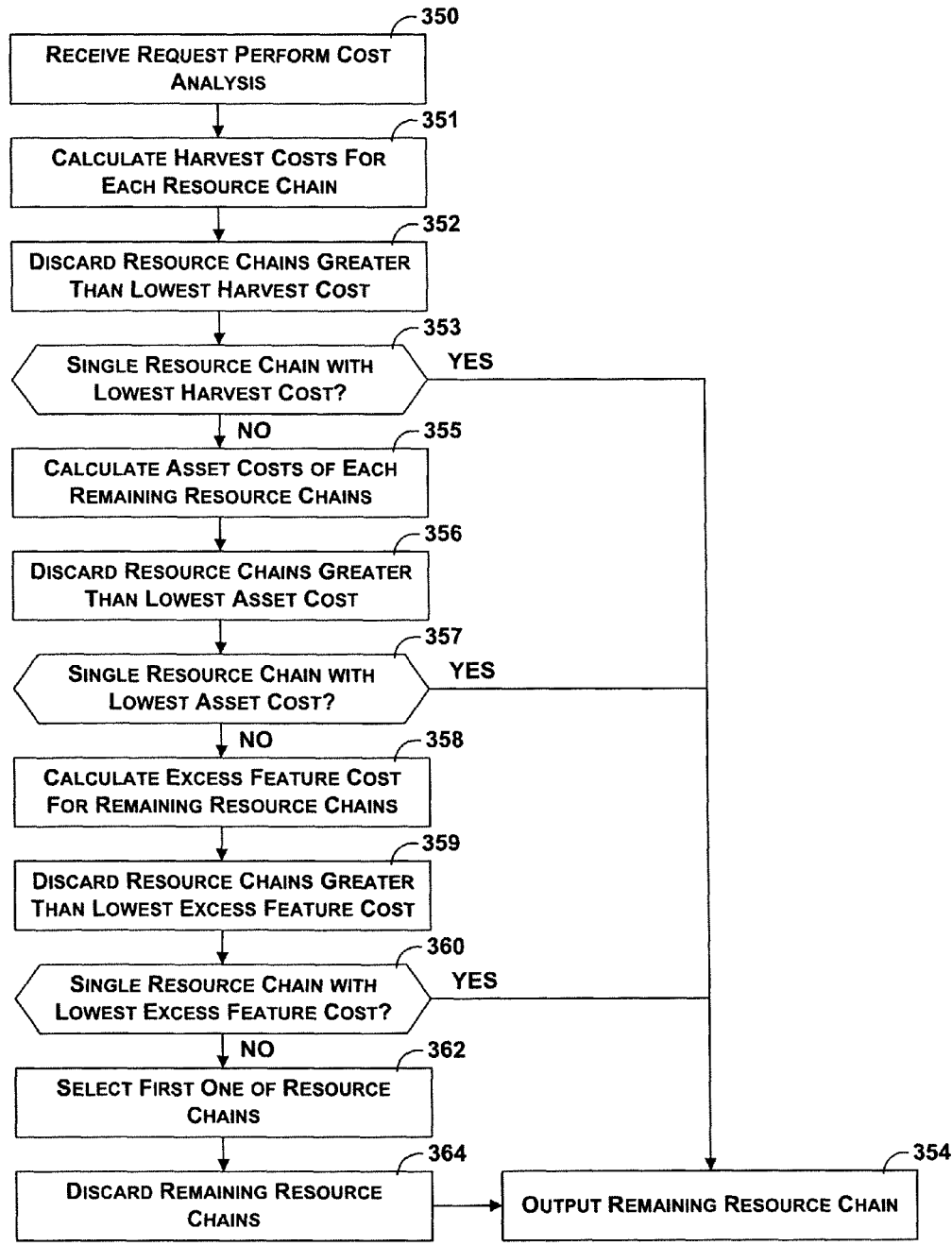
FIG. 15 is a flowchart illustrating an exemplary operation of a cost analysis module.

FIG. 15 is a flowchart illustrating an exemplary operation of cost analysis module 244. Initially, cost analysis module 244 receives a request to perform a cost analysis on a set of resource chains (350). When cost analysis module 244 receives this request, cost analysis module 244 may calculate a harvest cost for each of the resource chains (351). As discussed above, harvest cost is a cost associated with harvesting a resource from an existing resource chain. An exemplary operation by which cost analysis module 244 may calculate a harvest cost for each of the resource chains is provided below with regard to FIG. 16. After calculating a harvest cost for each of the resource chains, cost analysis module 244 may discard any resource chains that have harvest costs that are greater than the lowest calculated harvest cost (352). Cost analysis module 244 may then determine whether only a single resource chain remains after cost analysis module 244 has discarded the resource chains that have harvest costs that are greater than the lowest calculated harvest cost (353). If only a single resource chain remains ("YES" of 353), cost analysis module 244 may output this remaining resource chain (354).

On the other hand, if more than one resource chain remains after cost analysis module 244 has discarded the resource chains that have harvest costs that are greater than the lowest calculated harvest cost ("NO" of 353), cost analysis module 244 may calculate asset costs for the remaining resource chains (355). Asset cost is a cost associated with capacity levels of assets provided by resources in a resource chain that are unused. For example, a resource in a resource chain may reserve 50 units of the current capacity level of an asset and the current capacity level of the asset is 60. In this example, 10 units of the current capacity of the asset cannot are unused. After calculating an asset cost for each of the resource chains, cost analysis module 244 may discard any resource chains that have asset costs that are greater than the lowest calculated asset cost (356). Cost analysis module 244 may then determine whether only a single resource chain remains after cost analysis module 244 has discarded the resource chains that have asset costs that are greater than the lowest calculated asset cost (357). If only a single resource chain remains ("YES" of 357), cost analysis module 244 may output this remaining resource chain (354).

If more than one resource chain remains after cost analysis module 244 has discarded the resource chains that have asset costs that are greater than the lowest calculated asset cost ("NO" of 357), cost analysis module 244 may calculate excess feature costs for the remaining resource chains (358). Excess feature cost is associated with a percentage of attributes imported by a first resource in a resource chain that are not imported by a second resource in the resource chain. After calculating an excess feature cost for each of the resource chains, cost analysis module 244 may discard any resource chains that have excess feature costs that are greater than the lowest calculated excess feature cost (359). Cost analysis module 244 may then determine whether only a single resource chain remains after cost analysis module 244 has discarded the resource chains that have excess feature costs that are greater than the lowest calculated excess feature cost (360). If only a single resource chain remains ("YES" of 360), cost analysis module 244 may output this remaining resource chain (354).

If more than one resource chain remains after cost analysis module 244 has discarded the resource chains that have excess feature costs that are greater than the lowest calculated excess feature cost ("NO" of 360), cost analysis module 244 may select a first one of the remaining resource chains (362). Next, cost analysis module 244 may discard all resource chains other than the selected resource chain (364). Cost analysis module 244 may then output this remaining resource chain (354).

Figure 16:
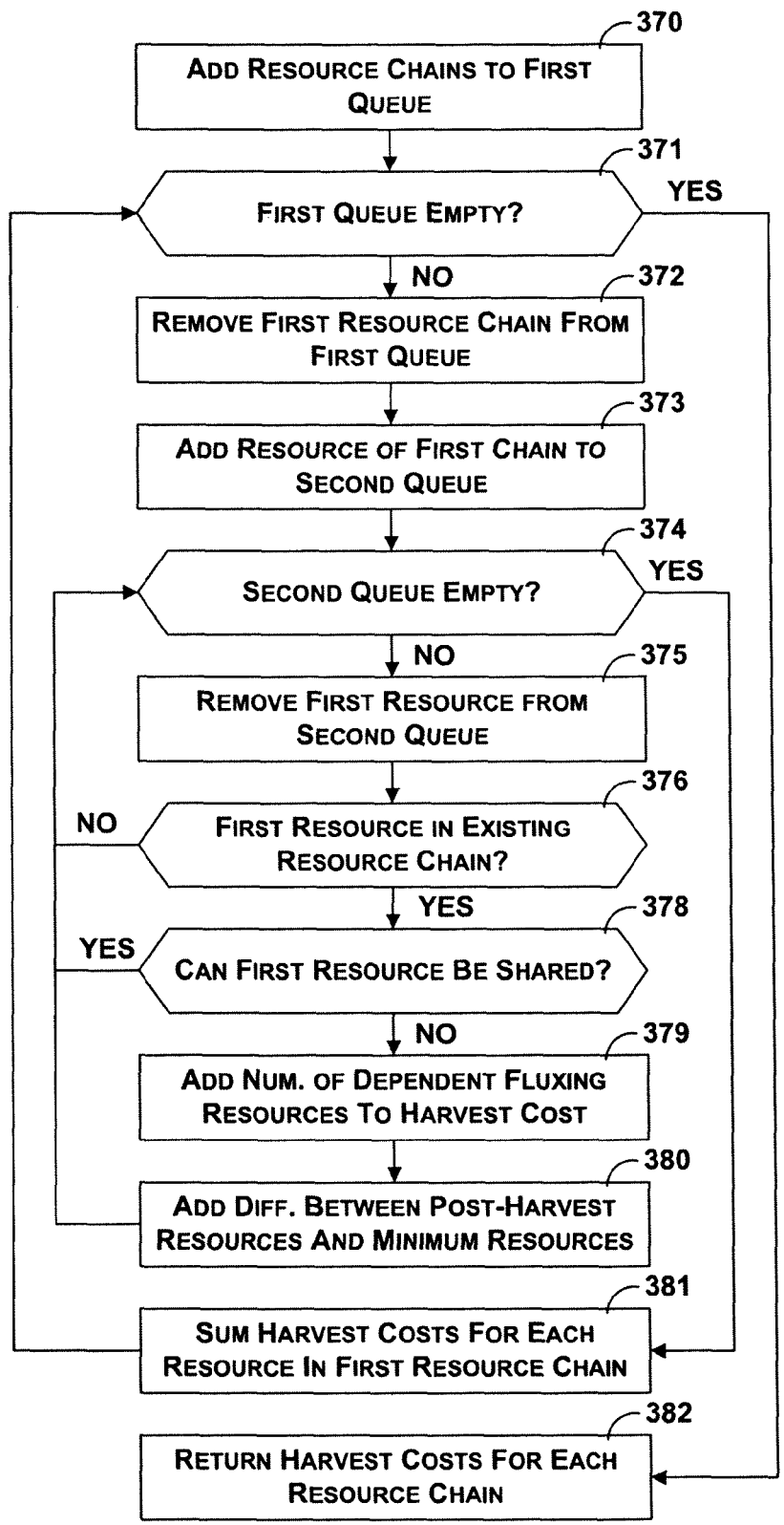
FIG. 16 is a flowchart illustrating an exemplary operation of the cost analysis module to calculate harvest costs for a set of candidate resource chains.

FIG. 16 is a flowchart illustrating an exemplary operation of cost analysis module 244 to calculate harvest costs for a set of resource chains. Initially, cost analysis module 244 may add each of the resource chains to a first queue (370). Next, cost analysis module 244 may determine whether the first queue is empty (371). If the first queue is not empty ("NO" of 371), cost analysis module 244 may remove a first resource chain from the first queue (372). Cost analysis module 244 may then add each resource in the first resource chain to a second queue (373). After adding each resource in the first resource chain to the second queue, cost analysis module 244 may determine whether the second queue is empty (374).

If the second queue is not empty ("NO" of 374), cost analysis module 244 may remove a first resource from the second queue (375). After removing the first resource from the second queue, cost analysis module 244 may determine whether the first resource is already in an existing resource chain (376). Cost analysis module 244 may use resource status information stored in resource configuration module 118 to determine whether the resource is already in an existing resource chain. For instance, if a resource has a status of "started," "allocated," or "stopped", the resource is already in an existing resource chain. If cost analysis module 244 determines that the first resource is not already in an existing resource chain ("NO" of 376), there is no harvest cost for using the first resource. For this reason, cost analysis module 244 may loop back and again determine whether the second queue is empty (374).

On the other hand, if cost analysis module 244 determines that the first resource is in an existing resource chain ("YES" of 376), cost analysis module 244 may determine whether the first resource can be shared with the existing resource chain (378). For example, to determine whether the first resource can be shared with the existing resource chain, cost analysis module 244 may determine whether each resource in the existing resource chain below the first resource is the same as each resource in the first resource chain below the first resource. If this is true, cost analysis module 244 may analyze whether sharing parameters of services with which the resource in the existing resource chain are associated allow such a sharing. If each resource in the existing resource chain below the first resource is not the same as each resource in the first resource chain below the first resource or sharing parameters of services with which the resource in the existing resource chain are associated do not allow such a sharing, the first resource would have to be harvested in order for the first resource to be used in the first resource chain. If cost analysis module 244 determines that the first resource can be shared ("YES" of 378), there is no harvest cost associated with the first resource. For this reason, cost analysis module 244 may loop back and again determine whether the second queue is empty (374).

If cost analysis module 244 determines that the first resource cannot be shared ("NO" of 378), the first resource would have to be harvested in order to use the first resource chain. Therefore, there may be a harvest cost associated with the first resource. To calculate the harvest cost associated with the first resource, cost analysis module 244 may add to a harvest cost associated with the first resource a number of flux resources in the existing resource chain (379). For example, the first resource may be an interpreting resource in the middle of the existing resource chain and the existing resource chain may support three flux resources. Thus, by harvesting the first resource, operations of these three flux resources would have to cease. In this example, cost analysis module 244 may add a different value depending on the status of the first resource. For instance, if the first resource has a status of "allocated" or "stopped", the first resource has not yet started operating or has stopped operating without error. Consequently, it may be comparatively cheap to harvest the first resource and deallocate dependent resources. For this reason, cost analysis module 244 may add "3" to the harvest cost associated with the first resource. However, if the first resource has a status of "started", the first resource has started operating. Because it may be time consuming to start resources that have already started, it may be comparatively expensive to harvest the first resource and deallocate dependent resources. For this reason, cost analysis module 244 may add "6" to the harvest cost associated with the first resource.

Next, cost analysis module 244 adds a value to the harvest cost associated with the first resource that accounts for costs associated with restoring minimum levels of services that would be disrupted by harvesting the first resource (380). For example, cost analysis module 244 may identify the services of each of the flux resources in the existing resource chain. Cost analysis module 244 may then identify a minimum numbers of resources to operate in distributed computing system 2 for each of the services (e.g., by reading the SLA min parameters in the service definition objects of these services). Cost analysis module 244 may then, for each of the services, determine the number of resources that would be required to restore distributed computing system 2 to the minimum number of resource for the service if the first resource were to be harvested. Cost analysis module 244 may add these numbers to the harvest cost associated with the first resource. Cost analysis 134 may then loop back and again determine whether the second queue is empty (374).

If cost analysis module 244 determines that the second queue is empty ("YES" of 374), cost analysis module 244 may sum up the harvest costs associated with each of the resources in the first resource chain in order to calculate a harvest cost for the first resource chain (381). Cost analysis module 244 may then loop back and determine whether the first queue is empty (371). If the first queue is empty ("YES" of 371), cost analysis module 244 may return the harvest costs of the resource chains (382).

Figure 17:
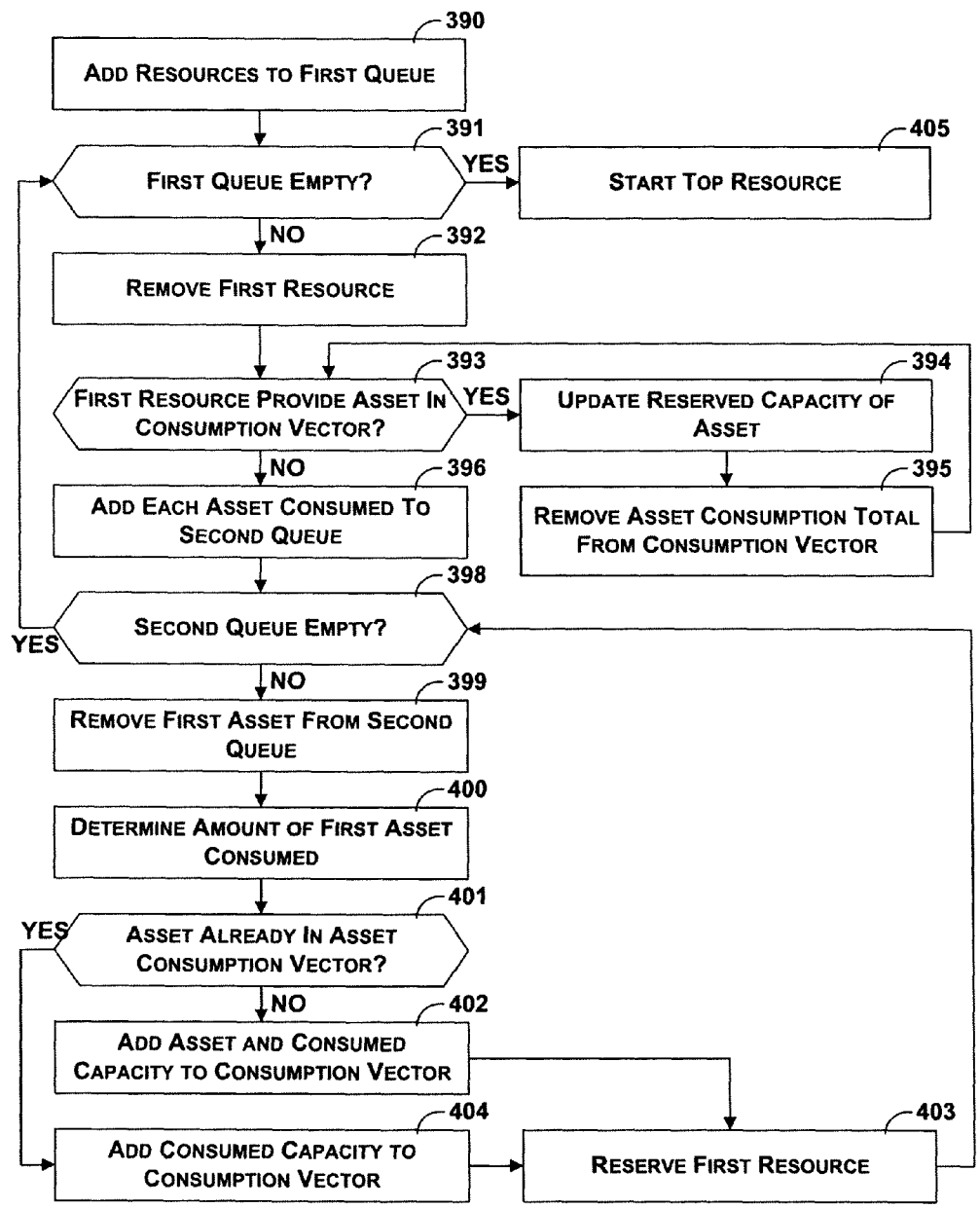
FIG. 17 is a flowchart illustrating an exemplary operation of a resource reservation module.

FIG. 17 is a flowchart illustrating an exemplary operation of resource reservation module 246. Initially, resource reservation module 246 may add each resource in a resource chain to a first queue (390). When resource reservation module 246 adds the resources to the first queue, resource reservation module 246 may add the resources in such a way that the top-most resource is at the front of the queue. After adding the resources to the first queue, resource reservation module 246 may determine whether the first queue is empty (391).

If the first queue is not empty ("NO" of 391), resource reservation module 246 may remove a first resource from the first queue (392). Resource reservation module 246 may then determine whether the first resource provides an asset specified in an asset consumption vector (393). The asset consumption vector may be a data structure that may store asset consumption totals for various assets.

If the first resource provides an asset in the asset consumption vector ("YES" of 393), resource reservation module 246 may reserve an amount equal to the asset consumption total of the capacity of the asset provided by the first resource (394). For example, the first resource may provide the asset "collage/base:physicalMemory" and the asset consumption vector may include the asset consumption total of "16" for the asset "collage/base:physicalMemory". In this example, if the first resource has name "resource1", resource reservation module 246 applies the method "reserveCapacity(16)" method of the asset object having the name "resource1/collage/base:physicalMemory". In this example, the "reserveCapacity" method reserves 16 units of the current capacity level of the asset having the name "collage/base:physicalMemory". Thus, if the previous reserved capacity level of the asset "resource1/collage/base:physicalMemory" was 40, the new reserved capacity level of the asset "resource1/collage/base:physicalMemory" is 56. After reserving the capacity of the asset, resource reservation module 246 may remove the asset from the asset consumption vector (395). Next, resource reservation module 246 may loop back and again determine whether the asset consumption vector includes any assets that are provided by the first resource (393).

If the asset consumption vector does not include any assets provided by the first resource ("NO" of 393), resource reservation module 246 may add each asset consumed by the first resource to a second queue (396). Resource reservation module 246 may then determine whether the second queue is empty (398).

If the second queue is not empty ("NO" of 398), resource reservation module 246 may remove a first asset from the second queue (399). Resource reservation module 246 may then determine how much capacity of the first asset is consumed by the first resource (400). Resource reservation module 246 may determine how much capacity the first resource consumes of the first asset by invoking a method of the associated with the first resource. After determining how much capacity the first resource consumes of the first asset, resource reservation module 246 may determine whether there is an entry in the asset consumption vector for the first asset (401).

If there is not an entry in the asset consumption vector for the first asset ("NO" of 401), resource reservation module 246 may add the asset and the amount consumed to the asset consumption vector (402). The amount consumed is the asset consumption total for the asset. After adding the asset and the amount consumed to the asset consumption vector, resource reservation module 246 may reserve the first resource (403). Resource reservation module 246 may then loop back and determine whether the second queue is empty (398).

On the other hand, if there is already an asset consumption total in the asset consumption vector for the first asset ("YES" of 401), resource reservation module 246 may add the amount consumed by the resource to the asset consumption total for the first asset (404). After adding the amount consumed to the asset consumption total for the first asset, resource reservation module 246 may reserve the first resource (403). Resource reservation module 246 may then loop back and determine whether the second queue is empty (398).

If the second queue is empty ("YES" of 398), resource reservation module 246 may loop back and again determine whether the first queue is empty (391). If the first queue is empty ("YES" of 391), resource reservation module 246 may cause resource start module 248 to start the top-level resource of the resource chain (405).

Figure 18:
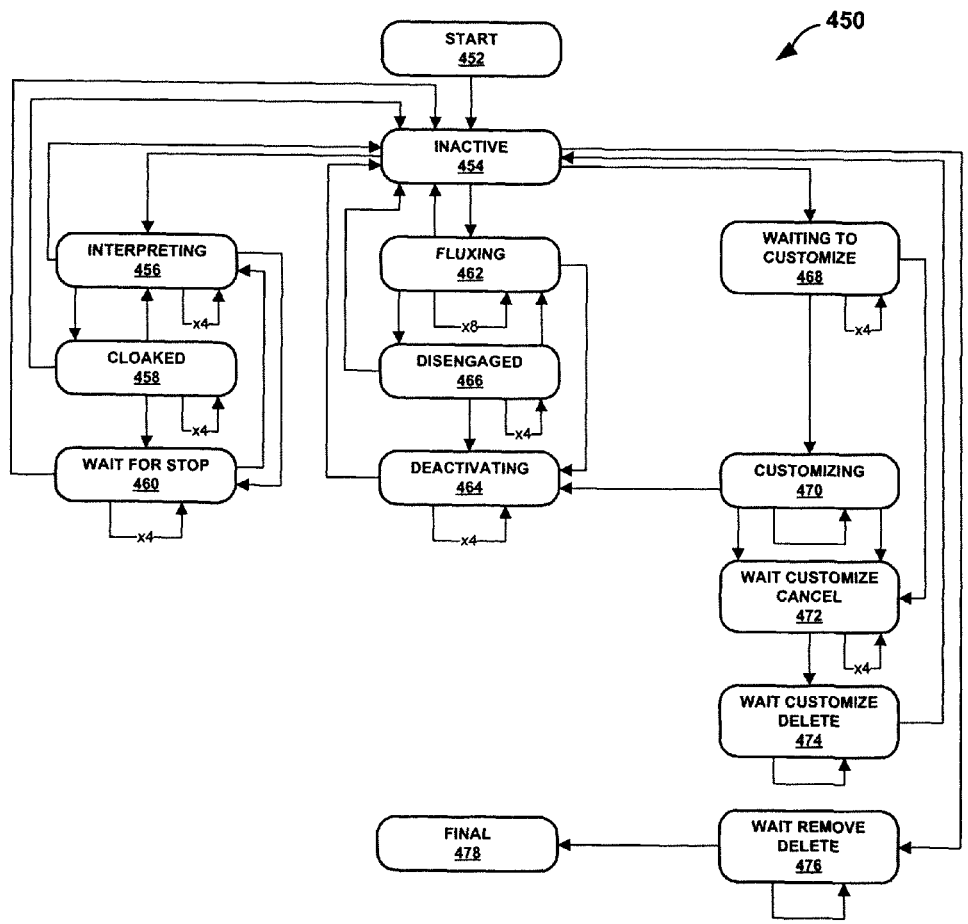
FIG. 18 is a block diagram illustrating an exemplary finite state machine that implements the functionality of a service governor.

FIG. 18 is a block diagram illustrating an exemplary finite state machine that implements the functionality of a service governor 450. Service governor 450 includes fourteen states and sixty-six transitions. For purposes of clarity, the labels on the transitions have been omitted from FIG. 18. Furthermore, if service governor 450 receives an event for which this disclosure provides no description, it may be assumed that an error has occurred.

A "start" state 452 is an initial state of service governor 450. Service governor 450 transitions from "start" state 452 to an "inactive" state 454 when service governor 450 receives a "ServiceConfigured" service event. Service governor 450 may transition to several states from "inactive" state 454.

Service governor 450 transitions from "inactive" state 454 to an "interpreting" state 456 when service governor 450 receives an "activate interpretation" event from administrative interface module 108. When service governor 450 performs this transition, service governor 450 sets a "findable" variable to "true." When the value "findable" variable of service governor 450 is true, chain assembly module 112 may include the service governed by service governor 450 in service chains.

When service governor 450 is in "interpreting" state 456, service governor 450 may transition to a "cloaked" state 458 when service governor 450 receives a "cloak" event from administrative interface module 108. When service governor 450 performs this transition, service governor 450 sets the "findable" variable of the software object that represents service governor 450 to "false." When the value of "findable" variable of service governor 450 is false, chain assembly module 112 may not include the service governed by service governor 450 in service chains.

In addition, when service governor 450 is in "interpreting" state 456, service governor 450 may perform a transition back to "interpreting" state 456 when service governor 450 receives a "resource stopped" event, a "resource started" event, or a "resource failed" event from a resource governor of the service governed by service governor 450. In addition, service governor 450 may perform a transition back to "interpreting" state 456 when service governor 450 receives a "recover" event from control node 6 when control node 6 restarts after a failure. When service governor 450 is in "interpreting" state 456 and receives a "resource stopped" event, service governor 450 may invoke the "deallocate" method of the resource governor to deallocate (i.e., to remove the resource from a resource chain) the resource that generated the "resource stopped" event. In addition, service governor 450 may invoke the "resource Stopped" method of the service action module to indicate that the resource that generated the "resource stopped" event has stopped. A resource may generate a "resource stopped" event when a resource of the service governed by service governor 450 has stopped. When service governor 450 is in "interpreting" state 456 and receives a "resource started" event from a resource governor of a resource, service governor 450 may invoke the "resourceStarted" method of the service action module to record in resource configuration repository 118 that the resource has started. As discussed above, chain assembly module 112 may use the resource configuration information in resources configuration repository 118 when identifying resource chains. When service governor 450 is in "interpreting" state 456 and receives a "resource failed" event from a resource governor of a resource, service governor 450 may invoke the "deallocate"

method of the resource governor in order to deallocate this resource from its current resource chain. In addition, service governor 450 may invoke the "resource failed" method of the service action module in order to record in resource configuration repository 118 that the resource has failed. A resource governor may generate a "resource failed" event when the resource has failed.

When service governor 450 receives a "recover" event, service governor 450 may invoke the "replay" method to generate and receive a new "activate interpretation" event. When service governor 450 receives the new "activate interpretation" event caused by the "replay" method, service governor 450 handles this event as normal. For instance, if service governor 450 is in "inactive" state 454 and receives the "activate interpretation" event, service governor 450 transitions to "interpreting" state 456. If service governor 450 is already in "interpreting" state 456, service governor 450 performs no action.

Service governor 450 may transition from "interpreting" state 456 to a "wait for stop" state 460 when service governor 450 receives a "stop" event from administrative interface module 108. When service governor 450 is in "wait for stop" state 460, service governor 450 waits for all resources of the service to stop. The "stop" event amounts to an instruction from administrator 12 to stop the operation of all instances of a service. When service governor 450 performs this transition, service governor 450 may invoke the "cloakService" method of this service governor in order to prevent chain assembly module 112 from including the service governed by service FSA in any chains of software services. In addition, service governor 450 may invoke "forceStopResource" methods of each of the resource governors that govern resource of this service in order to stop all resources of the service. Service governor 450 may also transition to "wait for stop" state 460 from "cloaked" state 458 when service governor 450 receives a "stop" event. When service governor 450 receives a "stop" event when service governor 450 is in "cloaked" state 458, service governor 450 may invoke the "forceStopResource" methods of each of the resource governors that govern resource of this service in order to stop all resources of the service.

When service governor 450 is in "cloaked" state 458, service governor 450 may transition back to "cloaked" state 458 when service governor 450 receives a "resource stopped" event, a "resource started" event, or a "resource failed" event from a resource governor of the service governed by service governor 450. In addition, service governor 450 may transition back to "cloaked" state 458 when service governor 450 receives a "recover" event. When service governor 450 is in "cloaked" state 458 and receives a "resource stopped" event, service governor 450 may invoke the "deallocate" method of the resource governor that governs the resource that generated the "resource stopped" event and may invoke the "resourceStopped" method of the service action module in order to inform the service that this resource has stopped. A resource governor may generate a "resource stopped" event when a resource of the service governed by service governor 450 has stopped. When service governor 450 is in "cloaked" state 458 and receives a "resource started" event, service governor 450 may invoke the "resourceStarted" method of the service action module to inform the service that the resource that generated the "resource started" event has started. A resource governor generates a "resource started" event when the resource has started. When service governor 450 is in "cloaked" state 458 and receives a "resource failed" event, service governor 450 may invoke the "deallocate" method of the resource governor that governs the resource that generated the "resource failed" event in order to deallocate this resource from its current resource chain. In addition, while performing this transition, service governor 450 may also invoke the "resourceFailed" method of the service action module in order to inform the service that the resource that generated the "resource failed" event has failed. A resource may generate a "resource failed" event when the resource has failed. When service governor 450 receives a "recover" event while in "cloaked" state 458, service governor 450 may invoke the "replay" method of service governor 450 in order to generate and respond to a new "cloak" event.

Service governor 450 may transition from "wait for stop" state 460 back to "wait for stop" state 460 when service governor 450 receives a "recover" event from control node 6. When service governor 450 receives a "recover" event when in "wait for stop" state 460, service governor 450 may again invoke the "forceStopResource" methods of each of resource governors 164 that govern resources of this service in order to stop all resources of the service governed by service governor 450. In addition, service governor 450 may transition from "wait for stop" state 460 back to "wait for stop" state 460 when service governor 450 receives a "resource stopped" event, a "resource started" event, or a "resource failed" event from a resource governor that governs a resource of the service governed by service governor 450. If service governor 450 receives a "resource stopped" event while in "wait for stop" state 460, service governor 450 may invoke the "deallocate" method of the resource governor that governs the resource that generated the "resource stopped" event in order to deallocate this resource from its current resource chain. In addition, service governor 450 may invoke the "resourceStopped" method of the service action module in order to inform the service that the resource that generated the "resource stopped" event has stopped. When service governor 450 receives a "resource started" event while in "wait for stop" state 460, service governor 450 may invoke the "stop" method of the resource action module of the resource that generated the "resource started" event in order to cause this resource to stop. When service governor 450 receives a "resource failed" event, service governor 450 may invoke the "deallocate" method of the resource governor that governs the resource that generated the "resource failed" event and may invoke the "resourceFailed" method of the service action module in order to inform the service that the resource that generated the "resource failed" event has failed.

Service governor 450 may transition from "wait for stop" state 460 to "inactive" state 454 when all of the resources of the service have stopped. In addition, service governor 450 may transition from "wait for stop" state 460 to "interpreting" state 456 when service governor 450 receives an "activate interpretation" event from administrative interface module 108. Administrative interface module 108 may generate an "activate interpretation" event when administrator 12 decides to resume the operation of the service after deciding to stop the service.

Service governor 450 may transition from "inactive" state 454 to a "fluxing" state 462 when service governor 450 receives an "activate flux" event from administrative interface module 108. Administrative interface module 108 may invoke the "activateFluxService" method of service governor 450 in order to generate an "activate flux" event when administrator 12 decides to start the operation of the service as a flux service. When service governor 450 transitions from "inactive" state 454 to "fluxing" state 462, service governor 450 may invoke the "engageFluxService" method of service governor 450 in order to start obeying requests from one of SLA governors 160 to increase or decrease the capacity of this service. In other words, service governor 450 instructs one of SLA governors 160 that the SLA governor may begin to dynamically control the capacity of distributed computing system 2 to provide this service as a top-level (i.e., flux) service. Service governor 450 may transition from "fluxing" state 462 back to "inactive" state 454 when service governor 450 receives a "deactivate flux" event and there are no active resources of the flux service. Service governor 450 may receive a "deactivate flux" event when administrative interface module 108 invokes the "deactivateFluxService" method of service governor 450. When service governor 450 performs this transition from "fluxing" state 462 to "inactive" state 454, service governor 450 may invoke the "disengageFluxService" method of service governor 450 in order to stop obeying requests from SLA governors 160 to increase or decrease the capacity of this service.

Service governor 450 may transition from "fluxing" state 462 to a "deactivating" state 464 when service governor 450 receives a "deactivate flux" event from administrative interface module 108 and there are one or more active resources of the flux service. When service governor 450 is in "deactivating" state 464, service governor 450 is waiting for all resources of the flux service to stop. Service governor 450 transitions back to "fluxing" state 462 from "deactivating" state 464 when service governor 450 receives an "activate flux" event from administrative interface module 108. When service governor 450 performs this transition back to "fluxing" state 462, service governor 450 may invoke the "engageFluxService" method of service governor 450 to reengage dynamic control of the capacity of this service. In addition, when service governor 450 is in "deactivating" state 464, service governor 450 transitions to "inactive" state 454 when there are no remaining started resources of the service.

Service governor 450 may transition from "fluxing" state 462 to a "disengaged" state 466 when service governor 450 receives a "disengage" event from administrative interface module 108. When service governor 450 is in "disengaged" state 466, service governor 450 has invoked the "disengageFluxService" method of service governor 450 to disengage dynamic control of the capacity of this service. Because service governor 450 disengages service level automation, service governor 450 may ignore any further requests to add or stop resources of the service. Service governor 450 may transition from "disengaged" state 466 to "fluxing" state 462 when service governor 450 receives an "engage" event from administrative interface module 108. When service governor 450 performs this transition, service governor 450 may invoke the "engageFluxService" method of service governor 450 in order to reengage dynamic control of the capacity of this service, and consequently begins obeying subsequent requests to add or stop resources of the service. Furthermore, service governor 450 may transition from "disengaged" state 466 to "inactive" state 454 when service governor 450 receives a "deactivate flux" event from administrative interface module 108 and there are no active resources of the service. When service governor 450 performs this transition, service governor 450 may invoke the "disengageFluxService" method of service governor 450 to disengage dynamic control of the capacity of this service. On the other hand, service governor 450 transitions from "disengaged" state 466 to "deactivating" state 464 when service governor 450 receives a "deactivate flux" event from administrative interface module 108 and there are one or more active resources of the service. When service governor 450 performs this transition from "disengaged" state 466 to "deactivating" state 464, service governor 450 may invoke the "disengageFluxService" method of service governor 450 to disengage dynamic control of the capacity of this service and may invoke the "stopResource" methods of each of resource governors 164 that govern resources of this service in order to stop all resources of this service.

Service governor 450 may transition from "fluxing" state 462 back to "fluxing" state 462 when service governor 450 receives a UCTH event or a UCTL event from one of SLA governors 160. The acronym "UCTH" stands for Unused Capacity Too High. The acronym "UCTL" stands for Unused Capacity Too Low. When service governor 450 receives a UCTH event while in "fluxing" state 462, service governor 450 may invoke a "deleteFluxResource" method of the service action module to delete a resource of this service. The SLA governor may generate a UCTH event when the SLA governor determines that distributed computing system 2 currently has excess capacity to provide this service. When service governor 450 receives a UCTL event while in "fluxing" state 462, service governor 450 may invoke an "addFluxResource" method of the service action module to add a new resource of the flux service. SLA governors 160 may generate UCTL events when SLA governors 160 determine that service levels of services provided by distributed computing system 2 do not satisfy service-level agreements. In other words, the unused capacity of distributed computing system 2 to provide a service is too low to satisfy a service-level agreement.

Service governor 450 may also transition from "fluxing" state 462 back to "fluxing" state 462 when service governor 450 receives a "resource failed" event, a "resource available" event, a "resource started" event, a "resource stopped" event, a "resource stop failed" event, or a "resource start failed" event from a resource governor. When service governor 450 is in "fluxing" state 462 and receives a "resource failed" event, service governor 450 may invoke the "deallocate" method of the resource governor that governs the resource that generated the "resource failed" event and may invoke the "resourceFailed" method of the service action module to inform the service that this resource has failed. In addition, when service governor 450 is in "fluxing" state 462 and receives a "resource failed" event, service governor 450 may invoke the "publish" method to generate a "resource available" event. A "resource available" may inform service governor 450 that a resource of a service that this service requires in order to operate is now available. When service governor 450 receives a "resource available" event, service governor 450 may invoke the "resumeUCTL" method of one of SLA governors 160 to instruct the SLA governor that the SLA governor may resume adding resources of the flux service. When service governor 450 receives a "resource started" event from a resource, service governor 450 may invoke the "resourceStarted" method of the service action module to inform the service that the resource that generated the "resource started" event has started. Similarly, when service governor 450 receives a "resource stopped" event, a "resource stop failed" event, or a "resource started failed" event from a resource governor, service governor 450 may invoke the "resourceStopped," "resourceFailedToStop," or "resourceFailedToStart" methods of the service action module, respectively. The "resourceStopped" method of the service action module and the "resourceFailedToStop" method to inform the service that the resource has stopped and that the resource has failed to stop, respectively.

Service governor 450 may transition from "disengaged" state 466 back to "disengaged" state 466 when service governor 450 receives a "resource stopped" event, a "resource started" event, or a "resource failed" event from a resource governor that governs a resource of the service governed by service governor 450. When service governor 450 receives a "resource stopped" event, service governor 450 may invoke the "deallocate" method of the resource governor and the "resourceStopped" method of the service action module. When service governor 450 receives a "resource started" event, service governor 450 may invoke the "resourceStarted" method of the service action module to inform the service that the resource that generated the "resource started" event has started. When service governor 450 receives a "resource failed" event while in "disengaged" state 466, service governor 450 may invoke the "deallocate" method of the resource governor, the "resourceFailed" method of the service action module, and the "publish" method to generate a "resource available" event. In addition to the events received from a resource governor, service governor 450 may also receive a "recover" event while in "disengaged" state 466 from control node 6. When service governor 450 receives a "recover" event while in "disengaged" state 466, service governor 450 may invoke the "replay" method of service governor 450 to generate and respond to a new "disengage" event.

Service governor 450 may transition from "deactivating" state 464 back to "deactivating" state 464 when service governor 450 receives a "resource stopped" event, a "resource started" event, or a "resource failed" event from a resource governor. When service governor 450 receives a "resource stopped" event, service governor 450 may invoke the "deallocate" method of the resource governor and the "resourceStopped" method of the service action module in order to deallocate the resource and to inform, the service that the resource has stopped. When service governor 450 receives a "resource started" event, service governor 450 may invoke the "resourceStarted" method of the service action module to inform the service that a resource has started and may then invoke the "forceStopResource" method of the resource governor that governs the resource that generated the "resource started" event in order to force that resource to stop. Service governor 450 forces the resource to stop because service governor 450 is waiting for flux resources to stop when service governor 450 is in "deactivating" state 464. When service governor 450 receives a "resource failed" event while in "deactivating" state 464, service governor 450 may invoke the "deallocate" method of the resource governor, the "resourceFailed" method of the service action module, and the "publish" method to generate a "resource available" event. In addition to the events received from a resource governor, service governor 450 may also receive a "recover" event while in "deactivating" state 464. When service governor 450 receives a "recover" event while in "deactivating" state 464, service governor 450 may invoke the "disengageSLA" method of one of SLA governors 160 to prevent the SLA governor from attempting to add or stop additional resources of the flux service. Service governor 450 may also invoke the "stopResource" methods of the resource governors of this service in order to stop all resources of the flux service.

When service governor 450 is in "inactive" state 454 and receives a "customize" event from administrative interface module 108, service governor 450 transitions to a "waiting to customize" state 468. Service governor 450 may invoke "start" methods of each of the resource governors of this service when performing this transition. The "start" method of a resource governor requests that a resource of the service start. While service governor 450 is in "waiting to customize" state 468, service governor 450 is waiting for all of the resources of the service to start. To determine whether all of the resources have started, service governor 450 may periodically check whether the number of resources of the service that have started is equal to the maximum number of resources for the service. Service governor 450 may perform this check by invoking the "getResourceCount" method and the "getMaxResourceCount" method and determining whether the values returned by these methods are equal.

When service governor 450 determines that all of the resources of the service have started, service governor 450 may transition to a "customizing" state 470. While service governor 450 is in "customizing" state 470, service governor 450 is "customizing" the service. While service governor 450 is in "customizing" state 470, administrator 12 may manually configure (i.e., customize) each resource of the service governed by service governor 450. For example, administrator 12 may configure each resource of the service governed by service governor 450 to communicate with each of the other resources of the service governed by service governor 450. When service governor 450 is in "customizing" state 470, service governor 450 may transition back to "customizing" state 470 when service governor 450 receives a "recover" event from control node 6.

Service governor 450 may transition to "deactivating" state 464 from "customizing" state 470 when service governor 450 receives a "customization done" event from administrative interface module 108. The "customization done" event may indicate that administrator 12 has finished customizing the service. When service governor 450 transitions from "customizing" state 470 to "deactivating" state 464, service governor 450 may invoke the "stopResource" methods of each of the resource governors of this service in order to stop all of the resources of the service.

In addition, service governor 450 may transition from "customizing" state 470 to a "wait for customization cancel" state 472 when service governor 450 receives a "customization cancel" event from administrative interface module 108. The "customization cancel" event may indicate that administrator 12 has decided to cancel an in-progress customization process. When service governor 450 transitions from "customizing" state 470 to "wait for customization cancel" state 472, service governor 450 may invoke the "forceStopResource" method of each of the resource governors of this service in order to immediately stop all resources of the service. While service governor 450 is in "wait for customization cancel" state 472, service governor 450 is waiting for all resources of the service to stop after administrator 12 cancels a customization process.

Service governor 450 may transition from "wait customization cancel" state 472 to a "wait customization delete" state 474 when service governor 450 determines that the number of started resources of the service is zero. Service governor 450 may determine that the number of started resources of the service is zero by periodically invoking the "getCount" method and determining whether the returned value equals zero. When service governor 450 performs this transition from "wait customization cancel" state 472 to "wait customization delete" state 474, service governor 450 may invoke the "deleteResource" methods of each of the resource governors of this service in order to delete all of the resources of the service. While service governor 450 is in "wait customization delete" state 474, service governor 450 is waiting for all resources to be deleted after customization.

When service governor 450 is in "wait customization delete" state 474 and receives a "recover" event from control node 6, service governor 450 may transition back to "wait customization delete" state 474. During this transition, service governor 450 may invoke the "deleteResource" methods of each of the resource governors of this service again to ensure that all resources of the service are deleted.

Service governor 450 may transition from "wait customization delete" state 474 to "inactive" state 454 when service governor 450 receives a "resource deleted" event from a resource governor and the number of resources of the service is zero.

When service governor 450 is in "waiting to customize" state 468, service governor 450 may transition back to "waiting to customize" state 468 when service governor 450 receives one of several events. For instance, service governor 450 may transition from "waiting to customize" state 468 back to "waiting to customize" state 468 when service governor 450 receives a "resource failed" event, a "resource started" event, or a "resource stopped" event from a resource governor of the service. When service governor 450 receives a "resource failed" event while in "waiting to customize" state 468, service governor 450 may invoke the "resourceFailed" method of the service action module to inform the service that the resource that generated the event has failed and service governor 450 may also invoke the "addResource" method of the service action module to restart the resource that generated the event. When service governor 450 receives a "resource started" event while in "waiting to customize" state 468, service governor 450 may invoke the "resourceStarted" method of the service action module to inform the service that the resource that generated the event has started. When service governor 450 receives a "resource stopped" method while in "waiting to customize" state 468, service governor 450 may invoke the "resourceFailed" method of the service action module to inform the service that the resource that generated the event has failed and service governor 450 may also invoke the "addResource" method of the service action module to restart the resource that generated the event. Furthermore, service governor 450 may transition from "waiting to customize" state 468 back to "waiting to customize" state 468 when service governor 450 receives a "recover" event from control node 6. When service governor 450 receives "recover" event while in "waiting to customize" state 468, service governor 450 may invoke the "replay" method to generate a new "customize" event.

When service governor 450 is in "wait customization cancel" state 472, service governor 450 may transition back to "wait customization cancel" state 472 when service governor 450 receives one of several events. For instance, service governor 450 may transition from "wait customization cancel" state 472 back to "wait customization cancel" state 472 when service governor 450 receives a "resource failed" event, a "resource started" event, or a "resource stopped" event from a resource governor of the service. When service governor 450 receives a "resource failed" event while in "wait customization cancel" state 472, service governor 450 may invoke the "deallocate" method of the resource governor to deallocate the resource that generated the "resource failed" event from the node slot and service governor 450 may also invoke the "resourceFailed" method of the service action module to inform the service that the resource that generated the "resource failed" event has failed. When service governor 450 receives a "resource stopped" event while in "wait customization cancel" state 472, service governor 450 may invoke the "deallocate" method of the resource governor the resource that generated the "resource stopped" event and service governor 450 may also invoke the "resourceStopped" method of the service action module to inform the service that the resource that generated the "resource failed" event has stopped. When service governor 450 receives a "resource started" event while in "wait customization cancel" state 472, service governor 450 may invoke the "forceStopResource" method of the resource governor that governs the resource that generated the "resource started" event to stop. Furthermore, service governor 450 may transition from "wait customization cancel" state 472 to "wait customization cancel" state 472 when service governor 450 receives a "recover" event from control node 6. When service governor 450 performs this transition, service governor 450 may invoke the "forceStopResource" methods of each of the resource governors of this service in order to force all resources of the service to stop.

Service governor 450 may transition from "inactive" state 454 to a "wait remove delete" state 476 when service governor 450 receives a "remove" event from administrative interface module 108. The "remove" event may indicate that administrator 12 wants to remove the service from distributed computing system 2 altogether. When service governor 450 performs this transition, service governor 450 may invoke the "deleteResource" method of each of the resource governors of this service in order to delete all resources of the service from distributed computing system 2. While service governor 450 is in "wait remove delete" state 476, service governor 450 is waiting for all resources of the service to be deleted.

Service governor 450 may perform several transitions from "wait remove delete" state 476. For instance, service governor 450 may transition from "wait remove delete" state 476 back to "wait remove delete" state 476 when service governor 450 receives a "recover" event from control node 6. When service governor 450 performs this transition, service governor 450 may invoke the "deleteResource" methods of each of the resource governors of this service again to delete all resources of the service. In addition, service governor 450 may transition from "wait remove delete" state 476 to a "final" state 478 when service governor 450 receives a "resource deleted" event from a resource governor and all of the resources of the service have been deleted. When service governor 450 performs this transition, service governor 450 may invoke the "resourceDeleteComplete" method of the service action module to inform the service that all resources of the service have been deleted.

Figure 19:
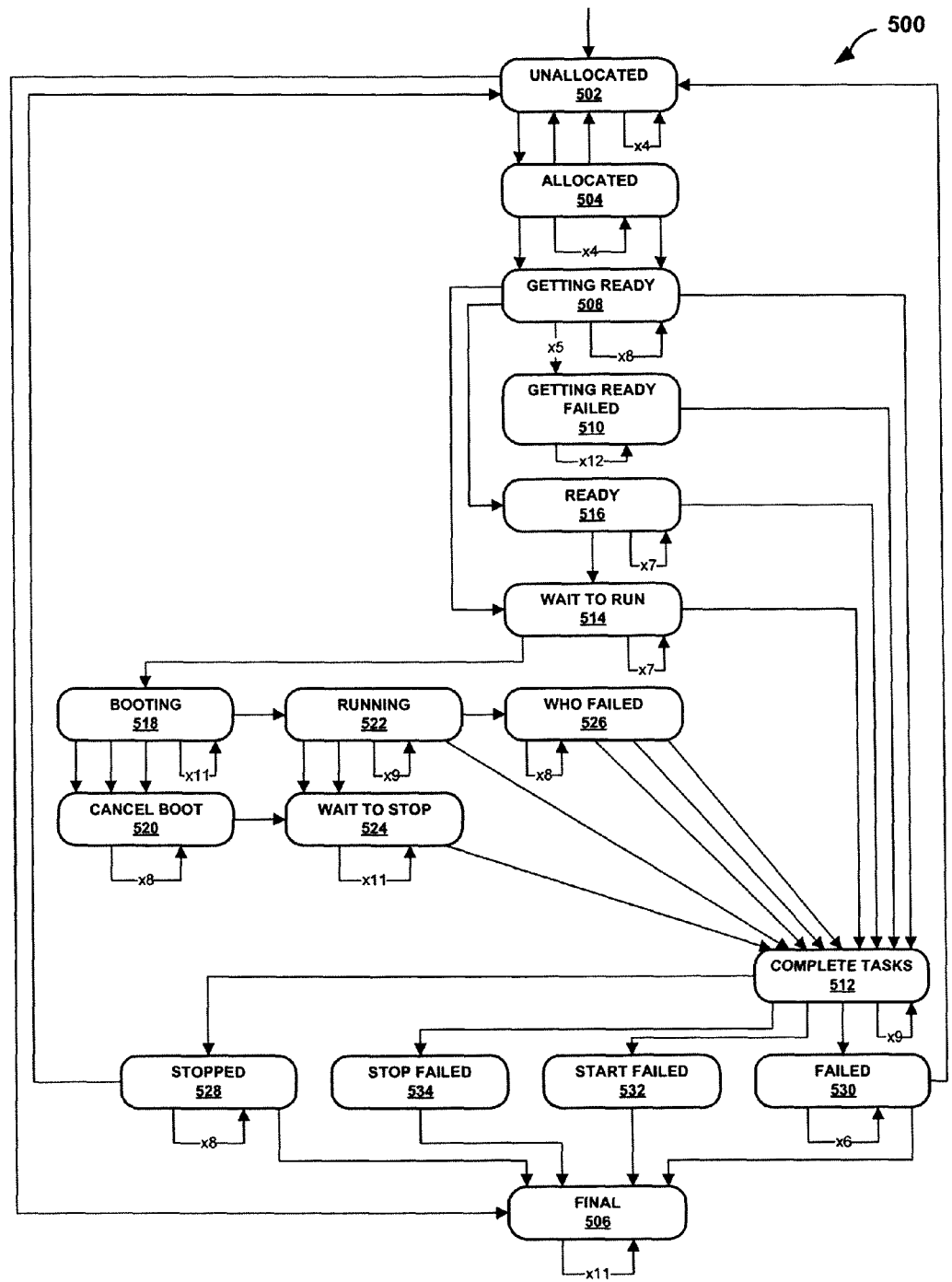
FIG. 19 is a block diagram illustrating an exemplary finite state machine that implements the functionality of a resource governor.

FIG. 19 is a block diagram illustrating an exemplary finite state machine that implements resource governor 500. Resource governor 500 includes fifteen states and thirty-nine transitions. For purposes of clarity, the labels on the transitions have been omitted from FIG. 19. Furthermore, it is also assumed that resource governor 500 governs a resource of a service governed by service governor 450

Initially, resource governor 500 may start in an "unallocated" state 502. When resource governor 500 is in "unallocated" state 502, the resource governed by resource governor 500 is available to be allocated. Resource governor 500 may transition from "unallocated" state 500 to an "allocated" state 504 when resource governor 500 receives an "allocate" event from service governor 450. When resource governor 500 performs this transition, resource governor 500 sets the value of "depTaskCounted" to false, the value of "startChain" to false, the value of "tasks" to zero, and the value of "destroy" to false. Resource governor 500 may also transition from "unallocated" state 502 to a final state 506 when resource governor 500 receives a "destroy" event from a service governor.

Resource governor 500 may transition from "unallocated" state 502 back to "unallocated" state 502 when resource governor 500 receives a "dependent failed" event from a resource governed by resource governor 500. Resource governor 500 may also transition from "unallocated" state 502 back to "unallocated" state 502 when resource governor 500 receives a "recover" event from control node 6. In addition, resource governor 500 may transition from "unallocated" state 502 back to "unallocated" state 502 when resources governor 500 receives a "task complete" event from the resource governed by resource governor 500.

When resource governor 500 is in "allocated" state 504, chain assembly module 112 has allocated the resource governed by resource governor 500 to one or more resource chains. Resource governor 500 may transition from "allocated" state 504 to "unallocated" state 502 when resource governor 500 receives a "stop" event from service governor 450 or a higher-level resource governor. When resource governor 500 performs this transition, resource governor 500 may invoke the "processEvent" method of the service governor for the resource in order to provide the service governor with a "resource start failed" event. Resource governor 500 may also transition from "allocated" state 504 to "unallocated" state 502 when resource governor 500 receives a "Harvest" event from the service governor. A service governor may generate a "harvest" event when the service governor invokes the "forceStopResource" method of resource governor 500 in order to stop a resource so that the resource may be used for another purpose. When resource governor 500 performs this transition, resource governor 500 may invoke the "processEvent" method of the service governor in order to provide the service governor with a "resource start failed" event.

Resource governor 500 may transition from "allocated" state 504 back to "allocated" state 504 when resource governor 500 receives an "allocate" event from the service governor. In addition, resource governor 500 may transition from "allocated" state 504 back to "allocated" state 504 when resource governor 500 receives a "dependent ready" event, a "dependent running" event, or a "task complete" event from the resource governed by resource governor 500. Resource governor 500 may also transition from "allocated" state 504 back to "allocated" state 504 when resource governor 500 receives a "recover" event from the service governor. When resource governor 500 performs this transition, resource governor 500 may invoke the "publish" method to provide a "recover" event to higher-level resource governors.

Resource governor 500 may transition from "allocated" state 504 to a "getting ready" state 508 when either of two events occur. First, resource governor 500 may transition from "allocated" state 504 to "getting ready" state 508 when resource governor 500 receives a "get ready" event from a higher-level resource governor. When resource governor 500 performs this first transition, resource governor 500 sets the value of "tasks" to 2, and may invoke the "getReady" method of the resource action module to make the resource ready to be started. In addition, when resource governor 500 performs this first transition, resource governor 500 may invoke the "propagate" method of the resource governor to provide a "get ready" event to an immediately lower resource governor and to instruct the lower resource governor to reply to the "get ready" event with a "dependent ready" event. Second, resource governor 500 may transition from "allocated" state 504 to "getting ready" state 508 when resource governor 500 receives a "start chain" event from chain assembly module 112. When resource governor 500 performs this second transition, resource governor 500 sets the value of "tasks" to 2, sets the value of "startChain" to true, and may invoke the "getReady" method of the resource action module. In addition, when resource governor 500 performs this second transition, resource governor 500 may invoke the "propagate" method of the resource governor to provide a "get ready" event and a "dependent ready" to the immediately lower resource governor.

When resource governor 500 is in "getting ready" state 508, the resource and its dependent resources, if any, are getting ready to run. Resource governor 500 may transition from "getting ready" state 508 back to "getting ready" state 508 when resource governor 500 receives any of several events. For example, resource governor 500 may transition from "getting ready" state 508 back to "getting ready" state 508 when resource governor 500 receives an "allocate" event, a "get ready" event, a "dependent ready" event, a "dependent running" event, a "task complete" event, or a "stop" event when the number of uses is not zero. In this example, resource governor 500 does not perform any action in response to these events. In another example, resource governor 500 may transition from "getting ready" state 508 back to "getting ready" state 508 when resource governor 500 receives a "start chain" event from chain assembly module 112. When resource governor 500 performs this transition, resource governor 500 sets the value of "startChain" to true. In addition, resource governor 500 may transition from "getting ready" state 508 back to "getting ready" state 508 when resource governor 500 receives a "dependent ready" event and the value of "depTaskCounted" is not true. When resource governor 500 performs this transition, resource governor 500 sets the value of "depTaskCounted" to true and decrements the value of "tasks." In this way, resource governor 500 indicates that a resource dependent on the resource governed by resource governor 500 is ready to run. Resource governor 500 may also transition from "getting ready" state 508 back to "getting ready" state 508 when resource governor 500 receives an "I am ready" event from the resource governed by resource governor 500. When resource governor 500 performs this transition, resource governor 500 decrements the value of "tasks."

Resource governor 500 may transition from "getting ready" state 508 to a "getting ready failed" state 510 when one of several events occur. In particular, resource governor 500 may transition from "getting ready" state 508 to "getting ready failed" state 510 when resource governor 500 receives a "dependent failed" event from lower-level resource governor. Furthermore, when resource governor 500 is in "getting ready" state 508 and receives a "dependent failed" event when "depTaskCounted" is not true, resource governor 500 sets the value of "depTaskCounted" to true, decrements the value of "tasks", and transitions to "getting ready failed" state 510. Resource governor 500 may also transition from "getting ready" state 508 to "getting ready failed" state 510 when resource governor 500 receives a "stop" event from the service governor or the higher-level resource governor when the value returned by the "uses" method is zero. The "uses" method may return a usage count for the resource governed by resource governor 500. A usage count reflects the number of resources that are dependent on the resource governed by resource governor 500. In addition, resource governor 500 transitions from "getting ready" state 508 to "getting ready failed" state 510 when resource governor 500 receives a "harvest" event from the service governor. When resource governor 500 is in "getting ready" state 508 and receives an "I am failed" event from the resource governed by resource governor 500, resource governor 500 decrements the value of "tasks" and transitions to "getting ready failed" state 510.

When resource governor 500 is in "getting ready failed" state 510, resource governor 500 may transition to a "complete tasks" state 512 when the value of "tasks" equals zero. While in "complete tasks" state 512, resource governor 500 completes all outstanding tasks of the resource. When resource governor 500 performs this transition, resource governor 500 sets the value of "restingState" to "startFailed". In addition, when resource governor 500 performs this transition, resource governor 500 may invoke the "publish" method to provide the event "dependent failed" to higher-level resource governors. Resource governor 500 may also invoke the "resetRetries" method.

Resource governor 500 may transition from "getting ready failed" state 510 back to "getting ready failed" state 510 in response to several events. For instance, resource governor 500 may transition from "getting ready failed" state 510 back to "getting ready failed" state 510 in response to a "start chain" event from chain assembly module 112, a "get ready" event from a higher-level resource governor, or a "stop" event from the service governor or a higher-level resource governor. When resource governor 500 performs any of these transitions, resource governor 500 may invoke the "publish" method in order to provide higher-level resource governors with a "dependent failed" event. When resource governor 500 receives a "dependent ready" event and the value of "depTaskCounted" is not true, resource governor 500 transitions from "getting ready failed" state 510 back to "getting ready failed" state 510 and sets the value of "depTaskCounted" to true and decrements the value of "tasks." When resource governor 500 is in "getting ready failed" state 510 and resource governor 500 receives an "I am ready" event from the resource governed by resource governor 500, resource governor 500 decrements the value of "tasks." Similarly, when resource governor 500 is in "getting ready failed" state 510 and receives an "I am failed" event from the resource governed by resource governor 500, resource governor 500 decrements the value of "tasks." When resource governor 500 receives a "dependent failed" event and the value of "depTaskCounted" is not true, resource governor 500 transitions from "getting ready failed" state 510 back to "getting ready failed" state 510 and sets the value of "depTaskCounted" to true and decrements the value of "tasks." Resource governor 500 may transition from "getting ready failed" state 510 back to "getting ready failed" state 510 when resource governor 500 receives a "dependent ready" event, a "harvest" event, a "dependent running" event, a "dependent failed" event, a "task complete" event, or a "stop" event when there are one or more uses. In this example, resource governor 500 does not perform any action in response to these events.

Resource governor 500 may transition from "getting ready" state 508 to a "wait to run" state 514. When resource governor 500 is in "wait to run" state 514, the resource governed by resource governor 500 is waiting for its dependent resources to start running before starting to run itself. In particular, resource governor 500 may transition from "getting ready" state 508 to "wait to run" state 514 when the value of "tasks" equals zero and the value of "startChain" equals true. The value of "tasks" equals zero only when resource governor 500 has received a "dependent ready" event that indicates that a resource dependent on the resource governed by resource governor 500 is ready and when resource governor 500 has received an "I am ready" event that indicates that the resource governed by resource governor 500 is ready. When resource governor 500 performs this transition, resource governor 500 may invoke the "propagate" method of the resource governor to provide a lower-level resource governor with a "start" event and to instruct the lower resource governor to reply to the "start" event with a "dependent running" event.

Resource governor 500 may transition from "getting ready" state 508 to a "ready" state 516. When resource governor 500 is in "ready" state 516, the resource governed by resource governor 500 and its dependent resources are ready to run. In particular, resource governor 500 may transition from "getting ready" state 508 to "ready" state 516 when the value of "tasks" equals zero and the value of "startChain" equals false. The value of "tasks" equals zero only when resource governor 500 has received a "dependent ready" event that indicates that a resource dependent on the resource governed by resource governor 500 is ready and when resource governor 500 has received an "I am ready" event that indicates that the resource governed by resource governor 500 is ready. When resource governor 500 performs this transition, resource governor 500 may invoke the "publish" method to provide a higher-level resource governor with a "dependent ready" event.

When resource governor 500 is in "wait to run" state 514, resource governor 500 may transition to "complete tasks" state 512 when resource governor 500 receives a "harvest" event from the service governor or receives a "stop" event from the service governor or a higher-level resource governor when the value returned by the "uses" method is zero. When resource governor 500 performs either of these transition from "wait to run" state 514 to "complete tasks" state 512, resource governor 500 may invoke the "publish" method in order to provide a "dependent failed" event to higher-level resource governors. In addition, resource governor 500 may invoke the "resetRetries" method and sets the value of "restingState" to "startFailed."

Resource governor 500 may also transition from "wait to run" state 514 to "complete tasks" state 512 when resource governor 500 receives a "dependent failed" event from a lower-level resource governor. When resource governor 500 performs this transition, resource governor 500 sets the value of "restingState" to "startFailed". Resource governor 500 may also invoke the "publish" method to provide a "dependent failed" event to higher-level resource governors and may invoke the "resetRetries" method.

When resource governor 500 is in "wait to run" state 514, resource governor 500 may transition to a "booting" state 518 when resource governor 500 receives a "dependent running" event. While resource governor 500 is in "booting" state 518, the resource governed by resource governor 500 is booting. When resource governor 500 performs this transition, resource governor 500 may invoke the "startResource" method of the resource action module in order to cause the resource governed by resource governor 500 to start booting. In addition, resource governor 500 also may invoke the "setRetries" method of the resource action module to set the value of "retries" to the value returned by invoking the "getRetries" method of the resource action module.

Resource governor 500 may transition from "ready" state 516 to "wait to run" state 514 when resource governor 500 receives a "start" event from a higher-level resource governor. When resource governor 500 performs this transition, resource governor 500 may invoke the "propagate" method of the resource governor to provide a "start" event to the immediately lower-level resource governor.

When resource governor 500 is in "wait to run" state 514, resource governor 500 may transition back to "wait to run" state 514 in response to several events. For instance, resource governor 500 may transition back to "wait to run" state 514 when resource governor 500 receives a "start chain" event from chain assembly module 112 or a "get ready" event from a higher-level resource governor. When resource governor 500 performs either of these transitions, resource governor 500 may invoke the "publish" method in order to provide higher-level resource governors with a "dependent ready" event. Resource governor 500 may also transition back to "wait to run" state 514 when resource governor 500 receives a "recover" event from the service governor. When resource governor 500 performs this transition, resource governor 500 may invoke the "publish" method in order to provide a "recover" event to higher-level resource governors and may invoke the "propagate" method of the resource governor in order to provide a "start" event to a lower-level FSM and to instruct the lower resource governor to reply to the "start" event with a "dependent running" event. Resource governor 500 may transition from "wait to run" state 514 back to "wait to run" state 514 in response to an "allocate" event, a "dependent ready" event, a "stop" event, a "start" event, or a "task complete" event. In this example, resource governor 500 does not perform any action in response to these events.

Resource governor 500 may also transition from "ready" state 516 to "complete tasks" state 512. In particular, resource governor 500 transitions from "ready" state 516 to "complete tasks" state 512 when resource governor 500 receives a "harvest" event from the service governor or when resource governor 500 receives a "stop" event from the service governor or a higher-level resource governor when the value returned by invoking the "uses" method is zero. When resource governor 500 performs either of these transitions, resource governor 500 may invoke the "publish" method in order to provide higher-level resource governors with a "dependent failed" event. In addition, resource governor 500 sets the value of "restingState" to "startFailed" and may invoke the "resetRetries" method.

Resource governor 500 may transition from "ready" state 516 back to "ready" state 516 in response to several events. In particular, resource governor 500 may transition from "ready" state 516 back to "ready" state 516 when resource governor 500 receives an "allocate" event from chain assembly module 112, a "start chain" event from chain assembly module 112, or a "recover" event from the service governor. When resource governor 500 transitions from "ready" state 516 to "ready" state 516 in response to a "start chain" event, resource governor 500 may invoke the "publish" method in order to provide higher-level resource governors with a "dependent ready" event. When resource governor 500 transitions from "ready" state 516 to "ready" state 516 in response to a "recover" event, resource governor 500 may invoke the "publish" method in order to provide higher-level resource governors with a "recover" event. In addition, resource governor 500 may transition from "ready" state 516 back to "ready" state 516 in response to a "get ready" event from a higher-level resource governor. The "get ready" event instructs resource governor 500 to prepare the resource governed by resource governor 500 to run. When resource governor 500 receives the "get ready" event, resource governor 500 may invoke the "publish" method in order to provide a "dependent ready" event to higher-level resource governors. Resource governor 500 may also transition from "ready" state 516 back to "ready" state 516 when resource governor 500 receives a "dependent ready" event or a "dependent running" event from a lower-level resource governor. Furthermore, resource governor 500 may transition from "ready" state 516 back to "ready" state 516 when resource governor 500 receives a "stop" event from the service governor or from a higher-level resource governor. The "stop" event instructs resource governor 500 to stop the resource if the resource is no longer in use. When resource governor 500 receives a "task complete" event from the resource governed by resource governor 500, resource governor 500 may transition from "ready" state 516 back to "ready" state 516 without performing any additional action. Resource governor 500 may transition from "ready" state 516 back to "ready" state 516 when resource governor 500 receives an "allocate" event, a "dependent ready" event, a "stop" event, a "dependent running" event, or a "task complete" event. In this example, resource governor 500 does not perform any action in response to these events.

When resource governor 500 is in "booting" state 518, resource governor 500 may transition to "complete tasks" state 512 when resource governor 500 receives a "dependent failed" event from a lower-level resource governor. When resource governor 500 performs this transition, resource governor 500 may invoke the "publish" method to provide higher-level resource governors with a "dependent failed" event. In addition, resource governor 500 sets the value of "restingState" to "startFailed" and may invoke the "resetRetries" method.

Resource governor 500 may transition from "booting" state 518 to a "cancel boot" state 520 when one of three events occur. First, resource governor 500 may transition from "booting" state 518 to "cancel boot" state 520 when resource governor 500 receives a "harvest" event from the service governor. Second, resource governor 500 may transition from "booting" state 518 to "cancel boot" state 520 when resource governor 500 receives a "dependent failed" event from a lower-level resource governor. Third, resource governor 500 may transition from "booting" state 518 to "cancel boot" state 520 when resource governor 500 receives a "stop" event from the service governor or from a higher-level resource governor and when the value returned by invoking the "uses" method equals zero. When resource governor 500 performs any of these transitions, resource governor 500 may invoke the "publish" method to provide a "dependent failed" event to higher-level resource governors.

Resource governor 500 may transition from "booting" state 518 back to "booting" state 518 in response to several events. In particular, resource governor 500 may transition from "booting" state 518 back to "booting" state 518 when resource governor 500 receives a "start chain" event from chain assembly module 112. When resource governor 500 performs this transition, resource governor 500 may invoke the "publish" method in order to provide a "dependent ready" event to higher-level resource governors. Resource governor 500 may also transition from "booting" state 518 back to "booting" state 518 when resource governor 500 receives a "get ready" event from a higher-level resource governor. When resource governor 500 transitions from "booting" state 518 back to "booting" state 518 in response to a "get ready" event, resource governor 500 may invoke the "publish" method in order to provide higher-level resource governors with a "dependent ready" event. When resource governor 500 receives a "start failed" event from the resource governed by resource governor 500 when the value of "retries" is greater than zero, resource governor 500 transitions from "booting" state 518 back to "booting" state 518. Resource governor 500 may invoke the "startResource" method of the resource action module and decrements the value of "retries" when resource governor 500 performs this transition. Resource governor 500 may also transition from "booting" state 518 back to "booting" state 518 when resource governor 500 receives a "recover" event from the service governor. When resource governor 500 performs this transition, resource governor 500 may invoke the "publish" method in order to provide higher-level resource governors with a "recover" event, may invoke the "startMonitoring" method of the resource governor, may set the value of "retries" to the value returned by invoking the "getRetries" method, and may invoke the "setBootTimeout" method of the resource action module in order to start a timer, such that when the timer expires and the computing node has not booted the resource, a "dependent failed" event is generated. Resource governor 500 may transition from "booting" state 518 back to "booting" state 518 in response to an "allocate" event, a "dependent ready" event, a "stop" event, a "start" event, a "dependent running" event, an "I am failed" event, or a "task complete" event. In this example, resource governor 500 does not perform any action in response to these events.

Resource governor 500 may transition from "booting" state 518 to a "running" state 522 when resource governor 500 receives an "I am running" event from the collector module that monitors the resource governed by resource governor 500. While resource governor 500 is in "running" state 522, the resource governed by resource governor 500 is running and providing service. When resource governor 500 performs this transition, resource governor 500 may invoke the "processEvent" method of the service governor to provide the service governor with a "resource started" event. Resource governor 500 may also invoke the "publish" method to provide a "dependent running" event to higher-level resource governors. In addition, resource governor 500 may invoke the "cancelTimeout" method of the resource action module to cancel the timeout clock that may have been previously set. Resource governor 500 also sets the value of "retries" to zero.

When resource governor 500 is in "running" state 522, resource governor 500 may transition back to "running" state 522 in response to several events. For instance, resource governor 500 transitions back to "running" state 522 in response to a "start chain" event from chain assembly module 112. When resource governor 500 performs this transition, resource governor 500 may invoke the "publish" method in order to provide higher-level resource governors with a "dependent ready" event. In addition, resource governor 500 transitions from "running" state 522 back to "running" state 522 in response to a "get ready" event from a higher-level resource governor. When resource governor 500 performs this transition, resource governor 500 may invoke the "publish" method in order to provide a "dependent ready" event to higher-level resource governors. When resource governor 500 is in "running" state 522 and receives a "start" event from a higher-level resource governor, resource governor 500 transitions back to "running" state 522 and may invoke the "publish" method in order to provide a "dependent running" event to higher-level resource governors. When resource governor 500 receives an "I am running" event while in "running" state 522, resource governor 500 may invoke the "processEvent" method of the service governor in order to provide the service governor with a "resource started" event and may also invoke the "publish" method in order to provide higher-level resource governors with a "dependent running" method. When resource governor 500 receives a "recover" method while in "running" state 522, resource governor 500 may invoke the "publish" method in order to provide a "recover" event to higher-level resource governors and may invoke the "startMonitoring" method of the resource governor. Resource governor 500 may transition from "running" state 522 back to "running" state 522 in response to an "allocate" event, a "dependent ready" event, a "stop" event, a "dependent running" event, or a "task complete" event. In this example, resource governor 500 does not perform any action in response to these events.

When resource governor 500 is in "running" state 522, resource governor 500 may transition to "complete tasks" state 512 when resource governor 500 receives a "dependent failed" event. When resource governor 500 performs this transition, resource governor 500 may invoke the "publish" method to provide a "dependent failed" event to higher-level resource governors. In addition, resource governor 500 may invoke the "stopResource" method of the resource action module to instruct the resource governed by resource governor 500 to stop operation. Resource governor 500 may also invoke the "resetRetries" method of the resource action module and sets the value of "restingState" to "failed". In addition, resource governor 500 may invoke the "stopMonitoring" method of resource governor 500 to instruct status infrastructure 102 to stop monitoring the resource.

Resource governor 500 may transition from "running" state 522 to a "wait to stop" state 524 in response to two events. First, resource governor 500 may transition from "running" state 522 to "wait to stop" state 524 when resource governor 500 receives a "harvest" event from the service governor. Second, resource governor 500 may transition from "running" state 522 to "wait to stop" state 524 when resource governor 500 receives a "stop" event and the value returned by invoking the "uses" method is zero. When resource governor 500 performs either of these transitions, resource governor 500 may invoke the "publish" method to provide a "dependent failed" event to higher-level resource governor. In addition, resource governor 500 may invoke the "stopResource" method of the resource action module in instruct the resource governed by the resource governor 500 to stop operating. When resource governor 500 is in "wait to stop" state 524, resource governor 500 waits while the resource governed by resource governor 500 stops.

Resource governor 500 may also transition from "running" state 522 to a "who failed" state 526 when resource governor 500 receives an "I am failed" event from the resource governed by resource governor 500. When resource governor 500 is in "who failed" state 526, resource governor 500 waits while it is determined whether the failed resource is the resource governed by resource governor 500 or a dependent resource. During the transition from "running" state 522 to "who failed" state 526, resource governor 500 may invoke the "stopMonitoring" method of the resource action module to instruct status infrastructure 102 to stop monitoring the resource governed by resource governor 500. In addition, resource governor 500 may invoke a "probe" method of the resource action module. The "probe" method of the resource action module determines whether the resource is still operating. Resource governor 500 may also invoke the "stopResource" method of the resource action module to instruct the resource governed by resource governor 500 to stop operating.

When resource governor 500 is in "who failed" state 526, resource governor 500 may transition back to "who failed" state 526 in response to several events. Resource governor 500 may transition back to "who failed" state 526 when resource governor 500 receives a "start chain" event from chain assembly module 112. When resource governor 500 performs this transition, resource governor 500 may invoke the "publish" method in order to provide a "dependent failed" event to higher-level resource governors. In addition, resource governor 500 transitions from "who failed" state 526 back to "who failed" state 526 when resource governor 500 receives a "get ready" event from a higher-level resource governor. When resource governor 500 performs this transition, resource governor 500 may invoke the "publish" method in order to provide higher-level resource governors with a "dependent failed" event. When resource governor 500 receives a "stop" event and the value returned by invoking the "uses" method equals or does not equal zero, resource governor 500 transitions from "who failed" state 526 back to "who failed" state 526 and may invoke the "publish" method in order to provide a "dependent failed" event to higher-level resource governors. When resource governor 500 receives a "harvest" event from the service governor, resource governor 500 may invoke the "publish" method in order to provide higher-level resource governors with a "dependent failed" event. When resource governor 500 receives a "start" event from a higher-level resource governor, resource governor 500 may invoke the "publish" method in order to provide higher-level resource governors with a "dependent failed" event. Resource governor 500 may transition from "who failed" state 526 back to "who failed" state 526 in response to a "dependent ready" event, an "I am failed" event, or a "task complete" event. In this example, resource governor 500 does not perform any action in response to these events.

Resource governor 500 may transition from "who failed" state 526 to "complete tasks" state 512 in response to any of three events. First, resource governor 500 may transition from "who failed" state 526 to "complete tasks" state 512 in response to an "It's Me" event. Second, resource governor 500 may transition from "who failed" state 526 to "complete tasks" state 512 in response to a "dependent running" event. Third, resource governor 500 may transition from "who failed" state 526 to "complete tasks" state 512 in response to a "dependent failed" event. When resource governor 500 performs any of these transitions, resource governor 500 may invoke the "publish" method to provide a "dependent failed" event to higher-level FSMs. In addition, resource governor 500 may invoke the "resetRetries" method and may set the value of "restingState" to "failed".

When resource governor 500 is in "cancel boot" state 520, resource governor 500 may transition to "complete tasks" state 512 when resource governor 500 receives a "start failed" event from the resource governed by resource governor 500. When resource governor 500 performs this transition, resource governor 500 may invoke the "stopMonitoring" method of resource governor 500 to instruct status infrastructure 102 to stop monitoring the resource. In addition, resource governor 500 may invoke the "resetRetries" method of the resource action module and may set the value of "restingState" to "startFailed".

Further, when resource governor 500 is in "cancel boot" state 520, resource governor 500 may transition to "wait to stop" state 524 when resource governor 500 receives an "I am running" event from a collector module that monitors the resource governed by resource governor 500. During this transition, resource governor 500 may invoke the "cancelTimeout" method of the resource action module to cancel the timeout clock. Resource governor 500 may also invoke the "processEvent" method of the service governor in order to provide the service governor with a "resource started" event. In addition, resource governor 500 may invoke the "stopResource" method of the resource action module to instruct the resource governed by resource governor 500 to stop operating.

When resource governor 500 is in "cancel boot" state 520, resource governor 500 may transition back to "cancel boot" state 520 in response to several events. When resource governor 500 is in "cancel boot" state 520, resource governor 500 may transition back to "cancel" boot state 520 and invoke the "publish" method in order to provide higher-level resource governors with a "dependent failed" event. In addition, resource governor 500 may transition back to "cancel boot" state 520 when resource governor 500 receives a "get ready" event from a higher-level resource governor. When resource governor 500 performs this transition, resource governor 500 may invoke the "publish" method in order to provide higher-level resource governors with a "dependent failed" event. Similarly, when resource governor 500 receives a "start" event from a higher-level resource governor, resource governor 500 transitions back to "cancel boot" state 520 and may invoke the "publish" method in order to provide higher-level resource governors with a "dependent failed" event. Resource governor 500 may transition from "cancel boot" state 520 back to "cancel boot" state 520 when resource governor 500 receives a "dependent ready" event, a "stop" event, a "harvest" event, a "dependent ready" event, a "dependent failed" event, or a "task complete" event. In this example, resource governor 500 does not perform any action in response to these events.

Resource governor 500 may transition from "wait to stop" state 524 to "complete tasks" state 512 when resource governor 500 receives a "stop failed" event from the resource governed by resource governor 500. When resource governor 500 performs this transition, resource governor 500 may invoke the "stopMonitoring" method of resource governor 500 to instruct status infrastructure 102 to stop monitoring the resource governed by resource governor 500. In addition, resource governor 500 may invoke the "publish" method to provide a "dependent failed" event to higher-level resource governors. Resource governor 500 may also set the value of "restingState" to "stopFailed".

Resource governor 500 may transition from "wait to stop" state 524 to "complete tasks" state 512 when resource governor 500 receives an "I am failed" event from the resource governed by resource governor 500. When resource governor 500 performs this transition, resource governor 500 may invoke the "stopMonitoring" method of resource governor 500 to instruct status infrastructure 102 to stop monitoring the resource governed by resource governor 500. In addition, resource governor 500 may invoke the "resetRetries" method of the resource action module and may set the value of "restingState" to "stopped."

Resource governor 500 may transition from "wait to stop" state 524 back to "wait to stop" state 524 in response to several events. For instance, resource governor 500 may transition back to "wait to stop" state 524 when resource governor 500 receives a "start chain" event from chain assembly module 112, a "get ready" event from a higher-level resource governor, a "stop" event from the service governor or a higher-level resource governor, or a "harvest" event from the service governor. When resource governor 500 receives any of these events, resource governor 500 may invoke the "publish" method in order to provide a "dependent failed" event to higher-level resource governors. Resource governor 500 may also transition from "wait to stop" state 524 back to "wait to stop" state 524 when resource governor 500 receives an "I am running" event from a collector module that monitors the resource governed by resource governor 500. When resource governor 500 performs this transition, resource governor 500 may invoke the "stopResource" method of the resource action module to instruct the resource governed by resource governor 500 to stop operating. In addition, resource governor 500 may transition from "wait to stop" state 524 back to "wait to stop" state 524 when resource governor 500 receives a "recover" event from the service governor. When resource governor 500 performs this transition, resource governor 500 may invoke the "publish" method in order to provide a "recover" event to higher-level resource governors, may invoke the "startMonitoring" method of resource governor 500, and may invoke the "stopResource" method of the resource action module. Resource governor 500 may transition from "wait to stop" state 524 back to "wait to stop" state 524 when resource governor 500 receives a "dependent ready" event, a "dependent running" event, a "dependent failed" event, or a "task complete" event. In this example, resource governor 500 does not perform any action in response to these events.

When resource governor 500 is in "complete tasks" state 512, resource governor 500 may transition back to "complete tasks" state 512 in response to several events. For instance, resource governor 500 may transition from "complete tasks" state 512 back to "complete tasks" state 512 when resource governor 500 receives a "start chain" event from chain assembly module 112, a "get ready" event from a higher-level resource governor, a "stop" event from the service governor or a higher-level resource governor, or a "dependent failed" event from a lower-level resource governor. When resource governor 500 performs any of these transitions, resource governor 500 may invoke the "publish" method in order to provide higher-level resource governors with a "dependent failed" event. Resource governor 500 may transition from "complete tasks" state 512 back to "complete tasks" state 512 in response to an "allocate" event, a "dependent ready" event, an "I am ready" event, a "harvest" event, a tasks equals zero condition, an "I am running" event, a "start failed" event, an "I am failed" event, a "dependent failed" event, an "It is me" event, a "stop failed" event, or a "task complete" event. In this example, resource governor 500 does not perform any action in response to these events.

When resource governor 500 is in "complete tasks" state 512, resource governor 500 may transition to a "stopped" state 528. When resource governor 500 is in "stopped" state 528, the resource governed by resource governor 500 has stopped naturally. Resource governor 500 may perform this transition when the value returned by invoking the "getTaskCount" method equals zero, and the value of "restingState" equals "stopped". When resource governor 500 performs this transition, resource governor 500 may invoke the "processEvent" method of the service governor to provide the service governor with a "resource stopped" event.

When resource governor 500 is in "stopped" state 528, resource governor 500 may transition back to "stopped" state 528 in response to several events. For instance, resource governor 500 may transition back to "stopped" state 528 when resource governor 500 receives a "start chain" event from chain assembly module 112, a "get ready" event from a higher-level resource governor, a "stop" event from the service governor or a higher-level resource governor, or a "dependent running" event from a lower-level resource governor. When resource governor 500 performs any of these transitions, resource governor 500 may invoke the "publish" method in order to provide higher-level resource governors with a "dependent failed" event. Resource governor 500 may also transition from "stopped" state 528 back to "stopped" state 528 or when resource governor 500 receives a "recover" event from the service governor. When resource governor 500 performs this transition, resource governor 500 may invoke the "publish" method in order to provide higher-level resource governors with a "recover" event. Resource governor 500 may transition from "stopped" state 528 back to "stopped" state 528 when resource governor 500 receives a "task complete" event. In this example, resource governor 500 does not perform any action in response to this event.

Resource governor 500 may also transition from "complete tasks" state 512 to a "failed" state 530. When resource governor 500 is in "failed" state 530, the resource governed by resource governor 500 has failed. Resource governor 500 may perform this transition when the value returned by invoking the "getTaskCount" method equals zero, the value returned by invoking the "uses" method equals zero, and the value of "restingState" equals "failed". When resource governor 500 performs this transition, resource governor 500 may invoke the "processEvent" method of the service governor to provide the service governor with a "resource failed" event.

When resource governor 500 is in "failed" state 530, resource governor 500 may transition back to "failed" state 530 in response to several events. For instance, resource governor 500 may transition back to "failed" state 530 when resource governor 500 receives a "start chain" event from chain assembly module 112, a "get ready" event from a higher-level resource governor, a "stop" event from the service governor or a higher-level resource governor, or a "dependent running" event from a lower-level resource governor. When resource governor 500 performs any of these transitions, resource governor 500 may invoke the "publish" method in order to provide higher-level resource governor with a "dependent failed" event. Resource governor 500 may also transition from "failed" state 530 back to "failed" state 530 when resource governor 500 receives a "recover" event from the service governor. When resource governor 500 performs this transition, resource governor 500 may invoke the "publish" method in order to provide higher-level resource governors with a "recover" event. In addition, resource governor 500 may transition from "failed" state 530 back to "failed" state 530 when resource governor 500 receives a "task complete" event. In this example, resource governor 500 does not perform any action in response to this event.

Resource governor 500 may also transition from "complete tasks" state 512 to a "start failed" state 532. When resource governor 500 is in "start failed" state 532, the resource governed by resource governor 500 has failed to start after being allocated. Resource governor 500 may perform this transition when the value returned by invoking the "getTaskCount" method equals zero, the value returned by invoking the "uses" method equals zero, and the value of "restingState" equals "startFailed". When resource governor 500 performs this transition, resource governor 500 may invoke the "processEvent" method of the service governor to provide the service governor with a "resource start failed" event.

When resource governor 500 is in "start failed" state 532, resource governor 500 may transition back to "start failed" state 532 in response to several events. For instance, resource governor 500 may transition back to "start failed" state 532 when resource governor 500 receives a "start chain" event from chain assembly module 112, a "get ready" event from a higher-level resource governor, a "stop" event from the service governor or a higher-level resource governor, or a "dependent running" event from a lower-level resource governor. When resource governor 500 performs any of these transitions, resource governor 500 may invoke the "publish" method in order to provide higher-level resource governor with a "dependent failed" event. Resource governor 500 may also transition from "start failed" state 532 back to "start failed" state 532 when resource governor 500 receives a "recover" event from the service governor. When resource governor 500 performs this transition, resource governor 500 may invoke the "publish" method in order to provide higher-level resource governors with a "recover" event.

Resource governor 500 may also transition from "complete tasks" state 512 to a "stop failed" state 534. When resource governor 500 is in "stop failed" state 534, the resource governed by resource governor 500 has failed to stop when requested. Resource governor 500 may perform this transition when the value returned by invoking the "getTaskCount" method equals zero, the value returned by invoking the "uses" method equals zero, and the value of "restingState" equals "stopFailed". When resource governor 500 performs this transition, resource governor 500 may invoke the "processEvent" method of service governor 450 to provide service governor 450 with a "resource stop failed" event.

When resource governor 500 is in "stop failed" state 534, resource governor 500 may transition back to "stop failed" state 534 in response to several events. For instance, resource governor 500 may transition back to "stop failed" state 534 when resource governor 500 receives a "start chain" event chain assembly module 112, a "get ready" event from a higher-level resource governor, a "stop" event from service governor 450 or a higher-level resource governor, or a "dependent running" event from a lower-level resource governor. When resource governor 500 performs any of these transitions, resource governor 500 may invoke the "publish" method in order to provide higher-level resource governors with a "dependent failed" event. Resource governor 500 may also transition from "stop failed" state 534 back to "stop failed" state 534 when resource governor 500 receives a "recover" event from service governor 450. When resource governor 500 performs this transition, resource governor 500 may invoke the "publish" method in order to provide higher-level resource governors with a "recover" event. Resource governor 500 may transition from "stop failed" event 534 back to "stop failed" event 534 when resource governor 500 receives a "dependent failed" event or a "task complete" event. In this example, resource governor 500 does not perform any action in response to these events.

Resource governor 500 may transition from "stopped" state 528, from "failed" state 530, from "start failed" state 532, and from "stop failed" state 534 to "final" state 506 when resource governor 500 receives a "destroy" event from service governor 450. The "destroy" event instructs resource governor 500 to destroy the resource governed by resource governor 500. When resource governor 500 is in "final" state 506, the resource governed by resource governor 500 has been destroyed.

When resource governor 500 is in "final" state 506, resource governor 500 may transition back to "final" state 506 when resource governor 500 receives any of several events. For instance, resource governor 500 may transition back to "final" state 506 when resource governor 500 receives a "start chain" event from chain assembly module 112, a "get ready" event from a higher-level resource governor, a "stop" event from service governor 450 or a higher-level resource governor, a "harvest" event from chain assembly module 112, or a "start" event from a higher-level resource governor. When resource governor 500 performs any of these transitions, resource governor 500 may invoke the "publish" method in order to provide higher-level resource governors with a "dependent failed" event. In addition, resource governor 500 may transition from "final" state 506 back to "final" state 506 when resource governor 500 receives a "dependent ready" event, a "dependent running" event, an "I am failed" event, a "dependent failed" event, a "recover" event, or a "task complete" event. In this example, resource governor 500 does not perform any action in response to these events.

In the example of FIG. 19, resource governor 500 may persist the state variables resource governor 500 when resource governor 500 transitions into "unallocated" state 502, "allocated" state 504, "ready" state 516, "wait to run" state 514, "booting" state 518, "running" state 522, "wait to stop" state 524, "stopped" state 528, "failed" sate 530, "start failed" state 532, "stop failed" state 534, and "final" state 506.

Figure 20:
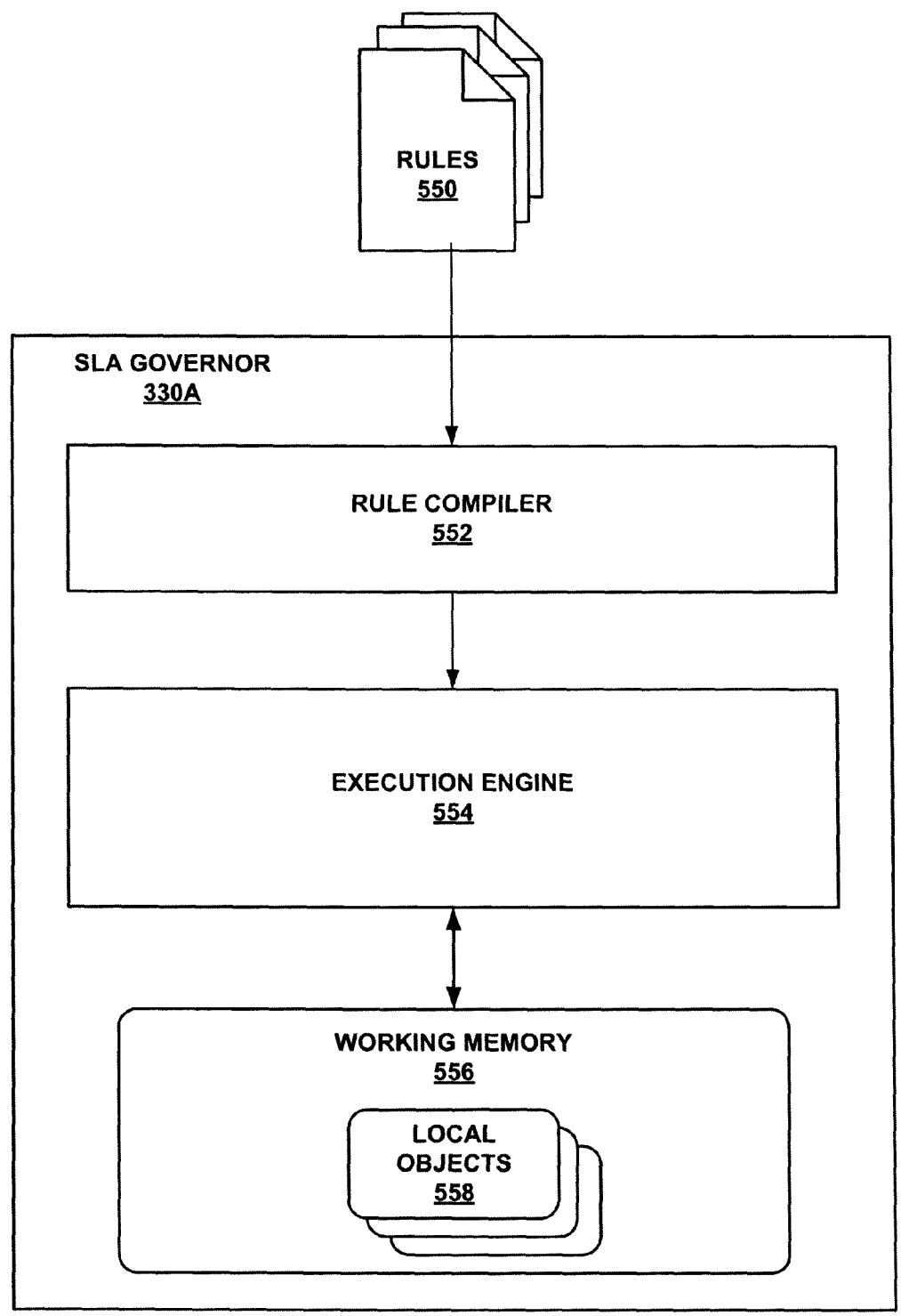
FIG. 20 is a block diagram illustrating example details of a Service-Level Agreement (SLA) governor.

FIG. 20 is a block diagram illustrating example details of SLA governor 160A. While FIG. 20 is explained with regard to SLA governor 160A, it will be understood that SLA governors 160B through 160N may also include the same details.

In the illustrated embodiment, SLA governor 160A includes a rule compiler 552 and an execution engine 554. Each of rules 550 represents a unit of code that conforms to a rule language and expresses a set of triggering conditions and a set of implied actions. When the conditions are met, the actions are eligible to be performed. The following is one example of a configuration rule:

```
rule checkServiceCapacity {
        Service s where status != "overloaded";
        LoadParameter p where p.currentResponseTime <
        s.requireResponseTime;
} > {
        s.status = "overloaded";
    };
}
```

When installed, this example rule marks a service as "overloaded" when the current response time of a service is less than the response time required for the service by a service-level agreement. The following represents another example rule for automatically outputting an event to a service governor of a service s to increase the capacity of distributed computing system 2 to provide the service:

```
rule serviceOverload {
        Service s where status == "overloaded";
} > {
        uctl(s.serviceGovernor);
}
```

Rule compiler 552 may compile each of rules 550 and translate match conditions of the rules into a discrimination network that avoids redundant tests during rule execution. Execution engine 554 handles rule administration, object insertion and retrieval, rule invocation and execution of rule actions. In general, execution engine 554 first matches a current set of rules 550 against a current state of working memory 556 and local objects 558. Execution engine 554 then collects all rules that match as well as the matched objects and selects a particular rule instantiation to fire. Next, execution engine 554 fires (executes) the instantiated rule and propagates any changes to working memory 556. Execution engine 554 repeats the process until no more matching rule instantiations can be found.

Firing of a rule typically produces a very small number of changes to working memory 556. This allows sophisticated rule engines to scale by retaining match state between cycles. Only the rules and rule instantiations affected by changes are updated, thereby avoiding the bulk of the matching process. One exemplary algorithm that may be used by execution engine 554 to handle the matching process includes the RETE algorithm that creates a decision tree that combines the patterns in all the rules and is intended to improve the speed of forward-chained rule system by limiting the effort required to re-compute a conflict set after a rule is fired. One example of a RETE algorithm is described in Forgy, C. L.: 1982, "RETE: a fast algorithm for the many pattern/many object pattern match problem", Artificial Intelligence 19, 1737, hereby incorporated by reference. Other alternatives include the TREAT algorithms, and LEAPS algorithm, as described by Miranker, D. P.: "TREAT: A New and Efficient Match Algorithm for AI Production Systems". ISBN 0934613710 Daniel P. Miranker, David A. Brant, Bernie Lofaso, David Gadbois:

On the Performance of Lazy Matching in Production Systems. AAAI 1990: 685692, each of which are hereby incorporated by reference.

Figure 21:
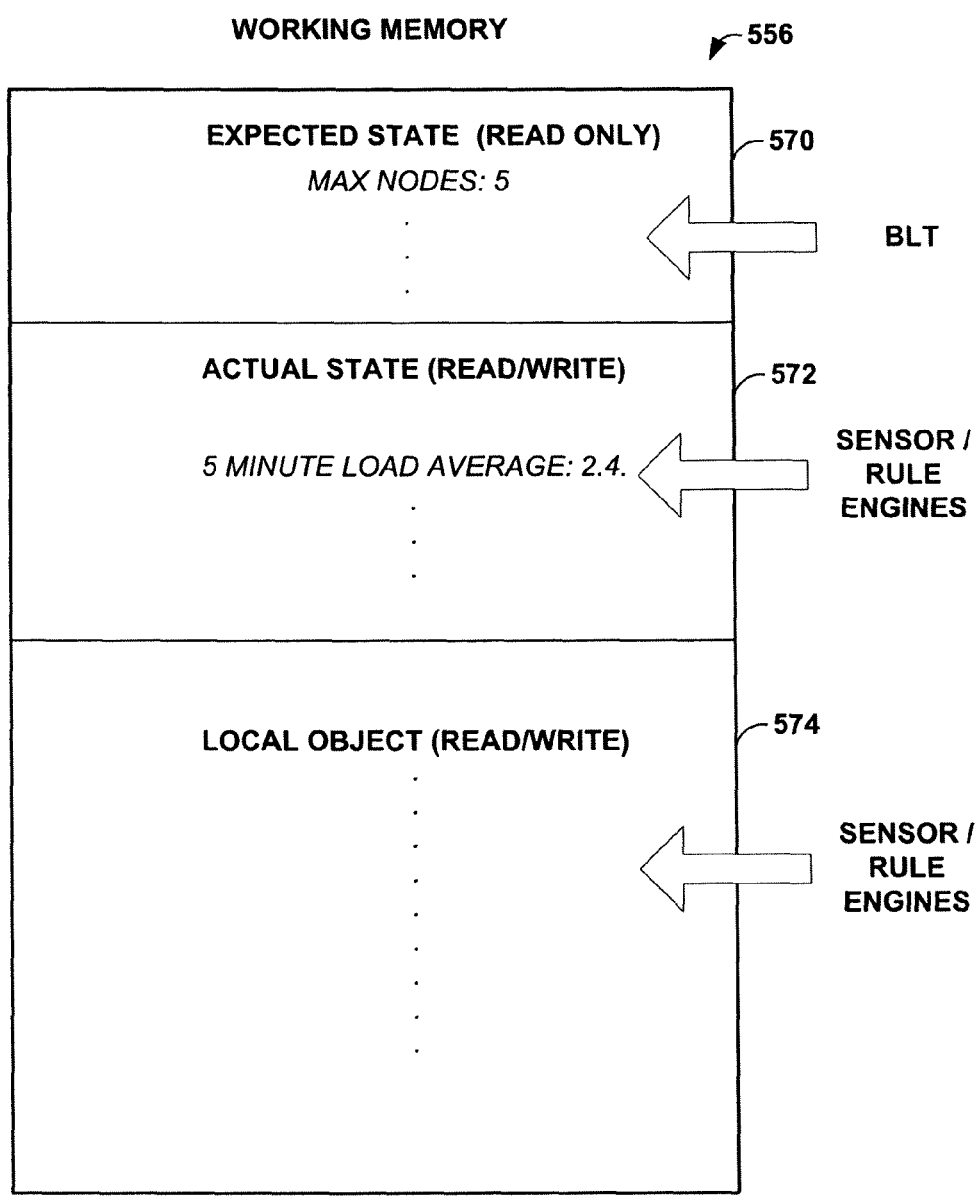
FIG. 21 is a block diagram of an example working memory associated with the SLA governor.

FIG. 21 is a block diagram of an example working memory 556 associated with SLA governor 160A as illustrated in FIG. 21. In this example, working memory 556 includes a first data region 570 that stores the data representing a service-level agreement. In this example working memory, data region 570 may only be modified in response to a trigger from sensor subsystem 166 or by execution engine 554 without notification from administrating interface module 112.

In addition, working memory 556 includes a second data region 572 that is modifiable (i.e., read/write) and may be updated by status infrastructure 102 or used internally by execution engine 554. In general, data region 572 stores aggregated data representing the actual state of the fabric and can be updated by sensor subsystem 166 or by execution engine 554. The actual state may consist of a set of property annotations that can be attached to services defined in a service-level agreement, or to services locally defined within a rule engine, such as local object 574.

The functions described in this disclosure may be implemented in hardware, software, firmware, or any combination thereof. If implemented in software, the functions may be stored as one or more instructions or code on a computer-readable medium. Computer-readable media includes both computer storage media and communication media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Various embodiments of the invention have been described. These and other embodiments are within the scope of the following claims.

The invention claimed is:

1. A system comprising:
a control node, comprising at least one processor, configured to:
calculate a current capacity level of a first resource to perform a first act, the first resource included in a first resource chain, the first resource chain comprising resources that collaborate to provide a first service;
wherein calculating the current capacity level of the first resource comprises adding a predicted pending capacity level indicated by a predicted pending capacity function evaluated with respect to a first time to an actual capacity level of the first resource at the first time, the predicted pending capacity function specifying a relationship between the predicted pending capacity level of the first resource and a length of time;
determine, based on the current capacity level of the first resource to perform the first act, whether to assemble a second resource chain that includes resources that collaborate to provide the first service; and
cause assembly of the second resource chain in response to determining to assemble the second resource chain.

2. The system of claim 1, wherein the control node is configured to determine whether to assemble the second resource chain based on the current capacity level of the first resource to perform the first act by determining whether to assemble the second resource chain based on the current capacity level of the first resource to perform the first act and based on a service-level agreement.

3. The system of claim 2, wherein the control node is further configured to:
compute an overall current capacity level of resources in a set of resource chains that perform the first act, the set of resource chains comprising the first resource chain, each resource chains of the set of resource chains comprising a resource that is capable of performing the first act;
determine whether the overall current capacity level satisfies an overall current capacity level required by the service-level agreement; and
determine to assemble the second resource chain when the overall current capacity level does not satisfy the overall current capacity level required by the service-level agreement.

4. The system of claim 1 wherein the control node is further configured to:
generate a monitored value based on data indicating a current state of one or more of the resources in the first resource chain; and
calculate the actual capacity level based on the monitored value.

5. The system of claim 1, wherein the predicted pending capacity function is based on one or more types of functions selected from a group of types of functions consisting of: linear functions, exponential functions, step-wise functions, sinusoidal functions, logarithmic functions, and cubic functions.

6. The system of claim 1 wherein:
the predicted pending capacity function is equal to a difference between a predicted full capacity level of the first resource and a predicted actual capacity function; and
the predicted actual capacity function represents a prediction of an actual capacity level of the first resource to perform the first act after the first resource is instructed to begin performing the first act.

7. The system of claim 1, wherein:
the predicted pending capacity function is a first predicted pending capacity function; and
the control node is further configured to:
calculate a current capacity level of a second resource to perform a second act, the second resource included in a third resource chain, the third resource chain comprising resources that collaborate to provide a second service;
wherein calculating the current capacity level of the second resource comprises adding a predicted pending capacity level indicated by a second predicted pending capacity function evaluated with respect to a second time to an actual capacity level of the second resource at the second time, the second predicted pending capacity function specifying a relationship between a predicted pending capacity level of the second resource and a length of time;
wherein the first predicted pending capacity function is different that the second predicted pending capacity function;
determine whether to assemble a fourth resource chain that includes resources that collaborate to provide the second service based on the current capacity level of the second resource to perform the second act; and cause assembly of the fourth resource chain in response to determining to assemble the fourth resource chain.

8. A method, performed by executing logic embodied by one or more computer-readable non-transitory storage media, comprising:

calculating a current capacity level of a first resource to perform a first act, the first resource included in a first resource chain, the first resource chain comprising resources that collaborate to provide a first service;

wherein calculating the current capacity level of the first resource comprises adding a predicted pending capacity level indicated by a predicted pending capacity function evaluated with respect to a first time to an actual capacity level of the first resource at the first time, the predicted pending capacity function specifying a relationship between the predicted pending capacity level of the first resource and a length of time;

determining, based on the current capacity level of the first resource to perform the first act, whether to assemble a second resource chain that includes resources that collaborate to provide the first service; and causing assembly of the second resource chain in response to determining to assemble the second resource chain.

9. The method of claim 8, wherein determining whether to assemble the second resource chain based on the current capacity level of the first resource to perform the first act comprises determining whether to assemble the second resource chain based on the current capacity level of the first resource to perform the first act and based on a service-level agreement.

10. The method of claim 9, further comprising:

computing an overall current capacity level of resources in a set of resource chains that perform the first act, the set of resource chains comprising the first resource chain, each resource chains of the set of resource chains comprising a resource that is capable of performing the first act;

determining whether the overall current capacity level satisfies an overall current capacity level required by the service-level agreement; and determining to assemble the second resource chain when the overall current capacity level does not satisfy the overall current capacity level required by the service-level agreement.

11. The method of claim 8, further comprising:

generating a monitored value based on data indicating a current state of one or more of the resources in the first resource chain; and calculating the actual capacity level based on the monitored value.

12. The method of claim 8, wherein the predicted pending capacity function is based on one or more types of functions selected from a group of types of functions consisting of: linear functions, exponential functions, step-wise functions, sinusoidal functions, logarithmic functions, and cubic functions.

13. The method of claim 8 wherein:

the predicted pending capacity function is equal to a difference between a predicted full capacity level of the first resource and a predicted actual capacity function; and the predicted actual capacity function represents a prediction of an actual capacity level of the first resource to perform the first act after the first resource is instructed to begin performing the first act.

14. The method of claim 8, wherein the predicted pending capacity function is a first predicted pending capacity function, further comprising:

calculating a current capacity level of a second resource to perform a second act, the second resource included in a third resource chain, the third resource chain comprising resources that collaborate to provide a second service;

wherein calculating the current capacity level of the second resource comprises adding a predicted pending capacity level indicated by a second predicted pending capacity function evaluated with respect to a second time to an actual capacity level of the second resource at the second time, the second predicted pending capacity function specifying a relationship between a predicted pending capacity level of the second resource and a length of time;

wherein the first predicted pending capacity function is different that the second predicted pending capacity function;

determining whether to assemble a fourth resource chain that includes resources that collaborate to provide the second service based on the current capacity level of the second resource to perform the second act; and causing assembly of the fourth resource chain in response to determining to assemble the fourth resource chain.

15. One or more computer-readable non-transitory storage media comprising logic that, when executed is operable to:

calculate a current capacity level of a first resource to perform a first act, the first resource included in a first resource chain, the first resource chain comprising resources that collaborate to provide a first service;

wherein calculating the current capacity level of the first resource comprises adding a predicted pending capacity level indicated by a predicted pending capacity function evaluated with respect to a first time to an actual capacity level of the first resource at the first time, the predicted pending capacity function specifying a relationship between the predicted pending capacity level of the first resource and a length of time;

determine, based on the current capacity level of the first resource to perform the first act, whether to assemble a second resource chain that includes resources that collaborate to provide the first service; and cause assembly of the second resource chain in response to determining to assemble the second resource chain.

16. The media of claim 15, wherein the logic is configured to determine whether to assemble the second resource chain based on the current capacity level of the first resource to perform the first act by determining whether to assemble the second resource chain based on the current capacity level of the first resource to perform the first act and based on a service-level agreement.

17. The media of claim 16, wherein the logic is further configured to:

compute an overall current capacity level of resources in a set of resource chains that perform the first act, the set of resource chains comprising the first resource chain, each resource chains of the set of resource chains comprising a resource that is capable of performing the first act;

determine whether the overall current capacity level satisfies an overall current capacity level required by the service-level agreement; and determine to assemble the second resource chain when the overall current capacity level does not satisfy the overall current capacity level required by the service-level agreement.

18. The media of claim 15 wherein the logic is further configured to:
- generate a monitored value based on data indicating a current state of one or more of the resources in the first resource chain; and
- calculate the actual capacity level based on the monitored value.

19. The media of claim 15, wherein the predicted pending capacity function is based on one or more types of functions selected from a group of types of functions consisting of: linear functions, exponential functions, step-wise functions, sinusoidal functions, logarithmic functions, and cubic functions.

20. The media of claim 15 wherein:
- the predicted pending capacity function is equal to a difference between a predicted full capacity level of the first resource and a predicted actual capacity function; and
- the predicted actual capacity function represents a prediction of an actual capacity level of the first resource to perform the first act after the first resource is instructed to begin performing the first act.

21. The media of claim 15, wherein:
- the predicted pending capacity function is a first predicted pending capacity function; and
- the logic is further configured to:
  - calculate a current capacity level of a second resource to perform a second act, the second resource included in a third resource chain, the third resource chain comprising resources that collaborate to provide a second service;
  - wherein calculating the current capacity level of the second resource comprises adding a predicted pending capacity level indicated by a second predicted pending capacity function evaluated with respect to a second time to an actual capacity level of the second resource at the second time, the second predicted pending capacity function specifying a relationship between a predicted pending capacity level of the second resource and a length of time;
  - wherein the first predicted pending capacity function is different that the second predicted pending capacity function;
  - determine whether to assemble a fourth resource chain that includes resources that collaborate to provide the second service based on the current capacity level of the second resource to perform the second act; and
  - cause assembly of the fourth resource chain in response to determining to assemble the fourth resource chain.

* * * * *

UNITED STATES PATENT AND TRADEMARK OFFICE
CERTIFICATE OF CORRECTION

PATENT NO. : 8,438,211 B2
APPLICATION NO. : 13/316220
DATED : May 7, 2013
INVENTOR(S) : Sanjay Radia et al.

Page 1 of 1

It is certified that error appears in the above-identified patent and that said Letters Patent is hereby corrected as shown below:

In the Claims

Column 78, line 19 (claim 14, line 18) please change "different that the" to -- different than the --

Signed and Sealed this
Third Day of June, 2014

Michelle K. Lee
*Deputy Director of the United States Patent and Trademark Office*